Feb. 22, 1966  R. C. WAGNER ETAL  3,236,021
METHOD AND APPARATUS FOR FORMING AND FILLING RECEPTACLES
Filed Feb. 28, 1963  25 Sheets-Sheet 1
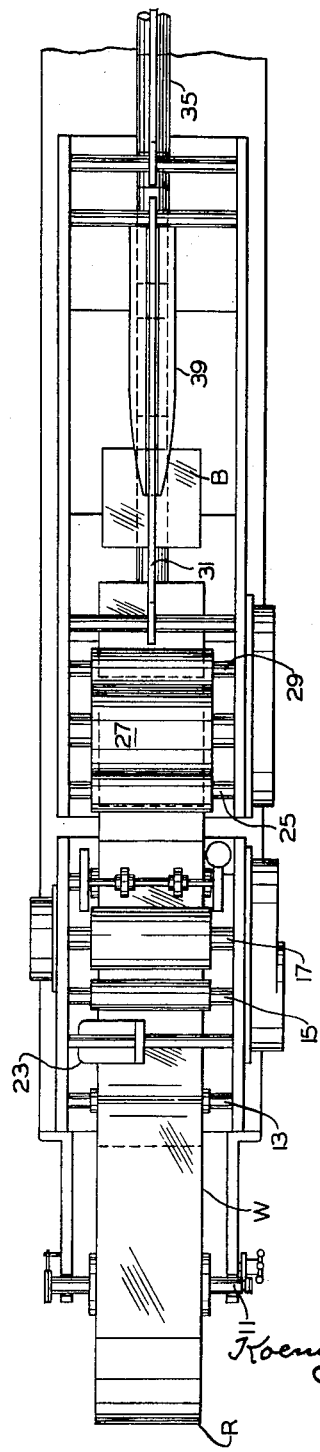
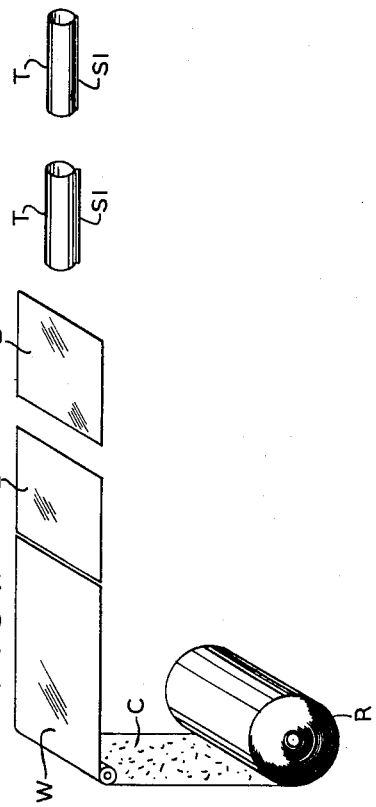
Richard C. Wagner,
Kenneth K. Christensen,
Robert G. Nutting,
Inventors.
Koenig, Pope, Senniger and Powers,
Attorneys.

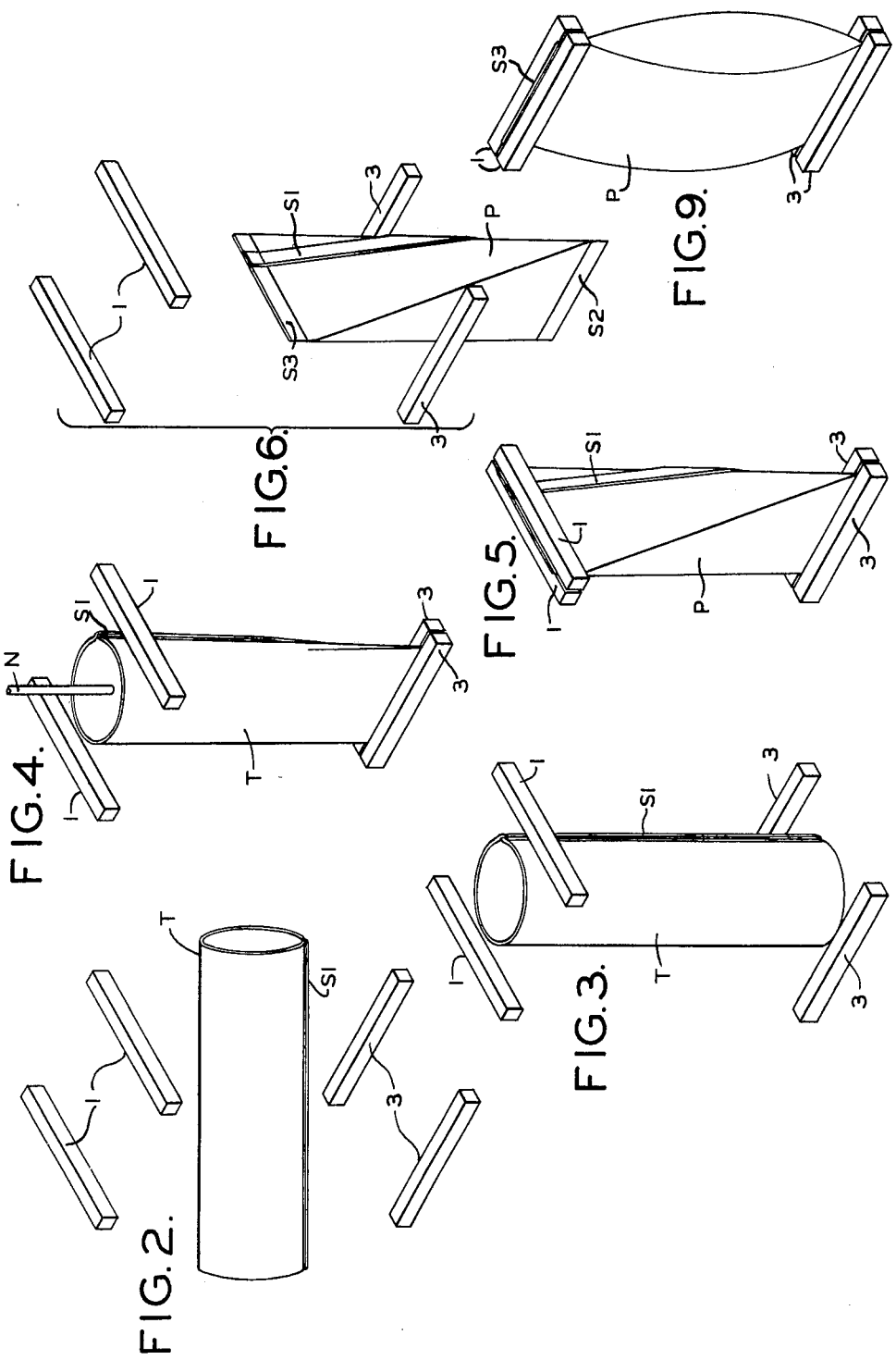

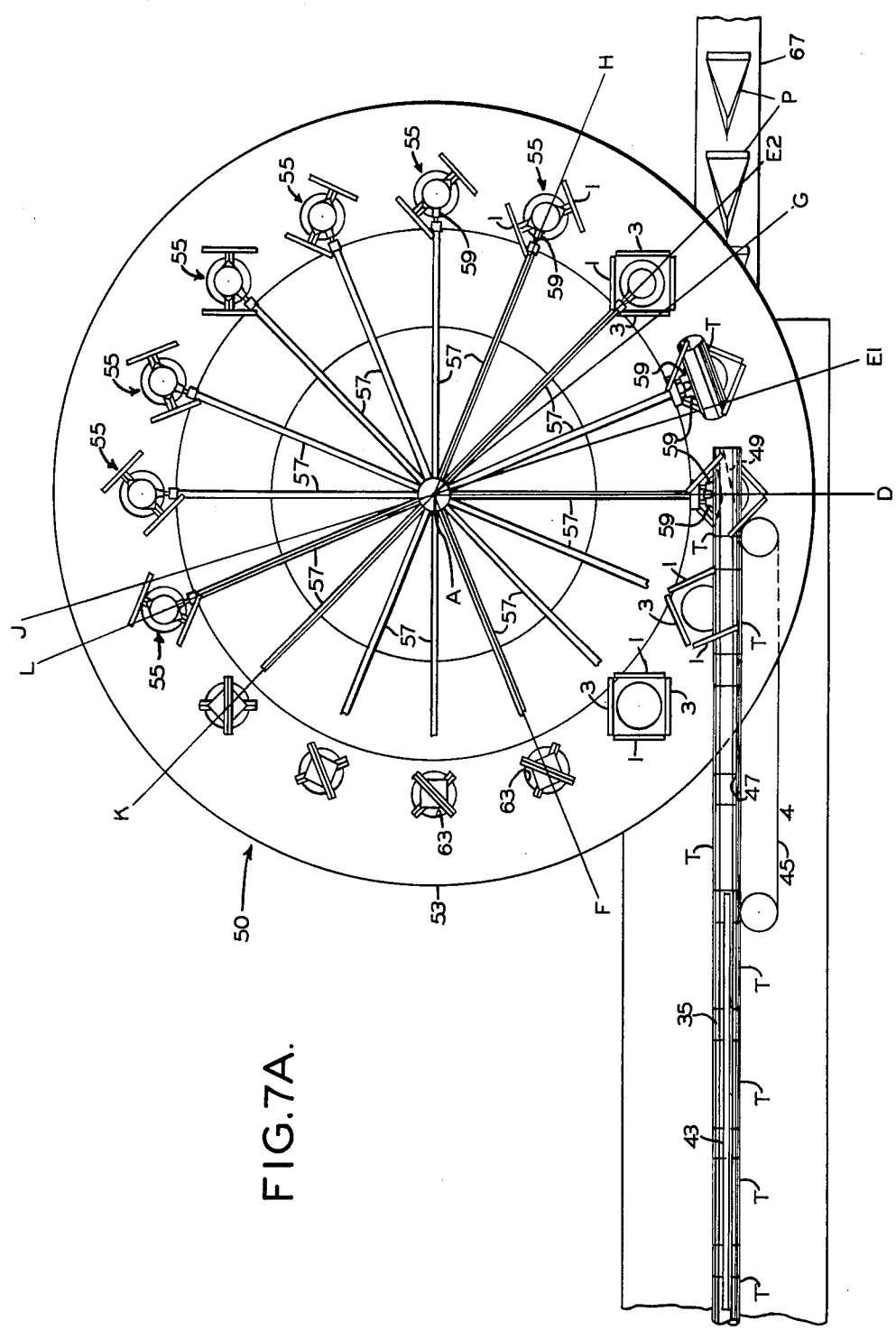

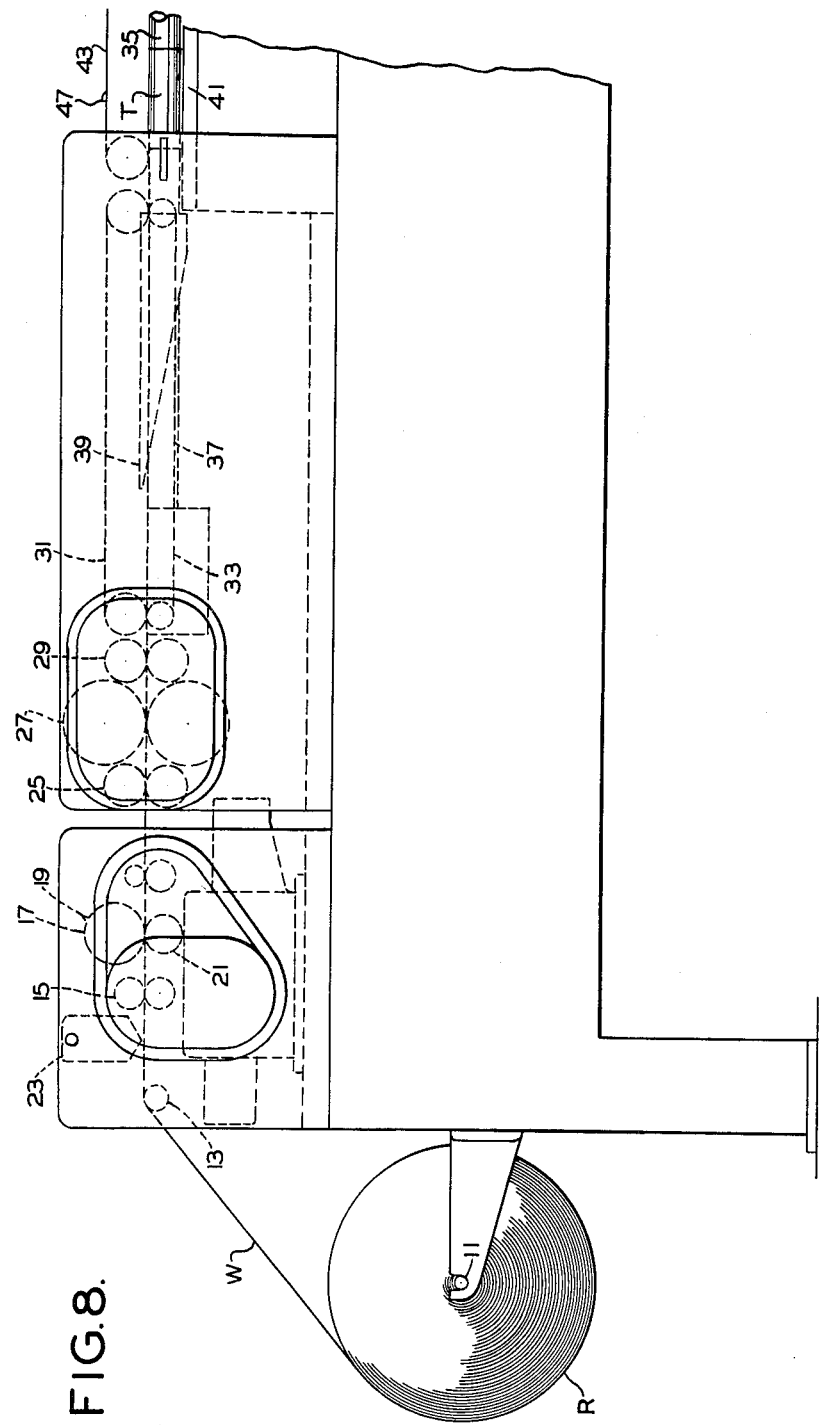

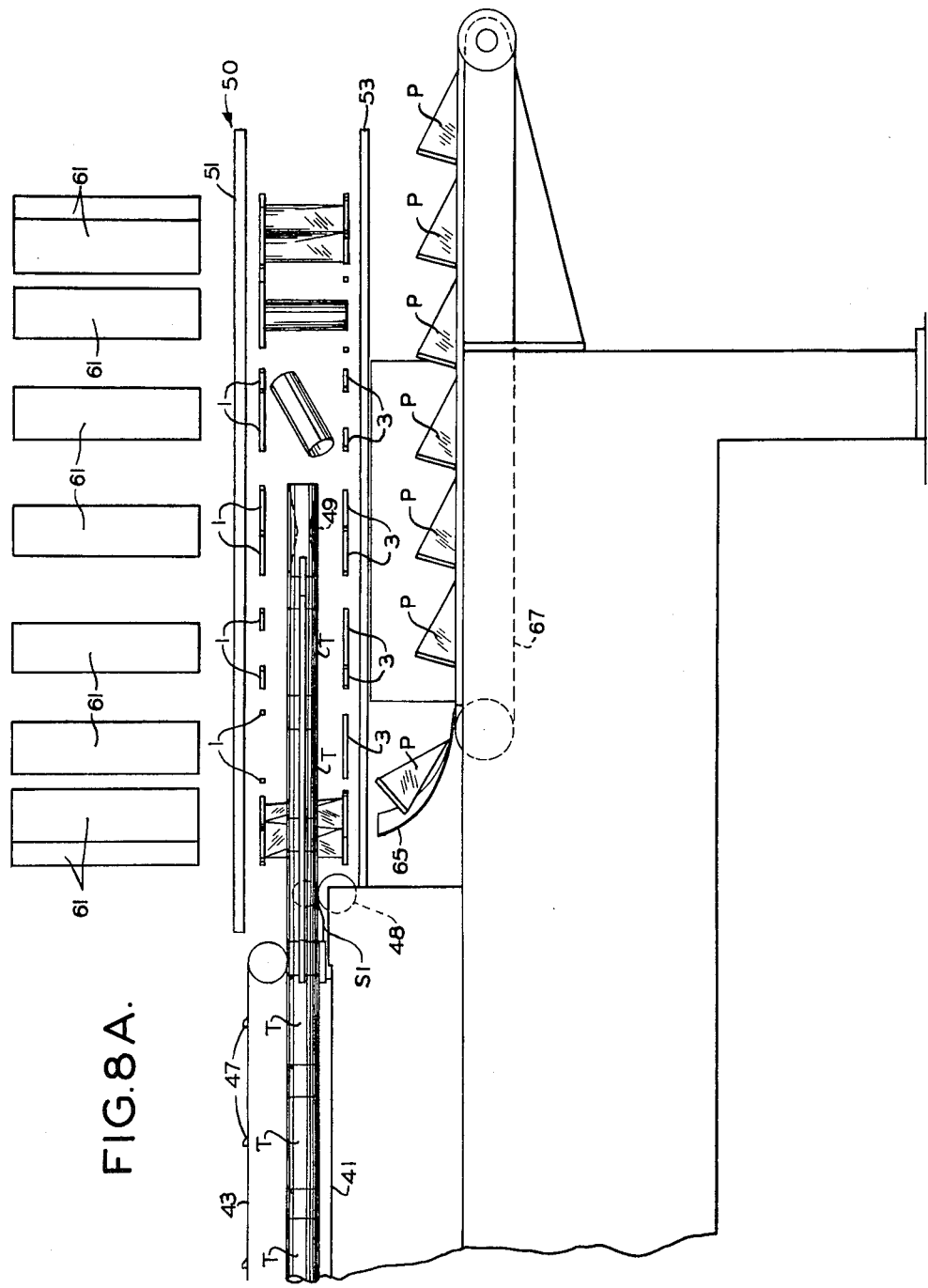

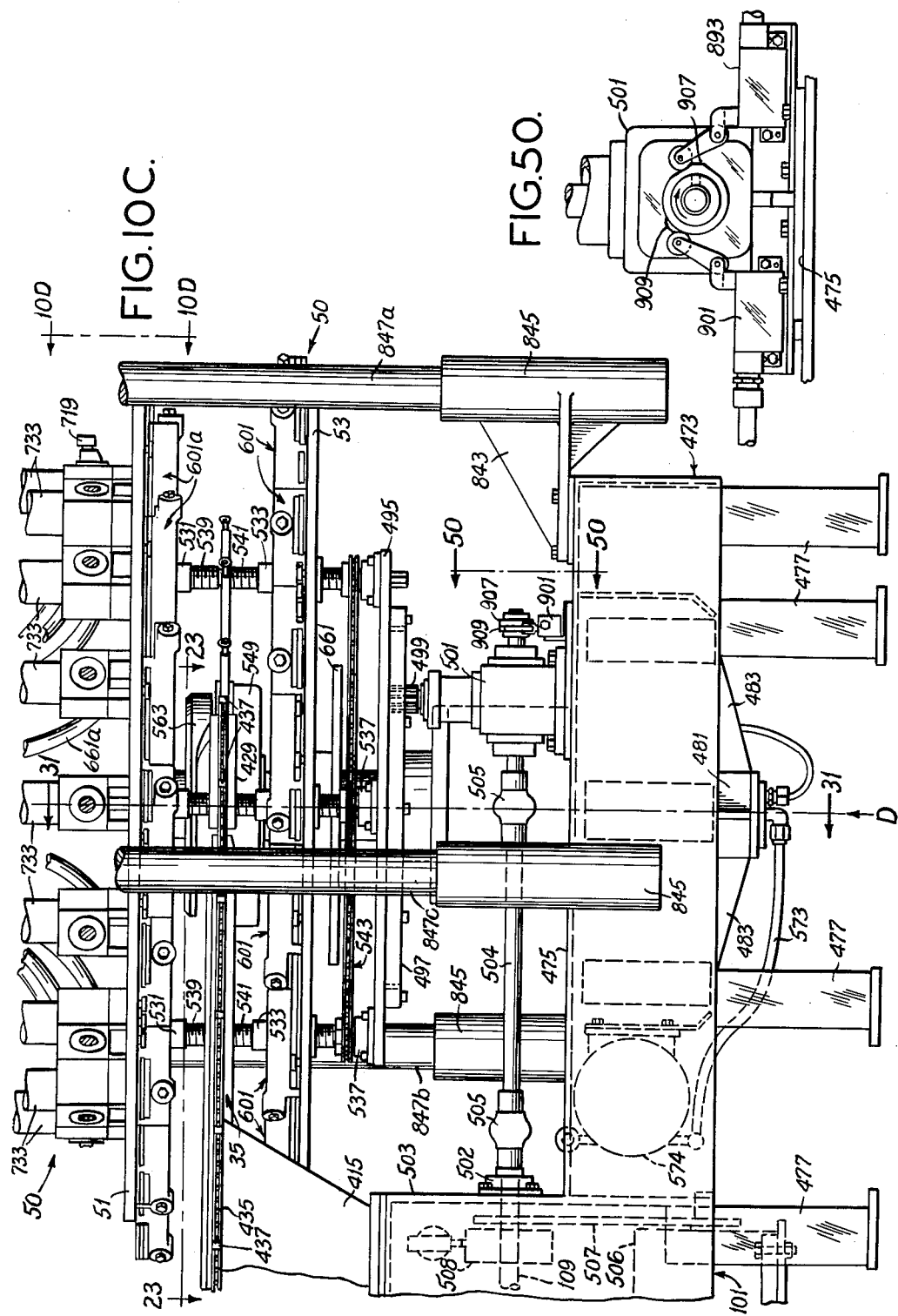

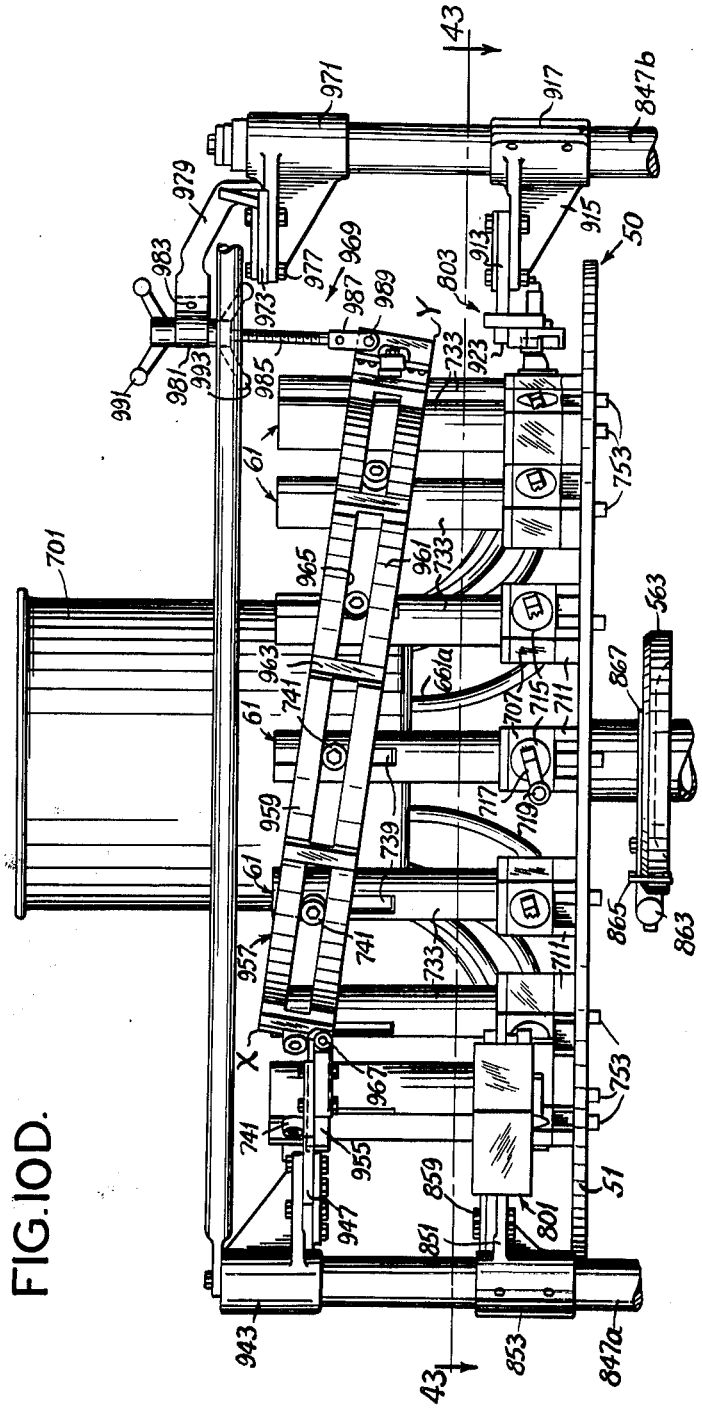

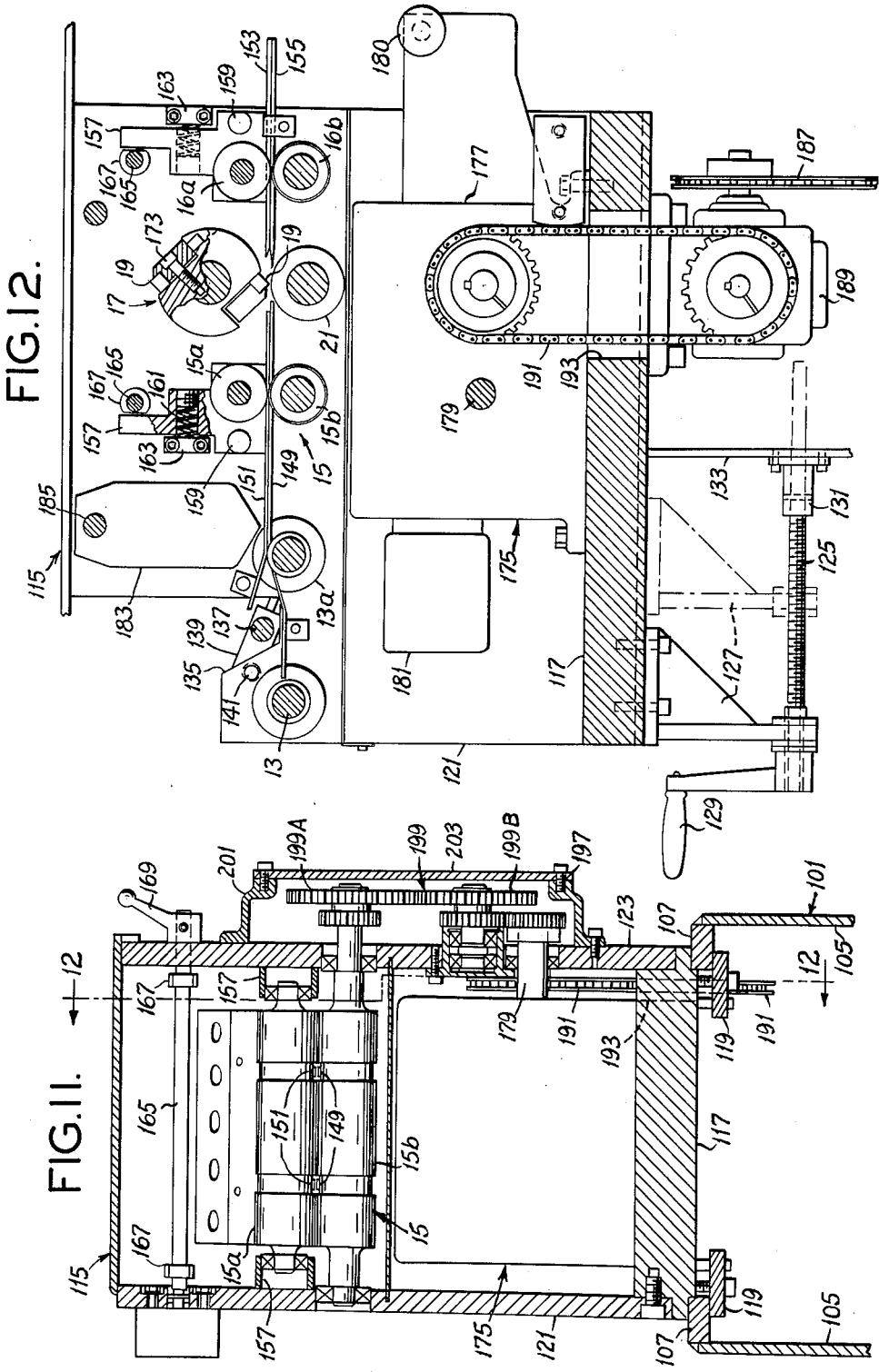

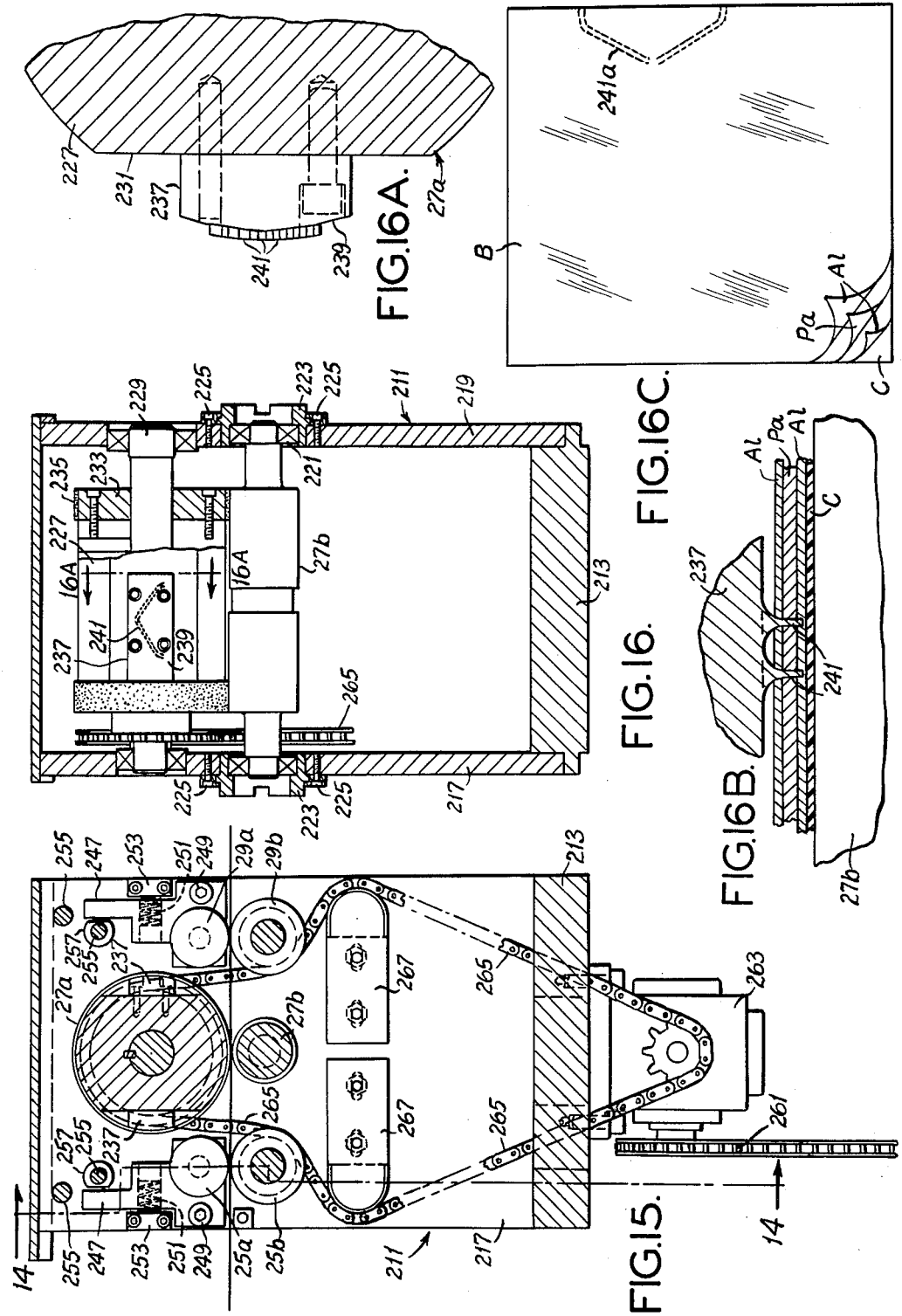

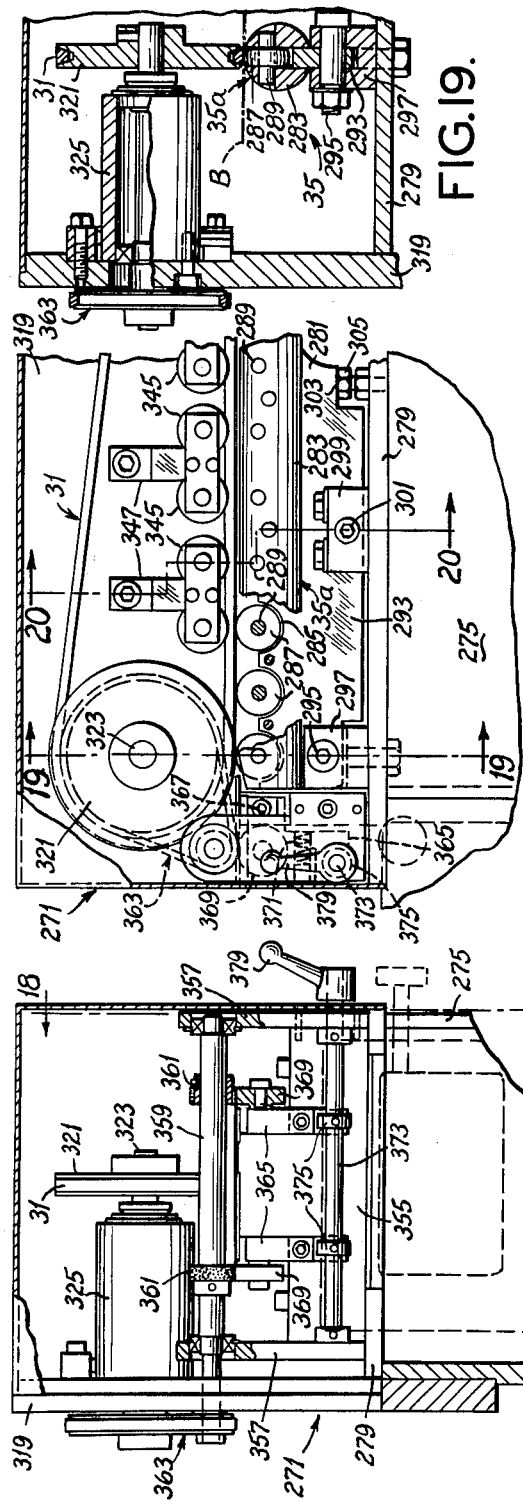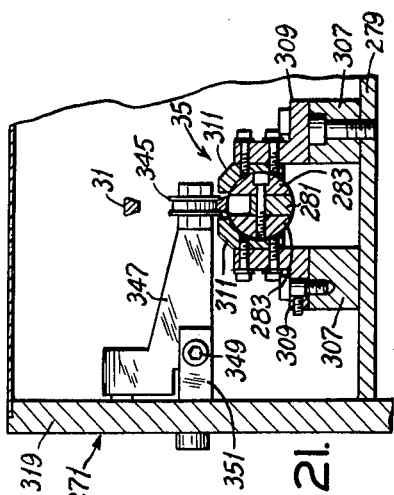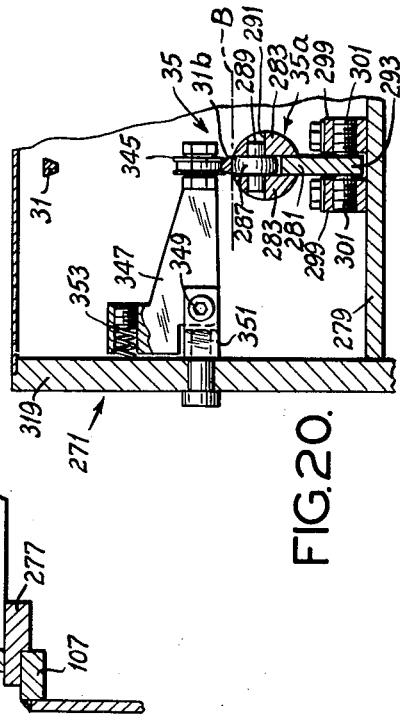

Feb. 22, 1966 R. C. WAGNER ETAL 3,236,021
METHOD AND APPARATUS FOR FORMING AND FILLING RECEPTACLES
Filed Feb. 28, 1963 25 Sheets-Sheet 14
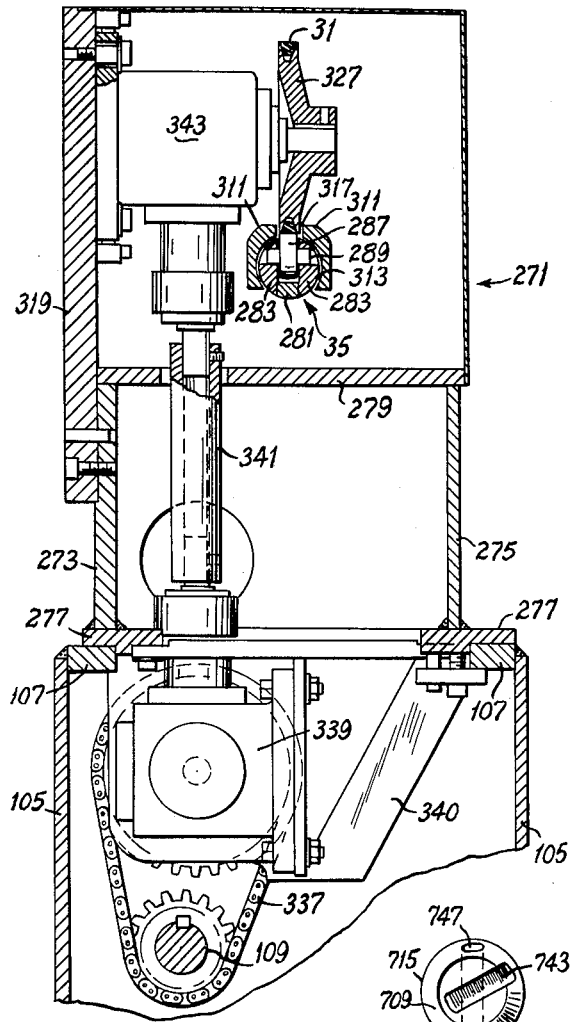
FIG.22.
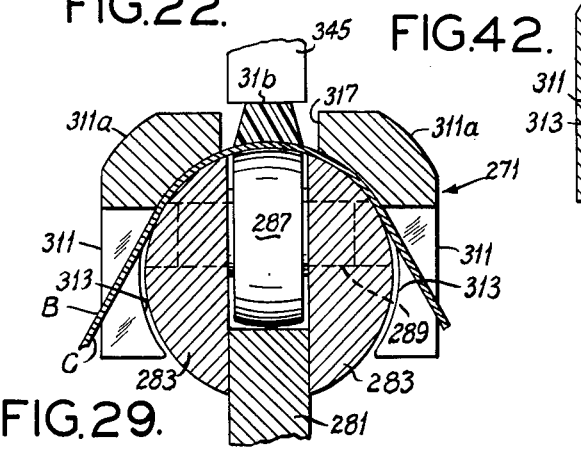
FIG.29.
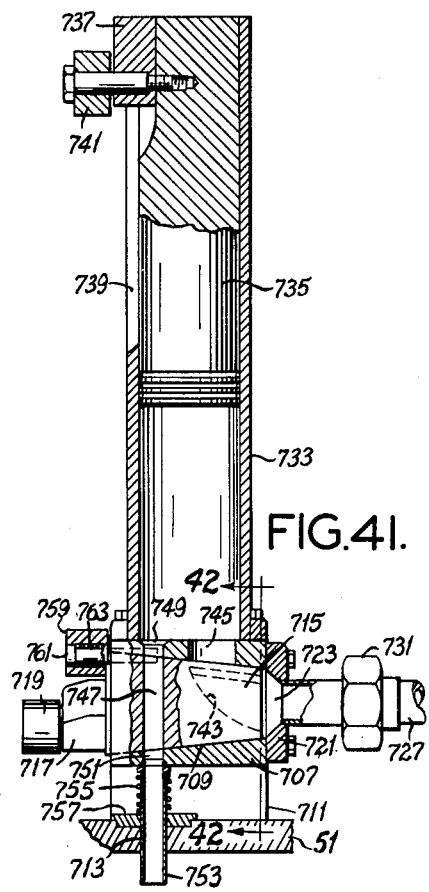
FIG.41.
FIG.42.
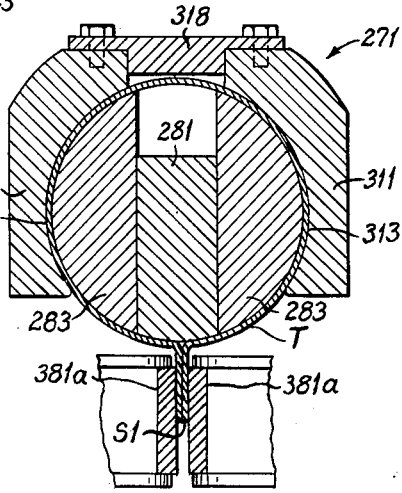
FIG.30.

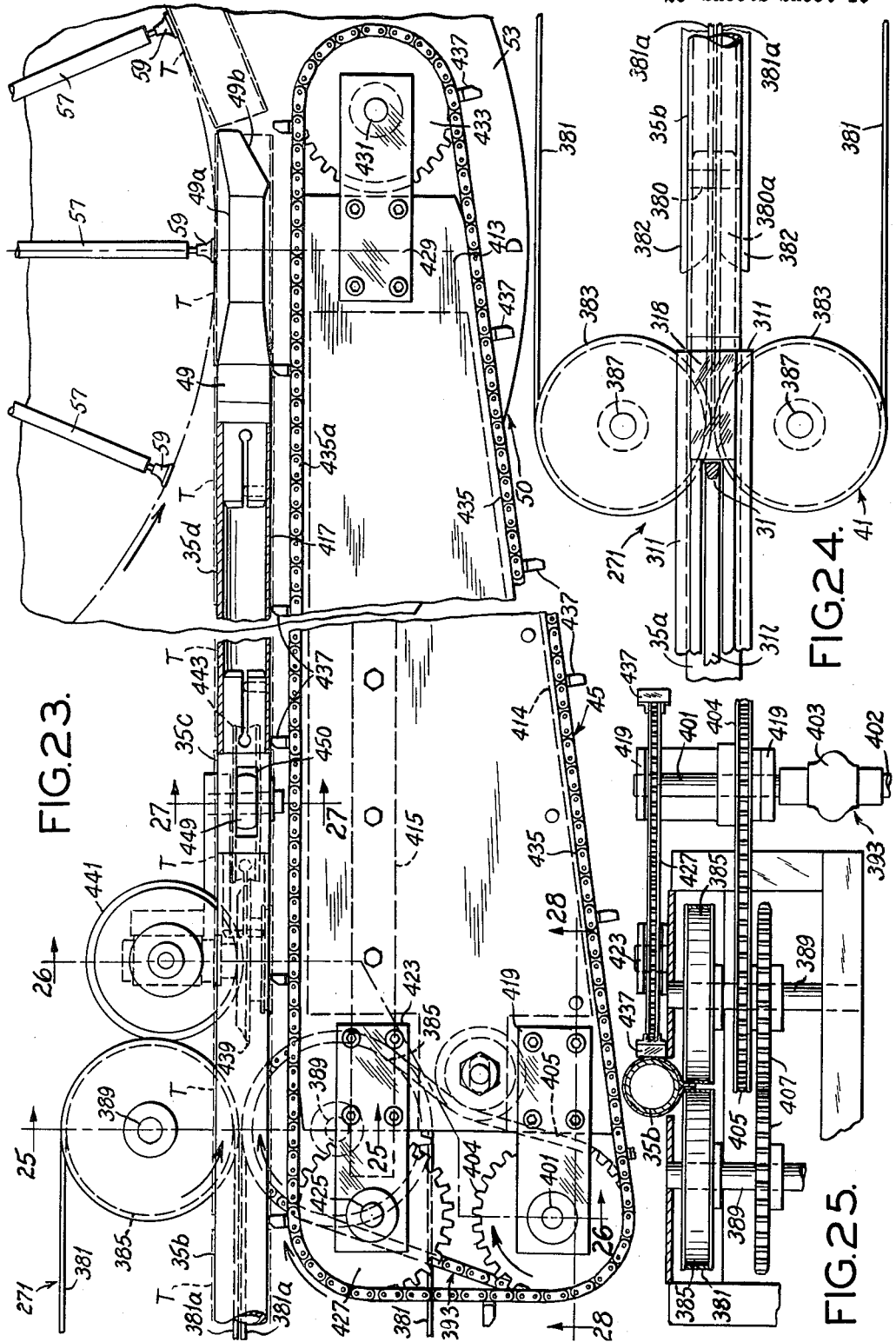

Feb. 22, 1966    R. C. WAGNER ETAL    3,236,021
METHOD AND APPARATUS FOR FORMING AND FILLING RECEPTACLES
Filed Feb. 28, 1963    25 Sheets-Sheet 16

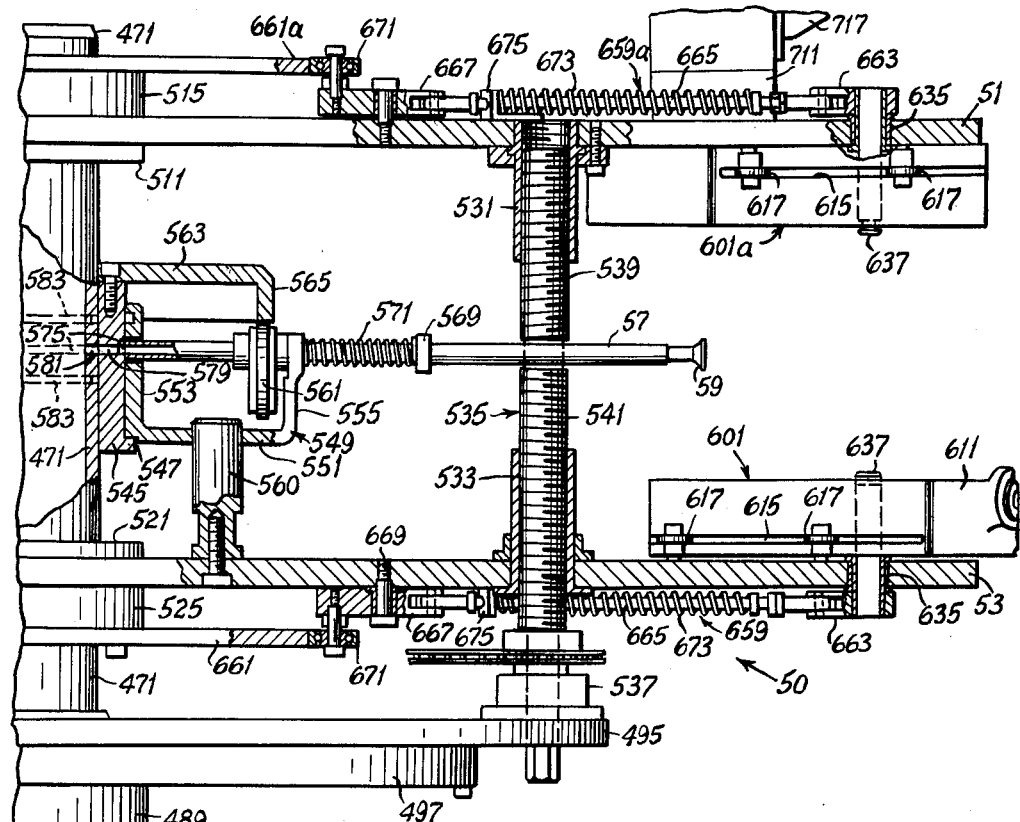
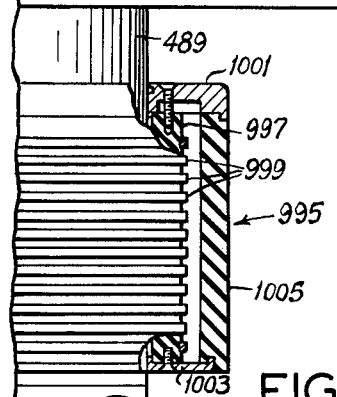
FIG. 32.
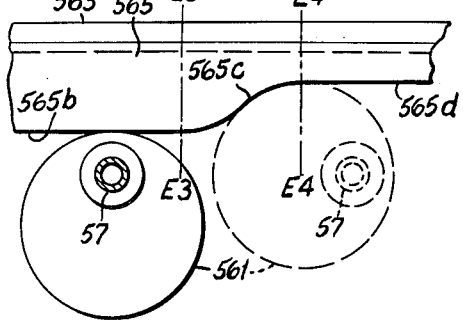
FIG. 39.
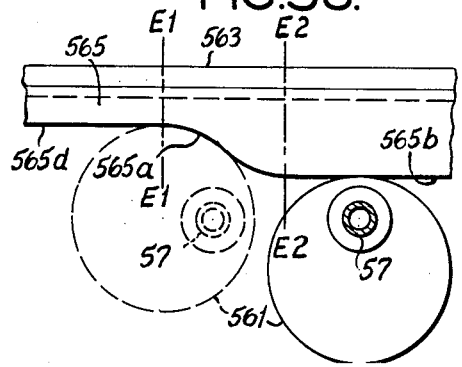
FIG. 38.

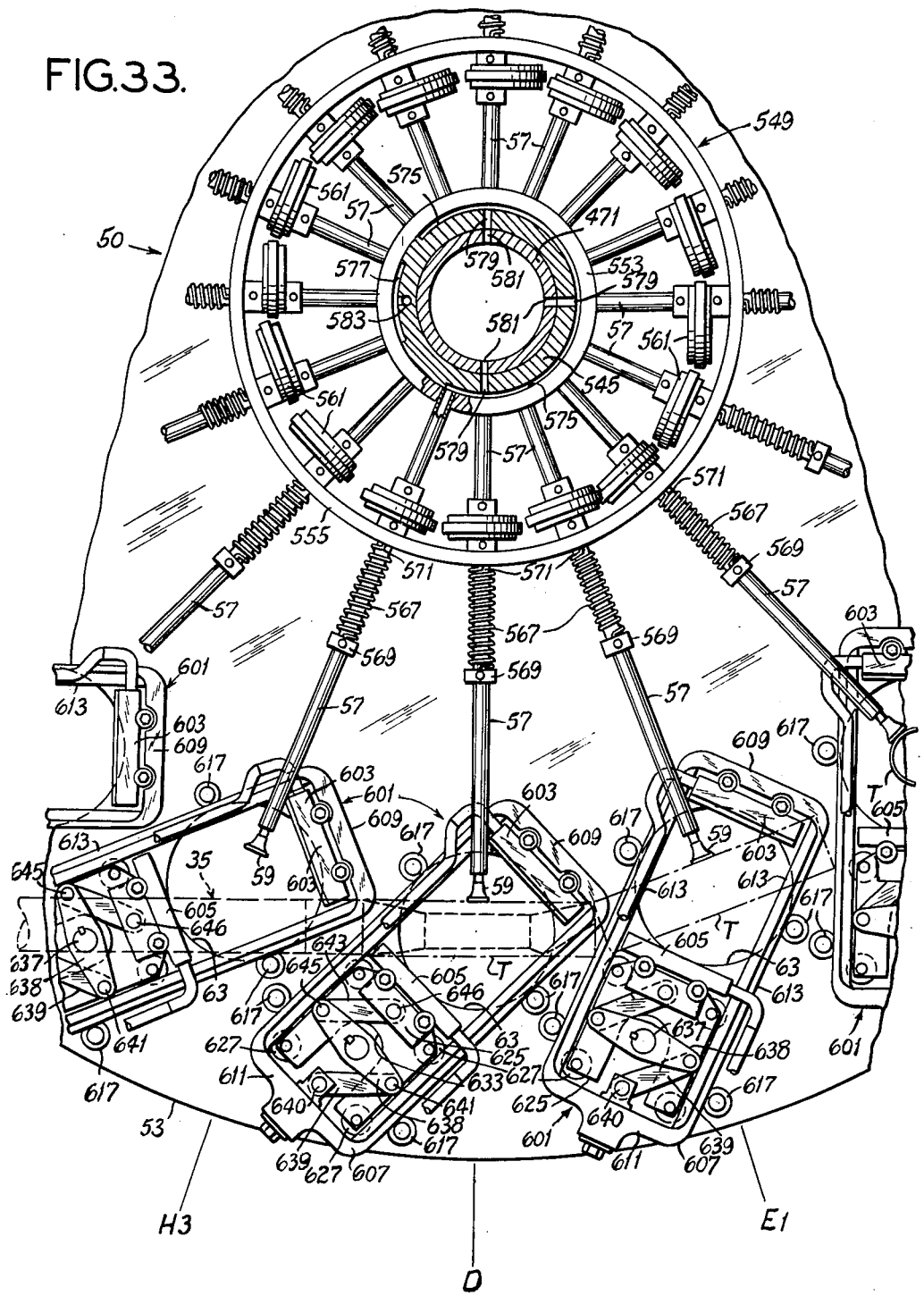

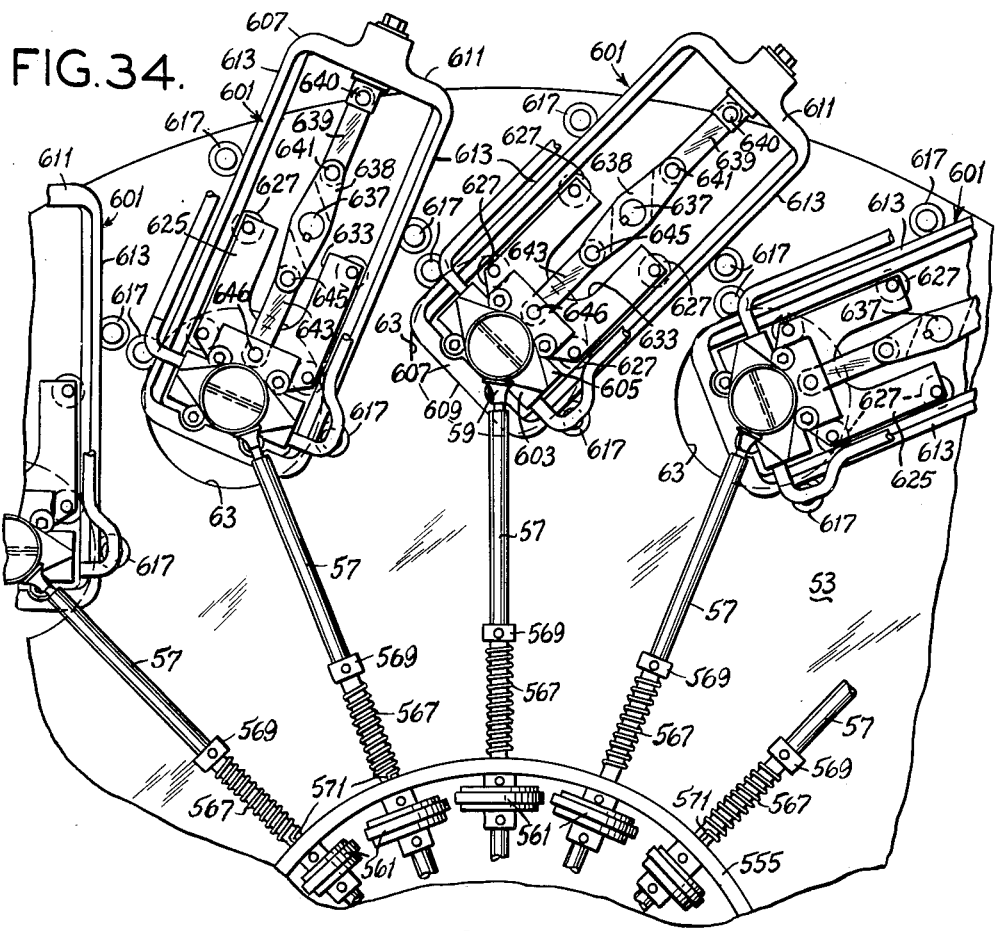

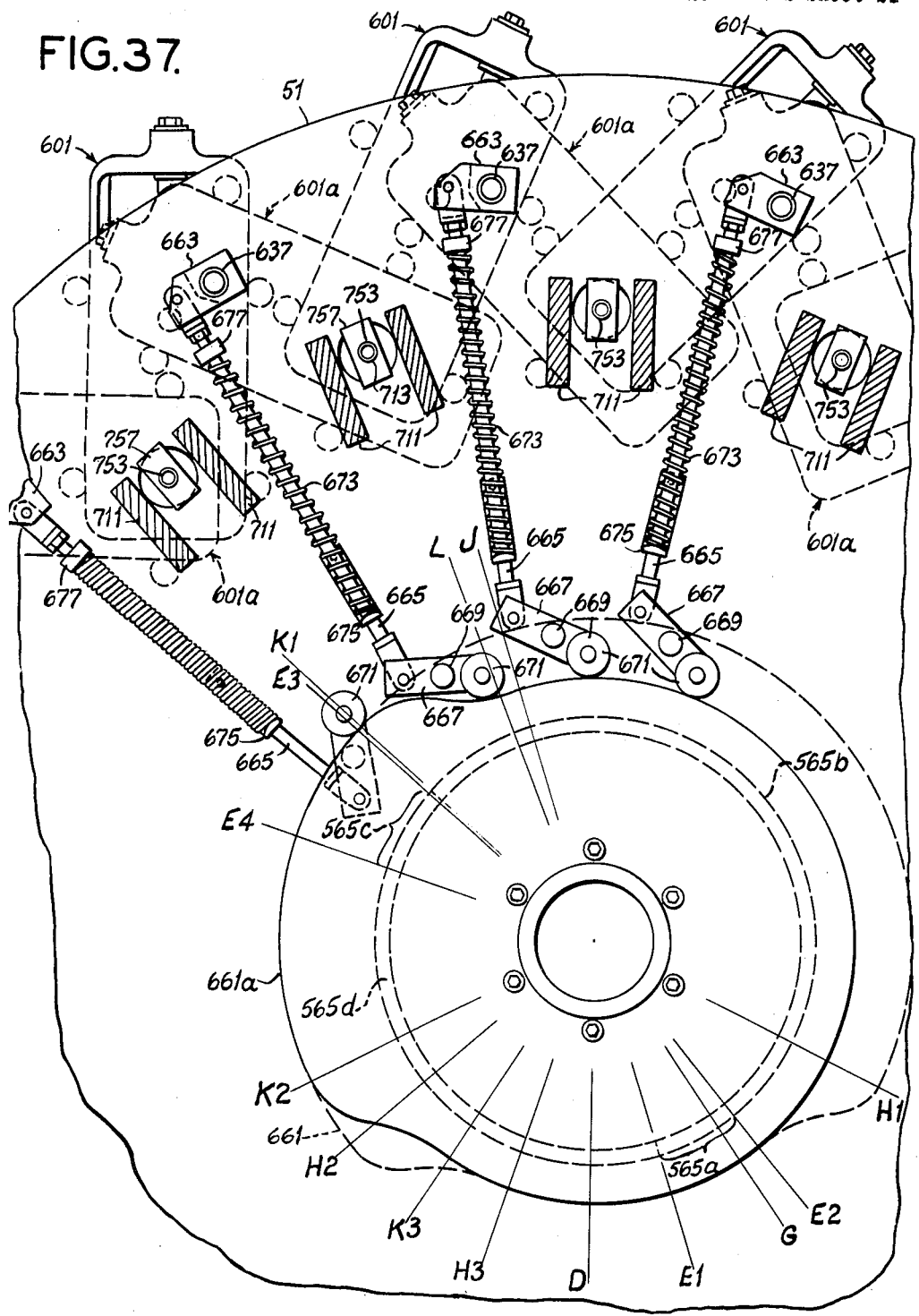

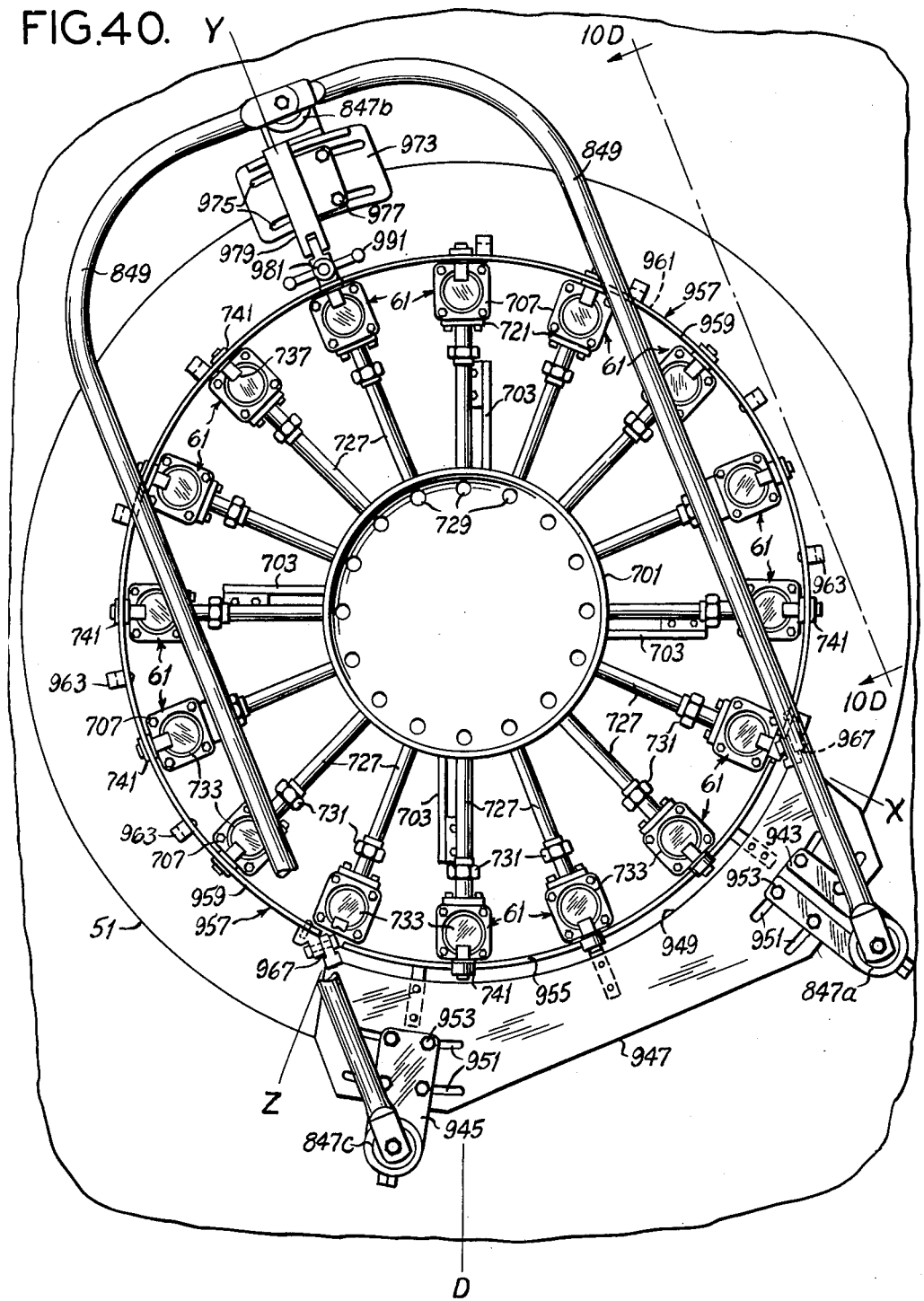

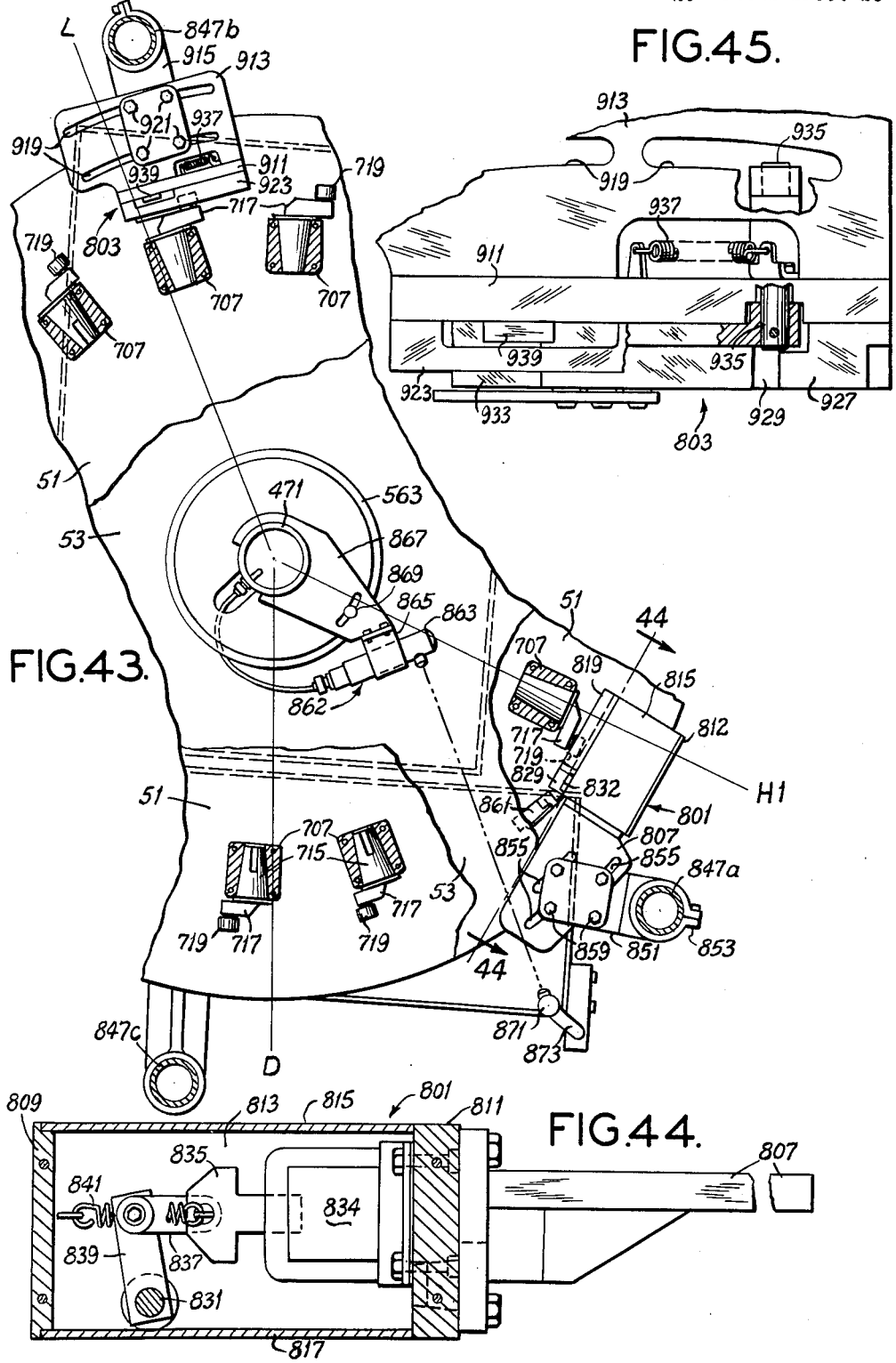

Feb. 22, 1966  R. C. WAGNER ETAL  3,236,021
METHOD AND APPARATUS FOR FORMING AND FILLING RECEPTACLES
Filed Feb. 28, 1963  25 Sheets-Sheet 24

United States Patent Office 3,236,021
Patented Feb. 22, 1966

3,236,021
METHOD AND APPARATUS FOR FORMING AND FILLING RECEPTACLES
Richard C. Wagner, Clarendon Hills, Kenneth K. Christensen, Lombard, and Robert G. Nutting, Glenview, Ill., assignors, by mesne assignments, to Packaging Frontiers, Inc., Waltham, Mass., a corporation of Delaware
Filed Feb. 28, 1963, Ser. No. 261,795
100 Claims. (Cl. 53—29)

This invention relates to packaging, and more particularly to methods of and apparatus for the forming, filling and sealing of packages made from flexible packaging material.

This application is a continuation-in-part of our copending application Serial No. 135,606, filed September 1, 1961, now abandoned for packaging.

The invention is concerned with the forming, filling and sealing of packages of various shapes made from flexible packaging material. Examples of package shapes contemplated within the scope of the invention are tetrahedron-shaped packages and flat (pillow-shaped) packs or pouches. Other shapes may also be encompassed. Among the several objects of the invention may be noted the provision of a method and apparatus for forming, filling and sealing such packages adapted for high speed production of packages. A feature of the invention is that the packages, whatever their final shape, are formed from individual tubes of flexible packaging material, each of a length corresponding to the desired package length. It is intended that the term "tube" not be confined in meaning to a cylindrical tube, but may include tubes of other cross sections. These tubes may be formed from individual rectangular blanks segmented from a continuous web of flexible packaging material, or it is possible that they may be segmented from continuous tubing. As regards the formation of tetrahedron-shaped packages and flat packs, the invention provides for the closing of the ends of the tubes by transverse seals, and a further object of the invention is the provision for manufacture of the packages in such manner as to provide ample time for effecting formation of the seals and for relatively slow filling of the tubes to avoid splashing or foaming of the product with which the tubes are being filled (particularly in the case of a liquid product), as might otherwise adversely affect the quality of the transverse seals. In general, the transverse seals may be heat seals or other suitable types of seals. As particularly shown herein, the invention provides for continuously forming the tubes from a continuous web of flexible packaging material, which is being continuously fed forward, by segmenting rectangular blanks from the web, and continuously feeding the blanks forward and forming them into tubes. The tubes are fed forward one after another to a transfer position. Conveyor means is provided for receiving the tubes at the transfer position and carrying them one after another in a predetermined path with each tube positioned for being filled through its upper end. As each tube proceeds along this path, its lower end is closed, then it is filled through its upper end as it proceeds farther along said path, and then its upper end is closed as its proceeds still farther along said path. A specific feature of the invention is that the tubes arrive at the transfer point in generally horizontal position, and the conveyor means is adapted to receive each tube in generally horizontal position and turn it to generally vertical position for closing of its lower end, filling and closing of its upper end as the tube proceeds along the stated path. The invention is more particularly concerned with utilization of flexible packaging material which is heat-sealable on one side, and makes provision for forming the tubes with the heat-sealable side on the inside and with a heat-sealed inside-face-to-inside-face longitudinal tube seam, and for forming heat-sealed inside-face-to-face end seals. As will appear, provision may also be made for forming the tubes with lines of perforations so as to provide a tear-off end or corner for each package, without causing leakage of the contents of the package, and for avoiding operation of the filling means if there is no tube in position to receive the fill. Other objects and features will be in part apparent and in part pointed out hereinafter.

The invention accordingly comprises the constructions and methods hereinafter described, the scope of the invention being indicated in the following claims.

In the accompanying drawings, in which several of various possible embodiments of the invention are illustrated, FIG. 1 is a schematic view illustrating the formation of individual tubes in accordance with the method of this invention;

FIG. 2 is a schematic view illustrating the horizontal positioning of a tube between pairs of upper and lower sealing members in accordance with the method;

FIG. 3 is a schematic view illustrating the tube shown in FIG. 2 turned to upright position;

FIG. 4 is a schematic view showing the lower sealing members closed on the lower end of the tube and showing a nozzle for filling the tube;

FIG. 5 is a schematic view showing the upper sealing members closed for completing the formation of a tetrahedron-shaped package;

FIG. 6 is a schematic view showing the upper and lower sealing heads open and the package dropping out;

FIG. 7 is a semidiagrammatic view in plan of part of an apparatus such as may be used for carrying out the method;

FIG. 7A is a continuation of FIG. 7;

FIG. 8 is a front elevation of FIG. 7;

FIG. 8A is a continuation of FIG. 8;

FIG. 9 is a view similar to FIG. 5 showing a modification for forming flat packs.

FIG. 10C is a continuation of FIG. 10B, the upper part of the portion of the apparatus shown therein being broken away;

FIG. 10D is a view in elevation of the upper part broken away in FIG. 10C, as viewed from the right of FIG. 10C;

FIG. 11 is a vertical transverse section taken on line 11—11 of FIG. 10A;

FIG. 12 is a vertical longitudinal section taken on line 12—12 of FIG. 11;

FIG. 15 is a vertical longitudinal section taken on line 15—15 of FIG. 14;

FIG. 16 is a vertical transverse section taken on line 16—16 of FIG. 10A;

FIG. 16A is an enlarged detail section taken on line 16A—16A of FIG. 16;

FIG. 16B is an enlarged detail section showing how partial perforation is effected by the means shown in FIGS. 16 and 16A;

FIG. 16C is a view of a blank as it appears after perforation by the means shown in FIGS. 16, 16A and 16B;

FIG. 17 is a vertical transverse section taken on line 17—17 of FIG. 10B;

FIG. 18 is a vertical longitudinal section taken on line 18—18 of FIG. 17;

FIG. 19 is a vertical transverse section taken on line 19—19 of FIGS. 10B and 18;

FIG. 20 is a vertical transverse section taken on line 20—20 of FIGS. 10B and 18;

FIG. 21 is a vertical transverse section taken on line 21—21 of FIG. 10B;

FIG. 22 is a vertical transverse section taken on line 22—22 of FIG. 10B;

FIG. 23 is an enlarged plan view taken on line 23—23 of FIG. 10B and continuing on to the right of FIG. 10B in FIG. 10C;

FIG. 24 is a horizontal section taken on line 24—24 of FIG. 10B;

FIG. 25 is a vertical transverse section taken on line 25—25 of FIG. 23;

FIG. 26 is a vertical transverse section taken on line 26—26 of FIG. 23;

FIG. 27 is a vertical transverse section taken on line 27—27 of FIG. 23;

FIG. 28 is a vertical longitudinal section taken on line 28—28 of FIG. 23;

FIG. 29 is an enlarged vertical transverse section taken on line 29—29 of FIG. 10B;

FIG. 30 is an enlarged vertical transverse section taken on line 30—30 of FIG. 10B;

FIG. 32 is a view similar to FIG. 31 showing the other half of the turret;

FIG. 33 is a horizontal section taken on line 33—33 of FIG. 31, showing certain heat-sealing units open;

FIG. 34 is a continuation of FIG. 33 showing certain heat-sealing units closed;

FIG. 35 is an end view of a heat-sealing unit with parts broken away and shown in section;

FIG. 36 is a longitudinal section of a heat-sealing unit, showing the jaws of the unit closed, taken on line 36—36 of FIG. 35;

FIG. 37 is a horizontal section taken on line 37—37 of FIG. 31;

FIGS. 38 and 39 are views showing the development of a certain cam of the apparatus;

FIG. 40 is a top plan showing the rotary turret;

FIG. 41 is a vertical section of a filler unit;

FIG. 42 is an end elevation of a plug valve of the filler unit, taken on line 42—42 of FIG. 41;

FIG. 43 is a view partly in section on line 43—43 of FIG. 10D, and with other parts broken away and shown in section;

FIG. 44 is an enlarged section taken on line 44—44 of FIG. 43;

FIG. 45 is an enlarged fragment of FIG. 43;

FIG. 50 is a view taken on line 50—50 of FIG. 10C;

Corresponding reference characters indicate corresponding parts throughout the several views of the drawings.

Figure 10A:
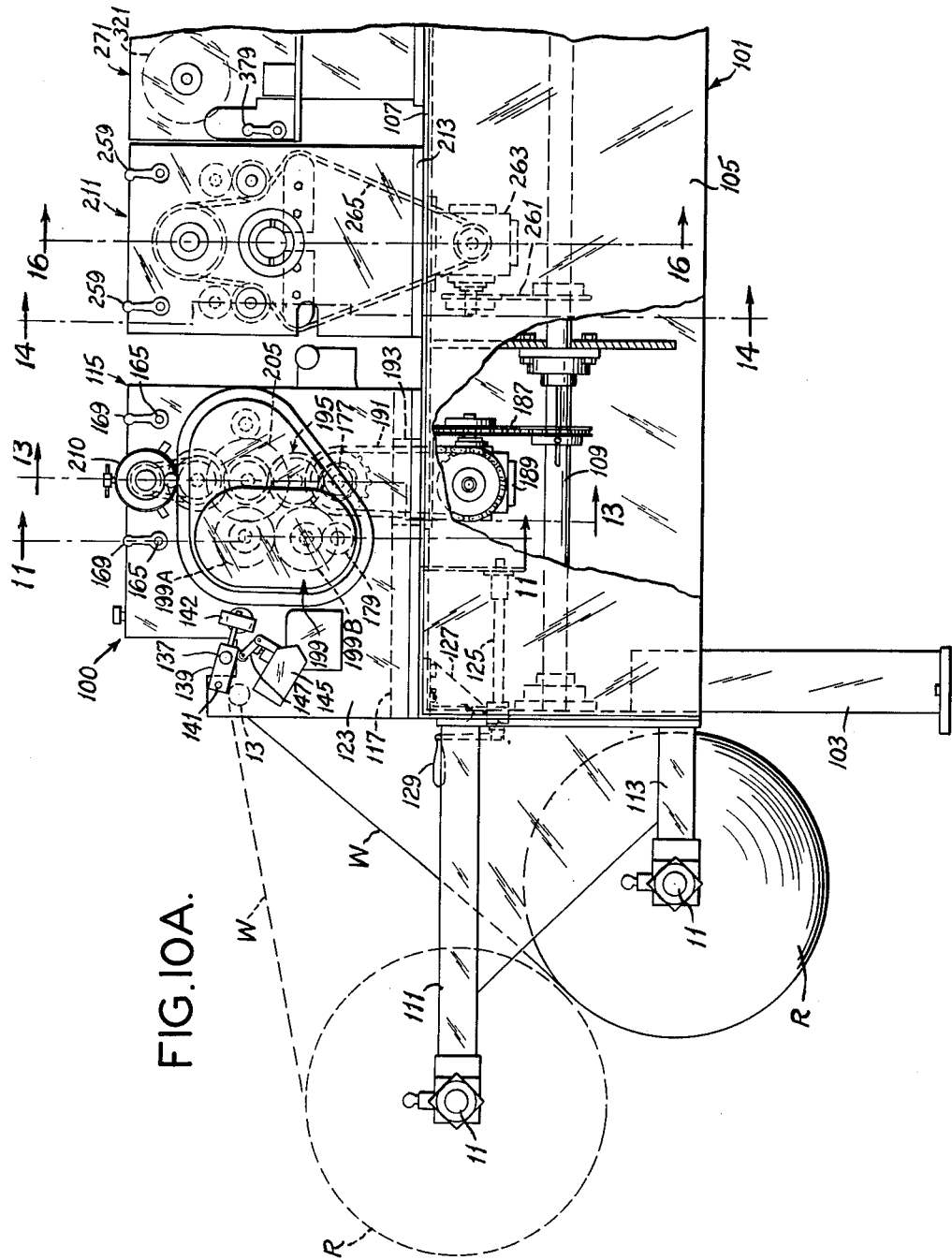
FIG. 10A is a view in elevation showing part of the apparatus in detail, with parts broken away and shown in section.

Referring to FIGS. 1–6, which schematically illustrate the method of this invention as it pertains to forming, filling and sealing tetrahedron-shaped packages, there is indicated at W in FIG. 1 a web of flexible packaging material which is heat-sealable on one face thereof as indicated at C. This web may consist, for example, of laminated paper and metal foil layers with a coating C of polyethylene on one face. It may be preprinted on its other face with label indicia recurring at package length intervals. In FIG. 1, the web is shown as being withdrawn from a supply roll R and segmented into individual rectangular blanks B by cutting it transversely at package length intervals (between the recurrent label indicia if such is present). Each such rectangular blank B is then formed into a tube T open at both ends with heat-sealable face C on the inside and with a heat-sealed longitudinal tube seam such as indicated at S1. This seam may be of the inside-face-to-inside-face type described in U.S. Patent 2,942,760, and may be folded over on the outside of the tube as appears at the extreme right of FIG. 1.

Now referring to FIG. 2, a tube T is shown as being horizontally positioned between an upper pair of horizontally arranged heat-sealing heads 1 and a lower pair of horizontally arranged heat-sealing heads 3. The upper heads are horizontally movable toward and away from one another between an open and a closed position. The lower heads are similarly horizontally movable toward and away from one another between an open and a closed position. For producing tetrahedron-shaped packages, the upper and lower pairs of heads are arranged at 90° to one another, as will appear from FIG. 2. As shown in FIG. 2, both the upper and lower pairs of heads are in open position.

The tube T is then turned from horizontal to upright position, being shown in the upright position in FIG. 3. It is turned on a horizontal axis extending transversely across the tube at the center of length of the tube and intersecting the longitudinal axis of the tube. This brings the upper end of the tube between the upper sealing heads 1 (which are open) and the lower end of the tube between the lower sealing heads 3 (which are also open).

Then, as shown in FIG. 4, the lower sealing heads 3 are closed to form a transverse heat seal S2 (see FIG. 6) across the lower end of the tube (closing the lower end of the tube). The upper-sealing heads remain open. Then, a measured quantity of the product with which the tube is to be filled is delivered into the tube through a filling nozzle N. This quantity is such that the level of product in the tube is below the upper end of the tube (below the transverse seal to be made across the upper end of the tube by the upper sealing heads 1). Then, as shown in FIG. 5, the upper sealing heads 1 are closed to form a transverse heat seal S3 (see FIG. 6) across the upper end of the tube, thereby closing the upper end of the tube and completing the formation of a tetrahedron-shaped package P. Finally, as shown in FIG. 6, both pairs of sealing heads are opened, and the completed package P drops out.

An apparatus of this invention for carrying out a method such as above described is illustrated semidiagrammatically in FIGS. 7, 7A, 8 and 8A, and in detail in FIGS. 10A–52. As shown, web supply roll R is supported in horizontal position as indicated at 11. Web W is withdrawn from the roll R over an idler roller 13 by a pair of draw rolls 15. The web travels horizontally from the idler roller to the draw rolls, and thence passes horizontally between a roll 17 carrying a cutter 19 and an anvil roll 21 which function to segment the web into blanks B. A photocell for detecting any out-of-registration condition of the recurrent printing on the web and the cuts and initiating correction thereof is indicated at 23. Each blank B enters the nip of a pair of accelerator rolls 25 which function to speed up the blanks relative to the speed of web feed, thereby longitudinally to separate the blanks. The blanks may then pass between a pair of rotary dies 27 which function for example, to provide suitable perforations in the blank, and are then fed by a pair of transfer rolls 29 between upper and lower belt conveyors 31 and 33 which carry the blanks over a horizontal cantilevered mandrel 35 of circular cross section.

The diameter of the mandrel is somewhat less than the width of web W and hence somewhat less than the lateral dimension of the blanks B. Each blank is fed over the trailing end 37 of the mandrel immediately above the mandrel and, in passing along the length of the mandrel, is constrained by a tube former 39 to become wrapped around the mandrel thereby to assume the form of a tube. The lateral margins of the blank are brought together in inside-face-to-inside face relation and enter a heat-sealing device indicated at 41 which functions to heat-seal the margins together, thereby to form the inside-face-to-inside-face longitudinal tube seam S1. This completes the formation of the tubes T. Conveyors 31 and 33 terminate shortly past the trailing end of sealing device 41, and from this point the tubes T (which surround the mandrel) are fed along the mandrel by trailing and leading endless chain conveyors 43 and 45 (see FIGS. 7A, 8 and 8A) having spaced lugs 47 for engaging the trailing ends of the tubes and pushing them forward. Seam S1 of each tube may be folded over against the outside of the tube as indicated at 48.

The leading chain conveyor 45 delivers each successive tube T to the free end 49 of the mandrel. At this point, each successively formed and delivered tube T is positioned to be taken off the end of the mandrel by a continuousuly rotating turret generally indicated at 50. As shown, this turret (which rotates counterclockwise as viewed in FIG. 7A) essentially comprises upper and lower circular plates 51 and 53 which rotate continuously on a vertical axis indicated at A. The upper plate 51 is removed in FIG. 7A. The turret has a plurality of operating stations, each generally designated 55, spaced at equal intervals around its perimeter. Sixteen such stations are illustrated. At each such station, there is an upper pair of sealing heads 1 and a lower pair of sealing heads 3. A tubular rod 57 extends radially outward from the center of the turret to each station 55. With sixteen stations, there are sixteen sets of sealing heads and sixteen rods 57. The number sixteen is, of course, only by way of example. The rods are located in a horizontal plane between plates 51 and 53. As shown in FIG. 7A, each rod has a pair of vacuum grippers or suction cups 59 at its outer end, adapted to be evacuated via the bore in the tubular rod. Each rod is rotatable on its axis between a first position wherein the two grippers are positioned horizontally side-by-side and a second position wherein the two grippers are positioned one above the other. The first position may be referred to as the tube take-off position; the second position may be referred to as the upright position. As appears in FIGS. 23 and 31–34, only one suction cup may be provided on the outer end of each rod.

The mandrel 35 extends between plates 51 and 53 generally tangent to the circular path of movement of the vacuum grippers 59. The arrangement is such that as the grippers 59 on the outer end of each rod 57 come around into engagement with a tube T on the free end 49 of the mandrel, and with vacuum applied to the grippers through the rod, the grippers grip the tube and carry it endwise off the end of the mandrel and around with the turret 50. This tube take-off occurs at the initial position D as shown in FIG. 7A. When the grippers carry a tube off the end of the mandrel, they are in their first position as above mentioned, i.e., the horizontal tube take-off position.

At each operating station 55 on the turret, there are a pair of upper sealing heads 1 and a pair of lower sealing heads 3. Consequently, there are sixteen sets of sealing heads, each set comprising an upper pair and a lower pair. The two upper heads 1 of each set are carried by the upper plate 51 directly above the respective vacuum grippers 59. They rotate with the turret and are mounted on the under side of the upper plate for movement relative to the upper plate between open and closed positions. The two lower heads 3 of each set are carried by the lower plate 53 directly below the respective pair of upper heads, rotate with the lower plate, and are movable relative to the lower plate between open and closed positions. As shown in FIG. 7A, the two upper heads 1 of each set are arranged for movement in a direction at a 45° angle to the radius on which the respective rod 57 extends. The two lower heads 3 of each set are arranged for movement in a direction at an opposite 45° angle. Thus the two upper heads of each set work at an angle of 90° to the two lower heads of the set. The grippers 59 at the end of each rod 57 carry a tube T off the end of the mandrel and position it horizontally between the upper and lower heads of the respective set of heads, with the tube extending diagonally relative to the heads (see FIG. 7A).

Associated with the turret are filler units generally indicated at 61, one for each of the sixteen stations 55 of the turret. In the case where a liquid is to be packaged, for example, each of these filler units may be piston-type filler, for example, supplied with the liquid from a reservoir or tank (not shown in FIGS. 7A or 8A, but appearing at 701 in FIG. 10D) located above and rotatable with the turret. Each filler unit is adapted to discharge a metered quantity of liquid through a nozzle N (see FIG. 4) into a tube T through its open upper end. Suitable openings are provided in the upper plate 51 for accommodating the nozzles of the fillers. Openings such as indicated at 63 in FIG. 7A are provided in the lower plate 53 for drop-out of completed packages P, and a chute 65 and a conveyor 67 are provided for carrying away the latter as shown in FIGS. 7A and 8A.

Suitable mechanism, such as cam-actuated mechanism, is provided for controlling each rod 57 so that at the take-off position D, the grippers 59 are in their horizontal tube take-off position, and for rotating the rod to bring the grippers to the upright position as the grippers rotate around to a position such as indicated at E2 in FIG. 7A, which is about 45° counterclockwise around from initial position D. The rod starts turning at a position such as indicated at E1 in FIG. 7A. The grippers may remain in upright position around to position such as indicated at F in FIG. 7A, and the rod is then rotated to return the grippers to take-off position before they reach the initial position D.

Suitable mechanism, such as cam-actuated mechanism, is provided for controlling the upper sealing heads 1 and the lower sealing heads 3 at each station 55 on the turret so that at the take-off position D, both the upper and lower heads of each set are open. At a position G such as shown in FIG. 7A, the lower heads start to close and are completely closed at a position such as indicated at H in FIG. 7A. They remain closed around to position F, then open. The upper heads start to close at a position J, and are completely closed at a position K as shown in FIG. 7A, remain closed around to position F, and then open.

Suitable mechanism, such as cam-actuated mechanism, is provided for controlling the fillers 61 so that each filler starts delivering to a tube at position H and completes its delivery at position L.

The turret 50 rotates at a speed so related to the speed at which tubes T are formed and fed to the end 49 of the mandrel 35 and is so phased in relation to the tube feed that, as each pair of grippers 59 on a rod 57 comes around to position D, the grippers engage the side of a tube on the end of the mandrel. The grippers, at position D, are in their horizontal tube take-off position, and a vacuum is drawn in the grippers so that they grip the tube and carry it off the end of the mandrel, with the tube positioned horizontally between the upper and lower sealing heads 1 and 3 at the respective turret station 55. At position D, both the upper and lower sealing heads are open. At position E1, the rod 57 starts turning to swing the grippers and the tube T gripped by the grippers to upright position. The swing to upright position is completed as the tube reaches position E2. This brings the upper end of tube T between the upper pair of heads 1 and brings the lower end of tube T between the lower pair of heads 3. At position G, slightly before the swing of the tube to upright position is completed, the lower sealing heads 3 start to close, and they complete their closing movement at position H after completion of the swing of the tube to upright position. The lower heads are then effective to form the transverse seal S2 across the lower end of the tube, and remain in their closed sealing position all the way around to position F, which affords time for sealing with relatively low heat to form a good seal.

At position H, the filler unit 61 for the respective turret station 55 is actuated to start the filling of the tube. The filling operation proceeds around to position L, which affords ample time for delivery such as to avoid splashing of the product (whether a liquid or a powder or a granulated product) onto the interior surface at the upper end of the tube. This avoids interference with production of a good seal at the upper end of the tube. The upper heads 1 start to close at position J, slightly before completion of the filling operation, and complete their closing movement at position K after completion of the filling operation. The upper heads are then effective to form the transverse seal S3 across the upper end of the tube, and remain in their closed sealing position all the way around to position F. This completes the formation of a tetrahedron-shaped package P. Then, the upper and lower heads are opened, the vacuum grip is released, and the package drops out through opening 53, slides down chute 65 onto conveyor 67, and is carried away by the latter.

It will be observed, particularly from FIGS. 2-5, that when a tube T is turned upright, its longitudinal seam S1 is so positioned that, in the completed package P, the longitudinal seam has its ends located between the ends of the transverse end seals S2 and S3 and crosses over the edge of the tetrahedron-shaped package that extends from one end of seal S2 to one end of seal S3. This maintains the longitudinal seam flat against the outside of the package.

While the invention is above described as it pertains to the forming, filling and sealing of tetrahedron-shaped packages, it will be understood that the principles of the invention are applicable to the forming, filling and sealing of packages of other shapes. For example, FIG. 9 illustrates the application of the invention to the forming, filling and sealing of flat packs. As shown therein, this may be accomplished simply by arranging the upper sealing heads 1 and the lower sealing heads 3 parallel to one another instead of at right angles to one another.

It will also be apparent that various types of seals other than seals S1, S2 and S3 may be used, also that tubes T could be segmented from continuous tubing, instead of segmenting web W into rectangular blanks and forming tubes T from the blanks. In this respect, the continuous tubing could be made from a continuous web, or could be extruded tubing alone, or extruded tubing with a continuous web wrapped around the tubing.

Now referring to FIGS. 10A-52, which illustrate the apparatus in detail, and first more particularly to FIGS. 10A-D, the tube-forming unit of the apparatus is designated in its entirety by the reference numeral 100 and the turret is again designated generally by the reference numeral 50. The tube-forming unit comprises a relatively long narrow table-like base frame 101 on legs 103 which are suitably secured to the floor. Base frame 101 has side panels 105, and side rails 107 extending inward at the upper edges of the side rails. Legs 103 extend down from the side panels. The latter close off a space accommodating a long horizontal shaft 109, which may be referred to as the cycle shaft, which extends lengthwise of the base frame between the side panels. In the operation of the machine, this cycle shaft is continuously driven at a generally constant speed. A first pair of web roll supporting brackets 111 extend rearward from what may be referred to as the rearward end of the base frame at the top thereof. These are adapted rotatably to support the shaft or arbor of a web roll R at their rearward ends, as indicated at 11. A second pair of web roll supporting brackets 113 extend rearward from the rearward end of the base frame below brackets 111. These are also adapted rotatably to support the shaft or arbor of a web roll R at their rearward ends, as indicated at 11. The purpose in providing the two pairs of web roll supporting brackets is to enable mounting of a second or reserve web roll in one of the pairs while web material is being withdrawn from a first or active web roll mounted in the other pair, and to enable quick attachment of the leading end of the web material of the reserve web roll to the trailing end of the web material of the active web roll. Any suitable braking means may be used for braking the arbor of the web roll from which web material is being withdrawn for web-tensioning purposes.

The afore-mentioned idler roller 13, draw rolls 15, and the cutter and anvil rolls 17 and 21 for segmenting the web into blanks B are part of a so-called cutoff and draw roll assembly, designated generally by reference numeral 115 (see FIGS. 10A and 11-13). This comprises a base plate 117 mounted on the side rails 107 of the base frame 101 adjacent the rearward end of the frame, and clamped thereto by clamping means such as indicated at 119 in adjusted position longitudinally as regards frame 101. Extending upward from the sides of the base plate 117 are side plates 121 and 123. Means for adjusting assembly 115 longitudinally on rails 107 (with clamps 119 loosened) is shown to comprise an adjusting screw 125 journalled in a bracket 127 extending down from base plate 117, having a handle 129, and threaded in a nut 131 carried by a plate 133 fixed to the base frame 101. The dotted line position of bracket 127 shown in FIG. 12 indicates the range of adjustment of assembly 115.

There are two draw rolls at 15, an upper roll 15a and a lower roll 15b. These are located immediately rearward of the cutter and anvil rolls 17 and 21 in relation to the forward feed of web W. A second pair of draw rolls is also provided, located immediately forward of the cutter and anvil rolls, the upper of these being designated 16a and the lower being designated 16b. Idler roller 13 is located at the rearward or entry end of assembly 15. The web W travelling from the active web roll R passes over idler roller 13, thence over a second idler roller 13a, between the first pair of draw rolls 15a and 15b, between the cutter and anvil rolls 17 and 21, and thence between the second pair of draw rolls 16a and 16b.

The pass plane of draw rolls 15, cutter and anvil rolls 17 and 21 and accelerator rolls 25 is horizontal, and idler rollers 13 and 13a are located so that the web passes thereover in this horizontal pass plane. Side plates 121 and 123 are notched out as indicated at 135 for reception of a rider roll 137 carried by arms 139 pivoted as indicated at 141 on the side plates. Arms 139 are weighted as indicated at 142 and the rider roll bears down on the reach of the web between idler rollers 13 and 13a, normally keeping this reach of the web slightly depressed. A normally open end-of-web switch 145 is mounted on the outside of side plate 123 (see FIG. 10A), and has an actuating arm 147 engaged by the respective arm 139 when the latter is down to hold switch 145 closed. It will be understood that web rolls are usually supplied with a tape holding the trailing (innermost) end of the wound web to the core of the roll. When the end of the web is reached, it remains attached to the core by the tape. This causes the web to become taut, thereby raising rider roll 137 and opening the switch 145, which deenergizes the main drive motor 506 (see FIGS. 10B and 10C) of the apparatus to stop the apparatus for splicing of the leading end of the reverse web roll to the trailing end of the exhausted active web roll.

It will be understood that other rider roll and end-of-web control arrangements may be used. For example, an arrangement may be used in which the trailing end of the web comes free from the core, thereby releasing the tension on the web, and this release of tension enables rider roll to drop and actuate a switch, the latter activating a time delay circuit which ultimately deenergizes the main drive motor after the apparatus has been completely cleared of packages made from the web. Or an arrangement may be used incorporating an automatic splicer for splicing the leading end of a fresh web to the trailing end of the exhausting web.

The idler roller 13a and the lower draw roll 15b are grooved for accommodation of lower web-supporting bars 149 and the upper draw roll 15a is grooved for accommodation of upper web-hold-down bars 151. Similarly, the lower and upper draw rolls 16b and 16a are grooved for accommodation of lower and upper bars 153 and 155 in continuation of bars 149 and 151 forward of the cutter and anvil rolls. The upper draw rolls 15a and 16a are each carried by arms 157 pivoted at 159 on the inside of side plates 121 and 123 so that they may be swung upward away from the respective lower draw rolls 15b and 16b. Springs 161 reacting from spring seats 163 provided on the side plates bias the upper rolls 15a and 16a down toward the respective lower rolls 15b and 16b. For swinging the upper rolls 15a and 16a upward away from the respective lower rolls, two cam rods 165 are provided extending across the side plates, these rods carrying cams such as indicated at 167 engaging arms 157 and each rod having a handle 169 for turning it. The main purpose for having upper rolls 15a and 16a movable away from the respective lower rolls 15 and 25 is that these rolls are preferably rubber-covered rolls, and should be separated when the apparatus is idle for any length of time to prevent flats from forming on the rubber roll covers.

Cutter and anvil rolls 17 and 21 are adapted for rotary crush cutting of the web. Cutter roll 17 carries two cutter knives 19 spaced at 180° intervals therearound, the knives being clamped to the roll as indicated at 173. Anvil roll 21 is a hard steel cylindric roll.

Draw rolls 15a, 15b, 16a, 16b and the cutter and anvil roll 17 and 21 are driven from the cycle shaft 109, the drive for the draw rolls including a transmission designated in its entirety by reference numeral 175. This is a so-called double differential transmission, such as a Model 2DD Style ICW–A transmission sold by Electronic Machine Parts, Inc., of College Point, N.Y., mounted on base plate 117 of assembly 115. It has an input shaft 177 and an output shaft 179, and essentially includes two speed change mechanisms (each of a differential gear type) for varying the speed of the output shaft relative to the speed of the input shaft. The first of these speed change mechanisms is manually adjustable via an adjusting knob 180 for manually setting in a first speed correction, with knob 180 adjustable from a "zero" setting wherein the speed of the output shaft 179 is normally equal to the speed of the input shaft to a "maximum correction position" wherein the speed of the output shaft 179 is about 97% of the speed of the input shaft. The second of these speed change mechanisms is operable by an electric motor 181 for automatically setting in a second speed correction, superimposed on the stated first speed correction, under control of a scanner 183 of the reflective electric eye type. This scanner 183 is mounted on a rod 185 spanning side plates 121 and 123 for adjustment to various positions transversely of the web, and scans the web just prior to entry of the web into draw rolls 15. Scanner 183 is of a conventional type including a lamp for directing a beam of light on the web and photocell means for receiving light reflected from the web. As previously mentioned, the web may be (and usually is) preprinted with label indicia recurring at package length intervals, and it is important that registration be maintained as between the indicia and the cuts made by the knife roll so that the cuts are made between the recurrent label indicia. Scanner 183 is mounted on rod 185 in position to scan for marks M (see FIG. 51) printed on the web at package length intervals and to actuate motor 181 to set in the second speed correction, when called for by any out-of-registration of the marks with the cutoff effected by cutter 17. The two speed corrections are provided to take care of inaccuracies in the original printing of a web and stretching or shrinking of a web due to atmospheric conditions. Knob 180 is adjustable as required to obtain the exact package length desired.

The input shaft 177 of transmission 175 is driven from the cycle shaft 109 in one-to-one ratio with cycle shaft via a first chain and sprocket drive 187, a miter gear box 189 and a second chain and sprocket drive 191. The sprocket of drive 187 on cycle shaft 109 is axially slidable on shaft 109 to enable longitudinal adjustment of assembly 115 (see FIG. 10A). Drive 191 connects to one end of input shaft 177 via a slot 193 in base plate 117. A gear train 195 (see FIG. 13) connects the other end of the input shaft 177 and the cutter and anvil rolls 17 and 21 for positively driving the latter at the speed of the input shaft. This gear train is located on the outside of side plate 121 in a housing 197. A gear train 199 (see FIGS. 10A and 11) including change gears 199A and 199B connects the output shaft 179 and draw roll 15b. This gear train is located on the outside of side plate 123 in a housing 201 having a removable cover plate 203 for access to the change gears. From gear 199A, there is a gear train including an idler gear 205 for driving draw roll 16b at the same speed as draw roll 15b. From the cutter roll 17 there is a chain and sprocket drive 207 (see FIG. 13) to the shaft 209 of a selector switch 210 constituting part of the scanner system.

From the above, it will appear that the cutter and anvil rolls 17 and 21 are positively driven at a constant speed related to the speed of the cycle shaft 109. Selector switch 210 is driven from the cutter roll at a related speed. Draw rolls 15b and 16b are positively driven from the output shaft 179 of transmission 175 at a speed which is (a) generally determined by the change gears used at 199A and 199B; (b) manually variable by adjustment of knob 180 of transmission 175; and (c) automatically variable by operation of motor 181 in response to detection of an out-of-registration condition by the scanner system. Gears are changed at 199A and 199B to drive the draw rolls at speeds corresponding to the speeds required for cutting blanks B of different lengths to make packages if different lengths (from four and one-half inches to eight inches, for example).

The scanner system is of a type conventionally used in rotary type web cutoff apparatus for proper registration of cut relative to marks on the web. In general, as appears in FIG. 51, it includes in addition to the transmission 175, scanner 183 and selector switch 210, a control unit CU. Switch 210 has a rotor driven (as will appear from FIG. 10A) in two to one ratio with respect to the knife roll. Upon each revolution of the switch rotor (corresponding to half a revolution of the double-bladed knife roll), the system is conditioned to sense whether or not a mark M is in registration with the scanner 183. If not, motor 181 of transmission 175 is energized to vary the speed of the draw rolls 15b and 16b for correction of registration. The characteristics of the selector switch 210, scanner 183 and control unit CU will be readily understood by those skilled in the art. The switch 210, scanner 183 and control unit may be commercial items, such as are obtainable from Electronic Machine Parts, Inc. above mentioned.

The rotary dies 27 are part of a so-called rotary die assembly generally designated 211 (see FIGS. 10A and 14–16) for forming a pattern of lines of perforation in blanks B issuing from the cutoff and draw roll assembly 115 for the purpose of providing an easy-opening end or tear-off corner on each package formed by the apparatus. As shown, this pattern is a chevron pattern for providing a tear-off corner, but it will be understood that a straight-line pattern across the blank may be formed to provide a tear-off end construction as distinguished from a tear-off corner construction. By a tear-off end construction is meant one in which there is a line of perforations in each wall of the package adjacent to and inward of one end seal and extending across the package, enabling this end seal to be completely torn off. This rotary die assembly comprises a base plate 213 mounted on the side rails 107 of the base frame 101 immediately forward of the cutoff and draw roll assembly 115, and clamped thereto by clamping means such as indicated at 215. Extending upward from the sides of the base plate 213 are side plates 217 and 219. There are two rotary die members, an upper die roll 27a and a lower anvil roll 27b.

The anvil roll 27b is a hard steel roll which idles in bearings 221 eccentrically mounted in circular bearing blocks 223 received in circular holes in the side plates 217 and 219. These blocks are rotatable in their holes in the side plates for vertical adjustment of the anvil roll, being fastened to the side plates by screws 225 which are removable to permit rotation of the blocks.

The upper die roll comprises a drum 227 secured on a shaft 229 journalled in bearings in the side plates 217 and 219. This drum has flats 231 at diametrically opposite sides. At the ends of the drum are rubber-covered disks 233, the rubber covers 235 of which are of larger outside diameter than the outside diameter of the drum and which engage the anvil roll 27b. Secured on each flat 231 is a tool steel die block 237 having an arcuate outer surface 239 centered in the axis of shaft 229 and on the diameter of the outside diameter of the drum. These die blocks are located toward one end of the drum. Projecting outward from the arcuate surface of each die block are lines of teeth 241 for punching a dual chevron pattern of perforations in each blank B without perforating completely through the blank. Thus, in the case where web W consists of a layer of paper Pa and layers of aluminum foil Al, for example, with coating C of polyethylene on one face (see FIG. 16B), teeth 241 project from the arcuate surface of the die blocks only to such an extent as to punch only through the paper and metal foil layers but not through the polyethylene coating C (see FIG. 16B). In this respect, the depth of punch may be accurately controlled by adjustment of anvil roll 27b as above described. A blank B with the resultant chevron pattern of lines of perforations is illustrated in FIG. 16C, the pattern being designated 241a (corresponding to the pattern of teeth 241). As will appear from FIG. 16C, the rotary die assembly 211 accomplishes perforation of this pattern at one end of each blank B, with the lines of perforations extending from the apex of the chevron pattern to this end of the blank, and with the pattern offset toward one side of the blank in position for the apex of the pattern ultimately to be positioned on one of the longitudinal edges of the tetrahedron into which the blank is ultimately formed.

Rotary die assembly 211 also includes the aforementioned accelerator rolls 25 and the transfer rolls 29. There are two rolls at 25, an upper roll 25a and a lower roll 25b; and there are two rolls at 29, an upper roll 29a and a lower roll 29B. These are identical to the draw rolls 15a, 15b, 16a, 16b of the cutoff and draw roll assembly 115. Rolls 25a and 25b are located rearward of the rolls 27a, 27b; rolls 29a and 29b are located forward of rolls 27a, 27b. The upper rolls 25a and 29a are each carried by arms 247 pivoted at 249 on the inside of side plates 217 and 219 so that they may be swung upward away from the lower rolls 25b and 29b. Springs 251 reacting from spring seats 253 provided on the side plates bias the upper rolls 243 and 245 down toward the lower rolls 243 and 245. For swinging the upper rolls away from the lower rolls, two cam rods 255 are provided extending across the side plates, these rods carrying cams such as indicated at 257 engaging arms 247 and each rod having a handle 259 for turning it.

The upper die roll and the lower rolls 25b and 29b are driven from the cycle shaft 109 by a chain and sprocket drive 261, a speed reducer miter gear box 263, and a chain and sprocket drive 265 taken off the output shaft of box 263 and trained around sprockets on upper die roll shaft 229 and the lower rolls, and around adjustable chain guides 267 mounted on side plate 217. Roll 25b is of such diameter and is driven at such speed relative to the draw rolls 15a, 15b, 16a, 16b as to effect acceleration of each blank so that it becomes spaced from the next successive blank.

From the above, it will appear that web W is pulled from the active roll R by draw rolls 15a and 15b and fed forward between the cutter roll 17 and anvil 21. The cutter roll 17 (carrying the two knives 171 angularly spaced 180°) functions on each half revolution thereof to cut the web W completely across its width, thereby to segment blanks B from the web. With scanner 183, the cuts are always made between the recurrent printed indicia on the web, so that accurate registration of the printed indicia relative to each blank is insured. The speed of the draw rolls, and hence the speed of the web feed, and the resultant length of the blanks B is determined by the size of the change gears used at 199A and 199B. Thus, for longer blanks B, change gears are used at 199A and 199B which provide for faster web feed; for shorter blanks B, change gears are used at 199A and 199B which provide for slower web feed. The web feeding forward from between the cutter and anvil rolls enters the second pair of draw rolls 16a and 16b, and a blank is segmented therefrom while the forward end of the web is caught in the nip of the draw rolls 16a, 16b. The latter feed each segmented blank forward into the nip of the accelerator rolls 25a, 25b. Assembly 115 is longitudinally adjusted on base frame 101 in accordance with the length of blanks B being cut (i.e., the package length) so that the leading end of each blank is caught in the nip of accelerator rolls 25a, 25b as its trailing end exits from draw rolls 16a, 16b. Thus, in the case of an eight-inch package length (meaning that blanks B are eight inches long), assembly 115 is set in a position where rolls 25a, 25b are spaced from rolls 16a, 16b approximately eight inches. This setting is illustrated in solid lines in the drawings. In the case of a four and one-half inch package length, assembly 115 is set in a position where rolls 25a, 25b are spaced approximately four and one-half inches from rolls 16a and 16b. This would be the moved position of assembly 115 illustrated by the dotted line position of bracket 127 in FIG. 12. For the apparatus shown, eight inches is the maximum package length and four and one-half inches is the minimum package length. When the leading end of each blank is caught in the nip of the accelerator rolls 25a and 25b, it is accelerated by the latter so that it becomes spaced to some extent from the next successive blank, whereby successive blanks issuing from the rotary die assembly 211 are uniformly spaced (one-half inch, for example).

Figure 10B:
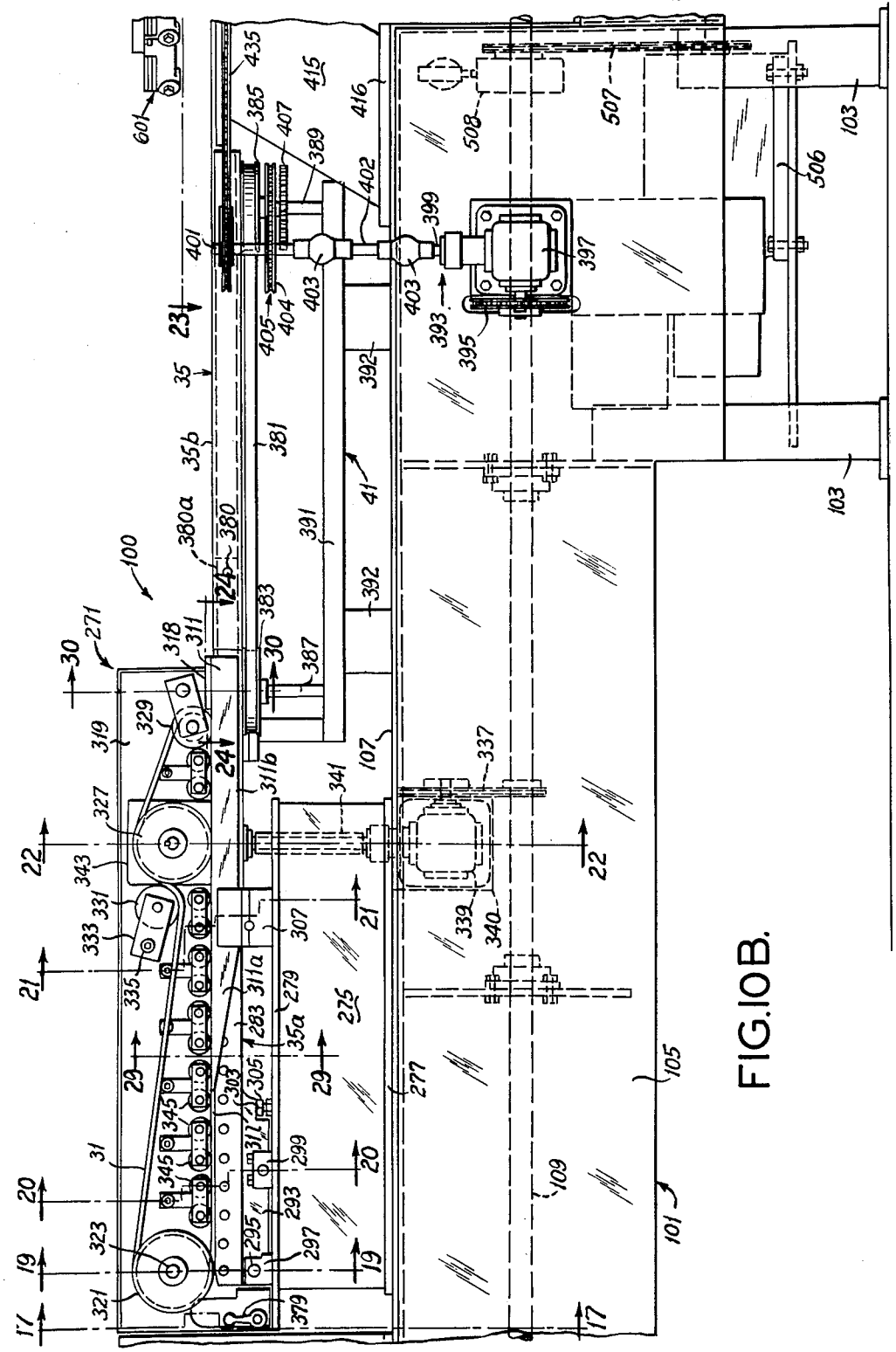
FIG. 10B is a continuation of FIG. 10A.
Figure 14:
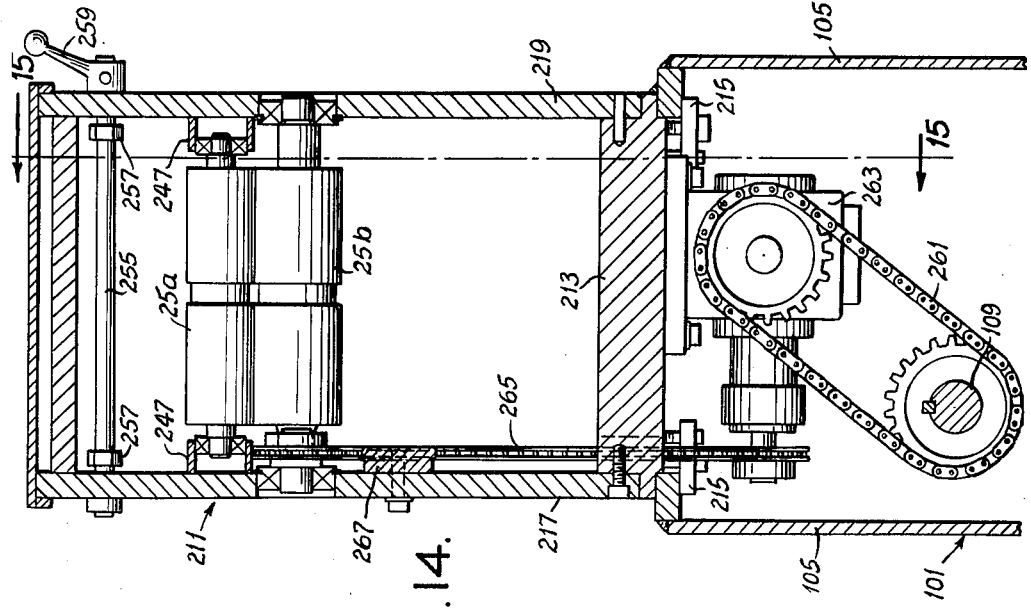
FIG. 14 is a vertical transverse section taken on line 14—14 of FIG. 10A.
Figure 13:
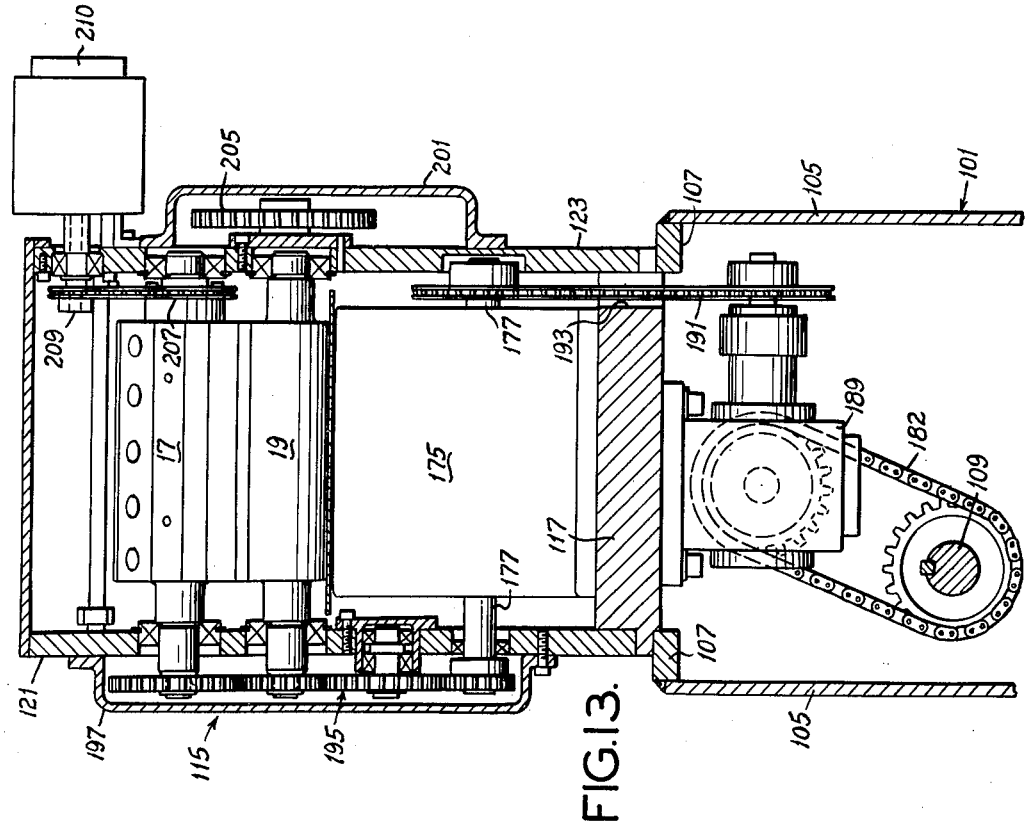
FIG. 13 is a vertical transverse section taken on line 13—13 of FIG. 10A.

As previously stated, according to FIG. 8, transfer rolls 29a and 29b feed the blanks B between upper and lower belt conveyors 31 and 33 which carry them over the horizontal cantilevered mandrel 35. The apparatus as shown in FIGS. 10A–C includes upper belt conveyor 31, but, instead of utilizing a lower belt conveyor, conveyor rollers are provided in the mandrel 35 as will appear. The belt conveyor 31 and the mandrel 35 are part of a so-called tube forming assembly, generally designated by reference character 271 (see particularly FIGS. 10B, 17–24, 29 and 30) which forms blanks B into tubes T around the mandrel. This assembly 271 comprises side plates 273 and 275 each having a bottom flange such as indicated at 277, these bottom flanges being secured on side rails 107 of the base frame 101, and a table plate 279 on the side plates. The mandrel 35 has its rearward end secured to table plate 279 and projects forward in cantilever fashion beyond the table plate. The mandrel is of built-up construction, having a rearward section 35a comprising an assembly of a central vertical plate 281 and side members 283 of part-cylindrical cross section. In the assembly, the external curved surfaces of the side members lie on the surface of a cylinder having a diameter corresponding to the diameter of the tubes T to be formed.

The central plate 281 of the rearward section 35a of the mandrel has a scalloped upper edge as indicated at 285 in FIG. 18 for the accommodation of conveyor rollers 287 between the side members 283 of the mandrel with the tops of these rollers flush with the top of the mandrel. The rollers have axles 289 received in holes 291 in the side members. Plate 281, toward its rearward end, has a web portion 293, of greater depth than the remainder of the plate, which extends down below the mandrel side members 283. This deeper web portion 293, at the rearward end of the mandrel, is mounted on a horizontal pivot bolt 295 spanning a U-shaped block 297 mounted on the table plate 279 (see FIGS. 18 and 19). Forward of block 297, the table plate 279 carries a pair of lugs 299 having clamp screws 301 threaded therein for clamping the web portion (see FIGS. 18 and 20). Forward of these lugs, the web portion is stepped upward as indicated at 303, this step 303 engaging an adjusting screw 305 threaded in the table plate 279. By loosening clamp screws 301 and adjusting screw 305, adjustment of the mandrel around the horizontal axis of bolt 295 may be effected, after which screws 301 are tightened to lock the mandrel in position.

Forward of the adjusting screw 305, table plate 279 carries a pair of blocks 307 (see FIGS. 10B and 21) located in vertical planes on opposite sides of the mandrel. Secured on top of these blocks are angle-section supports 309 which carry elongate tube-forming plow members 311 on opposite sides of the mandrel. These plow members or formers extend rearward and forward from supports 309. Each plow member has a tapered rearward end portion 311a which increases in depth from the rearward end of the plow member to the portion of the plow member attached to the respective support 309 (see FIG. 10B), and a forward portion 311b of uniform depth. Each plow member has an arcuate inner surface 313 (see FIG. 29) which matches the curve of the exterior of the respective mandrel side member 283, and extends from the top side of side member 283 around the outside of the latter. The depth of forward portion 311b of each plow member is such that it extends around the respective mandrel member nearly to the bottom of the latter, leaving a space at the bottom of the mandrel where the side margins of blanks B formed into tubes T around the mandrel by the plow members may come into inside face-to-face engagement forming a fin (designated S1 in FIG. 30 since this fin becomes the longitudinal tube seam S1) projecting downward from the bottom of the mandrel. The edges of the plow members at the top of the mandrel are spaced apart to provide a channel 317 for accommodation of the lower horizontal reach 31b of the endless belt 31. A strap 318 spans the plow members at their forward (exit) ends.

A conveyor-supporting plate 319 is secured to side plate 273 and extends upward therefrom above the table plate 279. The belt 31 is trained around a rearward pulley 321 mounted on a shaft 323 journalled in a bearing 325 on plate 319, around an intermediate pulley 327 which constitutes a drive pulley, and a forward pulley 329, these pulleys being located so that the lower horizontal reach 31b of the belt travels over and in engagement with the conveyor rollers 287 of the mandrel. Pulley 329 is carried by plate 319 adjacent the forward (exit) ends of the plow members 31, and is of smaller diameter than pulleys 325 and 327. A belt-tensioning pulley 331 is provided on an arm 333 pivoted at 355 on plate 319 for effecting driving engagement at the belt with the drive pulley 327. The latter is driven from the cycle shaft 109 via a chain and sprocket drive 337 to a miter gear box 339 mounted on a bracket 340, and a vertical shaft 341 from gear box 339 to a gear box 343 mounted on plate 319. The output shaft of box 343 carries pulley 327. The lower reach 31b of belt 31 is pressed down against rollers 287 by spring-loaded pairs of rollers 345. Each pair of rollers 345 is carried by an arm 347 pivoted at 349 in a bracket 351 on plate 319, and biased by a spring 353 to swing the pair of rollers downward for spring-loading the lower reach of the belt.

Block 297 is spaced somewhat forward of the rearward end of the table plate 279. Mounted on the table plate at its rearward end is a block 355 which extends transversely of the table plate. Side plates 357 are attached to the ends of this block. A shaft 359 carrying a pair of upper rubber feed rolls 361 is journalled in these side plates and extends out through a hole in plate 319. Shaft 359 and rolls 361 thereon are driven in blank-feeding direction by a belt and pulley drive 363 from the shaft 323 which carries the rearward pulley 321 for belt 31. Arms 365 pivoted at 367 on the block 355 carry lower feed rolls 369, and are biased by springs 371 to swing rolls 369 up toward rolls 361. For swinging rolls 369 away from rolls 361 when the apparatus is shut down to prevent flattening or rolls 361, a cam rod 373 is provided, this rod being mounted in side plates 357 and carrying cams 375 engaging arms 365 and having a handle 379 for turning it.

The rearward section 35a of the mandrel 35 terminates somewhat forward of the forward end of the plow members 311. In continuation of the rearward section 35a, the mandrel has a first, second and third intermediate sections 35b, 35c and 35d, and the aforementioned outer (free) end section 49. The first intermediate mandrel section 35b is an elongate tubular section secured at its rearward end as indicated at 380 on a reduced forward end extension 380a of the rearward mandrel section 35a. It extends through the aforementioned heat-sealing device or unit 41 for sealing together the longitudinal margins of each blank formed into a tube T around the mandrels thereby to form the longitudinal tube seam S1 on each tube T. As particularly shown in FIGS. 10B, 23 and 24, the longitudinal tube seam sealing unit is a band sealer type of unit, such as a "Doughboy" Model CBS–CH continuous band sealer. Essentially, this band sealer comprises a pair of endless steel bands, each designated 381, and which are heated by being in heat-exchange relation with heater bars such as represented at 382 in FIG. 24. Each band is trained around a rearward pulley 383 and a forward pulley 385. Each rearward pulley 383 is carried by a vertical shaft 387 and each forward pulley 385 is carried by a vertical shaft 389, these shafts being carried by a support 391. The pulleys are located so that the bands 381 have contiguous reaches 381a which extend on opposite isdes of the central vertical plane of mandrel section 35b immediately adjacent this plane and directly below mandrel section 35b for contacting the aforementioned downwardly projecting fin of each tube T and applying heat and pressure thereto for forming the longitudinal tube seam. Support 391 is carried by mounting blocks 392 on the rails 107, and by use of different blocks or by using suitable adjusting blocks, unit 41 may be positioned at different heights.

The bands 381 of the longitudinal tube seam heat-sealing unit 41 are positively driven in tube-feeding direction from the cycle shaft 109 by a drive generally designated 393 (see FIGS. 10B, 23, 25, 26 and 28).

This comprises a chain and sprocket drive 395 from the cycle shaft 109 to a speed reducer miter gear box 397 mounted on the outside of side panel 105 of the base frame 101. Gear box 397 has an upwardly extending output shaft 399 which is coupled to an upper vertical shaft 401 generally in line therewith by an intermediate shaft 402 and flexible couplings 403. Shaft 401 carries a sprocket 404 of a chain and sprocket drive 405 for driving one of the band sealer pulleys 385. Shafts 389 of pulleys 385 are geared together as indicated at 407 so that both bands 381 are positively driven at the same speed. When changing the height of unit 41, sprocket 404 is loosened from shaft 401, then retightened.

The band sealer unit 41 is so located that the trailing (rearward) ends of the opposed contiguous reaches of the bands 381 lie below the leading (forward) end of the plow members 311 (see FIG. 10B). Accordingly, somewhat before each tube T formed around the mandrel 35 by the plow members 311 starts to exit from the plow members, the aforementioned downwardly projecting fin on the tube T enters between the reaches 381a of the bands 381. As previously mentioned, these apply heat and pressure to the fin to form the longitudinal tube seam S1 and, additionally, function to feed each tube forward. The speed of the bands is equal to the sped of belt 31, and the spacing of the tubes is maintained. If desired, slitting means (not shown) may be provided under the plow members to trim the side edges of the blanks to insure exact register thereof in the fin.

The chain conveyor 43 shown in FIGS. 7A, 8 and 8A does not appear in FIG. 10B, its function being served by the bands 381. As the tubes T exit from band sealer unit 41, their forward fed along the mandrel 35 is continued by the chain conveyor 45 (see FIGS. 10B, 10C, 23, 25, 26 and 28). This comprises a conveyor plate 413 which extends forward from the forward end of the band sealer unit in a horizontal plane at one side of the mandrel. Plate 413 seats on a support plate 414, the assembly 413, 414 being mounted at its rearward end on a bracket 415 which extends up from a base plate 416 mounted on rails 107 at their forward ends. Plate 413 cantilevers forward from bracket 415 into the turret 50. The first intermediate mandrel section 35b extends somewhat past the band sealer unit 41. The second intermediate mandrel section 35c is a short section, having an intermediate cylindric section, having a diameter corresponding to the outside diameter of mandrel section 35b, and slotted reduced-diameter ends which are received in the forward end of mandrel section 35b and the rearward end of mandrel section 35d (the later being a tubular section like 35b). Mandrel section 35d reaches nearly to the forward end of plate 413, and the mandrel free end section 49 continues on somewhat past the forward end of plate 413 (see FIG. 23). Section 49 has a slotted reduced-diameter rearward end which fits in the forward end of section 35d, and an annular groove 49a. Its forward end is bevelled off as indicated at 49b. Where the plate 413 extends alongside mandrel sections 35b, 35c, 35d and 49, the latter have a flat on their side toward plate 413 as indicated at 417.

At the rearward end of plate 413 is a bracket 419 in which shaft 401 is journalled. On shaft 401 is a sprocket 421. At the rearward end of plate 413 alongside bracket 419 is another bracket 423 in which is journalled a vertical shaft 425 carrying a sprocket 427. At the forward end of plate 413 is a bracket 429 in which is journalled a vertical shaft 431 carrying a sprocket 433. Sprockets 421, 427 and 433 are located in the horizontal plane of plate 413. An endless chain 435 is trained around these sprockets and has lugs 437 projecting laterally outward therefrom spaced at intervals along the length of the chain corresponding to the spacing of tubes T exiting from the band sealer unit 41. The reach 435a of the chain between sprockets 427 and 433 travels forward alongside the mandrel 35, and the lugs 437 of the chain 435 in this reach are adapted to engage the rearward ends of the tubes T (as permitted by the flat 417 on the mandrel) and push the tubes forward, maintaining the previously established spacing of the tubes.

Means is provided for folding the longitudinal tube seam S1 of each tube T (completed by the band sealer unit 41) against the outside of the tube. This means comprises prefolding rolls 439 and 441 (see FIGS. 23, 26 and 28) for initiating folding over of the seam and a final folding roll 443 (see FIGS. 27 and 28) for completing the folding and flattening the seam against the outside of the tube. Rolls 439 and 441 are bevel-edge rolls, roll 439 being rotatable on a horizontal axis below the mandrel and roll 441 being rotatable on a vertical axis alongside the mandrel. Roll 443 is rotatable on a horizontal axis below the mandrel section 35c, and has a grooved rubber rim mating with a roller 449 in a vertical slot 450 in mandrel section 35c. Rolls 439 and 443 are positively driven by a chain and sprocket drive 451 taken off the cycle shaft 109, a miter gear box 453, and a chain and sprocket drive 455 including sprockets 457, 459 and 461 on the output shaft of box 453, the roll 439, and the roll 443, respectively. Supporting means for rolls 439, 441 and 443 and for box 453 is indicated at 463.

The turret 50 is shown in FIGS. 10C and 10D, the latter showing the upper part of the turret. As shown best in FIGS. 31 and 32, the turret is rotatable about a fixed vertical tubular center post 471. This post extends upward from a turret base generally designated 473, and comprising a platform 475 on legs 477 which are secured to the floor. The post extends down for some distance through a center hole 479 in the platform into a sleeve 481 extending down from the platform, the sleeve being braced by web plates such as indicated at 483. The upper and lower ends of the tubular post have closure disks 485 and 487, respectively, welded therein.

A quill 489 is rotatable on center post 471 immediately above the platform, a thrust bearing 491 being provided at the lower end of the quill and a sleeve bearing 493 being provided at the upper end of the quill. Fixed on the upper end of the quill is a circular gear plate 495 carrying an internal ring gear 497 on its bottom. In mesh with ring gear 497 is a pinion 499 on the upwardly extending output shaft of a miter gear box 501 mounted on platform 475. The cycle shaft 109 has its forward end journalled in a bearing 502 in a forward end plate 503 on base frame 101. The cycle shaft 109 is connected to the horizontal input shaft of the gear box 501 by a shaft section 504 and two universal joints 505. The cycle shaft is adapted to be continuously driven by variable speed main drive motor 506 via a chain and sprocket drive 507 and an overload release clutch 508. Thus, turret 50 is continuously driven from the cycle shaft 109 via shaft section 504, box 501, pinion 499 and gear 497. The arrangement is such that the cycle shaft 109 makes one revolution for each package produced. Thus, for a production rate of three hundred packages per minute, the cycle shaft is driven at a speed of 300 r.p.m. The gearing to the turret 50 is such that with the turret having sixteen stations as herein described, the turret rotates one-sixteenth of a revolution for each revolution of the cycle shaft 109. Thus, for a production rate of three hundred packages per minute, the turret rotates at a speed of 18.75 r.p.m.

The aforementioned upper turret plate 51 is rotatable around the center post 471, and also axially slidable vertically relative to the post. For this purpose, plate 51 has a center hole receiving a retainer ring 511 fastened by screws 513 to the bottom of a collar 515 which is axially slidable but nonrotatable on post 471 at its upper end. A key for holding the ring and collar against rotation, while permitting them to slide axially, is indicated at 517. Ring 511 is shouldered at 519 centrally to support plate 51 while permitting it to rotate.

Figure 31:
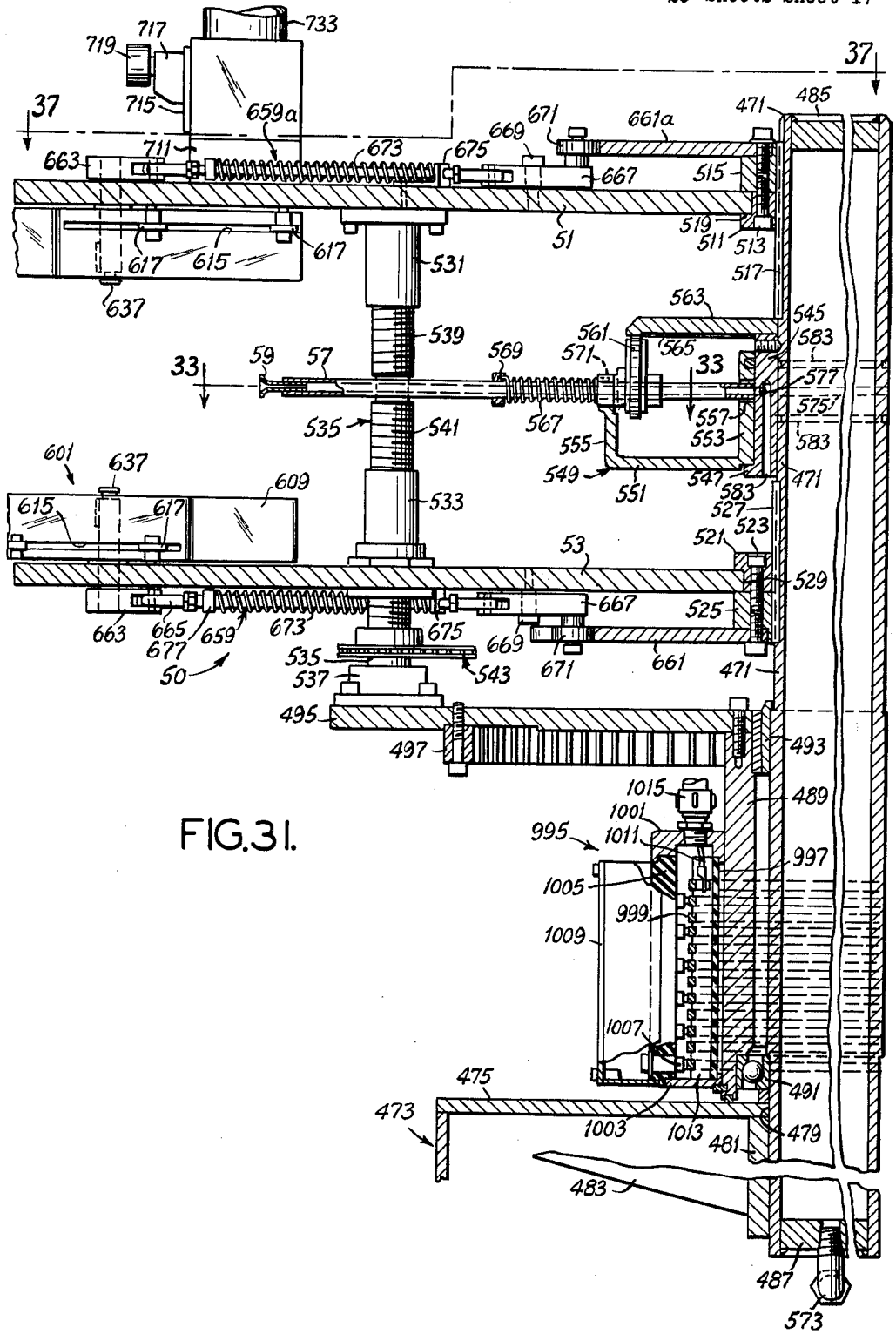
FIG. 31 is an enlarged vertical section taken on line 31—31 of FIG. 10C, showing one half of a rotary turret of the apparatus.
Figure 46:
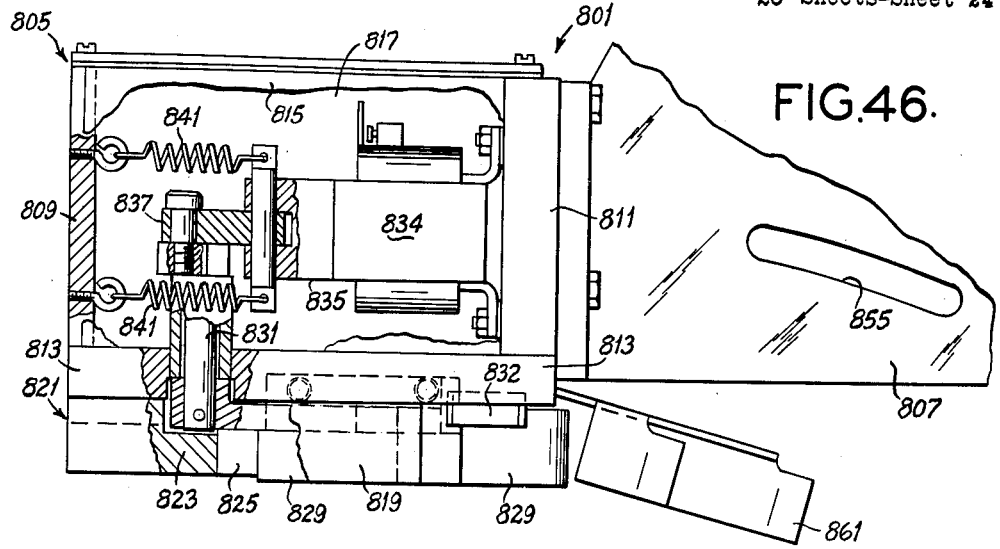
FIG. 46 is a plan of FIG. 44 with parts broken away and shown in section.
Figures 47, 48:
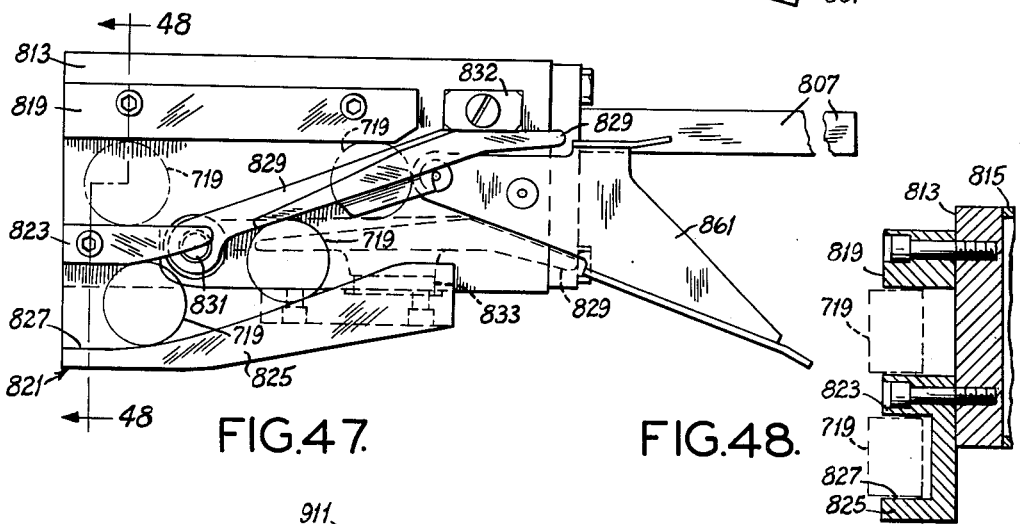
FIG. 47 is a front elevation of FIG. 46.
FIG. 48 is a vertical section taken on line 48—48 of FIG. 47.

The aforementioned lower turret plate 53 is also rotatable around the center post, and axially slidable vertically relative to the post. For this purpose, plate 53 has a center hole receiving a retainer ring 521 fastened by screws 523 to a collar 525 which is axially slidable but nonrotatable on the post just above the gear plate 495. A key for holding the ring and collar against rotation while permitting them to slide axially is indicated at 527. Ring 521 has a peripheral groove at 529 receiving plate 53, the latter bearing on collar 525. Plate 51 has four internally threaded studs 531 extending downward therefrom spaced at 90° intervals around the plate and vertically aligned with four oppositely internally threaded studs 533 which extend upward from plate 53. Turret plate adjusting shafts 535 extend from pillow blocks 537 on gear plate 495 through these studs, each shaft having an upper portion 539 threaded in the respective upper stud and an oppositely threaded lower portion 541 threaded in the respective lower stud. The arrangement is such that by turning shafts 535 one way or the other in unison, plates 51 and 53 may be brought closer together (for operation on shorter tubes T) or moved farther apart (for operation on longer tubes T). FIG. 31 shows plates 51 and 53 in their position of maximum separation for operation on tubes T of maximum length. For turning shafts 535 in unison, they are coupled together by a chain and sprocket drive 543, and one of the shafts 535 is formed with a hexagonal portion for application of a wrench to turn it, thereby to turn all the shafts.

A collar 545 is fastened on the center post 471 between plates 51 and 53. This has a flange 547 at its lower end rotatably supporting a hub 549 which carries the aforementioned tubular rods 57. The latter extend radially outward from hub 549 like the spokes of a wheel. Hub 549 has a circular bottom 551, a central sleeve 553 extending up from the bottom having a rotatable fit on collar 545, and an annular peripheral wall 555 extending up from the bottom. Sleeve 553 has sixteen holes 557 spaced at equal intervals therearound, and wall 555 has sixteeen corresponding holes 559 radially aligned with holes 557. The rods 57 are journalled for rotation on their longitudinal axes in these holes, extending radially outward from wall 555. While in connection with the description of FIG. 7A, reference is made to a pair of vacuum grippers or suction cups 59 at the end of each rod 57, as shown in FIGS. 31–34, only one suction cup 59 is used at the outer end of each rod 57, each cup being a rubber cup having a tubular stem inserted in the end of the rod. A pin 560 (see FIG. 32) extends up from plate 53 through a hole in the bottom of hub 549, being slidable therein.

Each of the rods 57 (which may be referred to as the tube-carrier rods since they carry tubes T at their outer ends around with the turret) has a cam follower 561 fastened thereon immediately inward of wall 555. Each cam follower is of circular form, eccentrically mounted on the respective rod 57. Secured on the upper end of collar 545 is an end cam 563 having a cylindric cam formation 565 extending downward at its periphery engageable by the cam followers.

In FIG. 33, there is indicated at D (the same as in FIG. 7A) the initial or tube take-off position of the turret. This lies on a radius of the turret at right angles to the mandrel 35, i.e., at right angles to the path of tubes T being fed to the turret. In the apparatus in FIGS. 10A–D, the position E1, E2, etc. vary somewhat from the positions E1, E2, etc. shown in FIG. 7A, as will become apparent.

Cam formation 565 is so developed and phased that as each rod 57, rotating counterclockwise with the turret as viewed from above, approaches position D, the rod is in an angular position relative to its longitudinal axis which may be referred to as its tube-horizontal position. As each rod 57 comes around into position D, the suction cup 59 on the outer end of the rod engages and presses to some extent against a tube T which in the meantime has arrived at the transfer position at the forward end 49 of the mandrel. The tube T, which is in horizontal position, is thereupon gripped to the end of the rod 57, and as the rod is carried on past position D, it carries the tube off the end of the mandrel. The bevel at 49b facilitates this. The cam formation 565 has what may be termed a cam rise or downwardly inclined edge portion 565a (see FIGS. 37 and 38) starting at position E1 such as to cause each rod to start turning on its axis at position E1. This rise is such as to effect turning of the rod through 90° on its longitudinal axis, completing this at position E2. This effects turning of the tube T gripped to the suction cup on the outer end of the rod from horizontal to upright position. The cam formation then has a section 565b of uniform (and full) depth extending around from position E2 to a position E3, such that each rod remains in tube-upright position from position E2 to position E3. At position E3, there begins a cam fall 565c which continues to position E4. This fall is such that as each rod travels from position E3 to position E4, the rod is turned on its longitudinal axis back to its said tube-horizontal position. From E4 back to E1, the cam formation 565 has a shallow-depth section 565d. As appears in FIG. 37, position E1 is 18° counterclockwise from position D, E2 is 40½° counterclockwise from position D, E3 is 229½° counterclockwise from position D, and E4 is 252° counterclockwise from position D. Each rod is biased to rotate on its axis in the direction for maintaining the respective cam follower in engagement with the downwardly facing edge of the cylindric cam formation by a torsion spring 567 having one end fastened at 569 to the rod and its other end fastened at 571 to hub 549.

Vacuum is adapted to be maintained in the tubular center post 471 by a connection as indicated at 573 to a vacuum pump 574 (see FIG. 10C). The collar 545 on the center post has peripheral grooves 575 and 577 in the horizontal plane of rods 57 (see FIGS. 31 and 33). Groove 575 extends 253° around the periphery of the collar, its trailing end leading position D by 25°, and its leading end being 228° around counterclockwise from position D. Groove 577 starts 17° around counterclockwise from the leading end of groove 575 and extends 50° around the periphery of the collar. Groove 575 is in communication with the interior of the center post 471 via holes such as indicated at 579 in the collar registering with holes such as indicated at 581 in the center post. Groove 577 is open to atmosphere via a passage as indicated at 583. The arrangement is such that, upon rotation of the hub 549, vacuum is drawn in each rod 577 as its inner end traverses groove 575, the vacuum being dissipated as its inner end traverses groove 577. Sealing rings 583 are received in annular peripheral grooves in the center post above and below the grooves.

The lower turret plate 53 carries on the top thereof a circular series of heat-sealing units, each designated 601 and each including a pair of heat-sealing bars corresponding to bars 3 previously mentioned for heat-sealing the lower ends of tubes T. In FIGS. 33–36 these heat-sealing bars, which may also be referred to as jaws, are specially designated 603 and 605. Plate 53 has sixteen of the aforementioned package drop-out openings 63 spaced at equal intervals therearound adjacent its periphery, and sixteen heat-sealing units 601, all being identical, are provided on plate 53 located above these openings. Each heat-sealing unit comprises an open rectangular frame 607, the ends of which are designated 609 and 611 and the sides of which are designated 613. The sides 613 of the frame are grooved on the outside as indicated at 615 for the reception of rollers 617 mounted on plate 53 for guiding the frame for endwise reciprocation. These rollers are located so that each frame is guided for reciprocation in a vertical plane intersecting the center of the respective drop-out opening 63 and lying at a 45° angle to the radial plane of the turret intersecting the center of the respective opening 63.

Heat-sealing jaw 603 is fixed to the end 609 of the frame 607 (which is its end nearest the center of the turret and which may be referred to as its inner end) extending across the frame on the inside thereof. Jaw 603 is a metal member (cast iron, for example) having a recess in which is pocketed a conventional cartridge heater 619 (an electrical resistance heater) and may have a padded face formed by an insert 621 of silicone rubber or similar suitable material. The sides 613 of the frame are grooved on the inside as indicated at 623. A carriage or slide 625 has rollers 627 riding in these grooves 623, the carriage being thereby slidable endwise relative to the frame. Carriage 625 carries heat-sealing jaw 605 it its inner end (its end toward the inner end 609 of the frame) cooperable with jaw 603, jaw 605 similarly being a metal jaw (cast iron, for example) having a cartridge heater 629 incorporated therein. Jaw 605 may have a pad 631 of silicone rubber or the like on its face. The carriage has a slot 633 extending inward from its outer end (its end toward the outer end 611 of the frame).

The lower turret plate 53 has a circular series of sixteen holes 635 located in the planes of reciprocation of the frames 607 outward of the dropout openings 63. Journalled for rotation on a vertical axis in each hole 635 is a shaft 637. Each of these shafts extends up from plate 53 through the slot 633 in the respective carriage 625, and has a lever 638 secured on its upper end. A link 639 is pivoted at one of its ends as indicated at 640 to the outer end of the frame 607 and is pin-connected at its other end as indicated at 641 to one end of lever 638. A link 643 is pin-connected at one end as indicated at 645 to the other end of lever 638 and pin-connected at its other end to the carriage 625 as indicated at 646. The pivot at 640 is in a yoke 647 on a recessed stem 649 slidable in a hole 651 in the outer end of the frame. Stem 649 has a sliding fit in a cap 653 threaded in the outer end of hole 651, and a compression spring 655 is interposed between the cap and the stem. A flange 657 on the stem limits the sliding of the stem.

With lever 638 in crosswise position relative to the frame 607 such as shown for the several levers 631 which appear in FIG. 33, links 639 and 643 are retracted so that carriage 625 occupies a retracted position (pulled out relative to the center of the turret) and frame 607 occupies a retracted position (pulled in relative to the center of the turret), jaws 603 and 605 accordingly being spread apart to their maximum extent. This spread-apart position of the jaws is referred to as their open position. By rotating lever 638 through 90° from its crosswise open-jaw position to the closed-jaw position such as shown for the several levers which appear in FIG. 34, and as shown in FIG. 36, links 639 and 643 are moved to push carriage 625 inward and to push frame 607 outward, thereby to move the jaws toward one another for heat-sealing the lower end of a tube T. On return of lever 638 to its crosswise position, the jaws are separated.

Cam mechanism for actuating the shafts 637 carrying levers 638 is generally indicated at 659 (see FIGS. 31 and 32). This includes a plate cam 661 mounted on the bottom of collar 525 on the turret center post 471. Each shaft 637 has a crank 663 on its lower end beneath the lower turret plate 53. Each crank is connected by a link 665 to a cam follower lever 667 pivoted at 669 underneath plate 53. Each lever 667 carries a cam follower roller 671 engaging the periphery of the fixed plate cam 661. A coil compression spring 673 surrounds each link 665, reacting from a spring stop 675 carried by plate 53 against a collar 677 on the link, to bias the respective follower roller 671 against the periphery of the plate cam 661 and to bias the lever 638 to the open-jaw position.

The upper turret plate 51 carries on the underside thereof a circular series of heat-sealing units, each designated 601a and each including a pair of heat-sealing bars corresponding to bars 1 previously mentioned for heat-sealing the upper ends of tubes T. These upper heat-sealing units 601a are structurally identical to the lower heat-sealing units 601 and are actuated by cam mechanism 659a (see FIG. 37) generally structurally identical to cam mechanism 659 for actuating the lower heat-sealing units 601, except that the plate cam of the upper cam mechanism 659a, which is specially designated 661a to distinguish it from plate cam 661, is of different development (i.e., has a periphery of different outline) from plate cam 661 as will more fully appear. This upper plate cam is mounted on the upper end of collar 515 on the turret center post 471 at the upper end of the latter above the upper turret plate 51. The upper heat-sealing units 601a are mounted in upside-down position on the underside of plate 51 in relation to the lower heat-sealing units 601, and the actuating shafts 637 thereof extend upward through holes 635 in plate 51 (corresponding to holes 635 in the lower turret plate 53), and cam mechanism 659a is located above plate 51.

Cam 661 is developed and phased to effect start of closing of jaws 603 and 605 of each lower heat-sealing unit 601 at a position G, which as shown in FIG. 37 is about 35° counterclockwise from position D, to complete the closing of the jaws at a position H1 about 64° counterclockwise from position D, to effect start of opening of the jaws at position H2 about 311.5° counterclockwise from position D, and to complete the opening of the jaws at a position H3 about 342.5° counterclockwise from position D.

Cam 661a is developed and phased to effect start of closing of jaws 603 and 605 of each upper heat-sealing unit 601a at a position J which as shown in FIG. 37 is about 197.5° counterclockwise from position D, to complete the closing of these jaws at a position K1 which is about 228.5° counterclockwise from position D, to effect start of opening of these jaws at a position K2 about 297° counterclockwise from position D, and to complete the opening of these jaws at a position K3 about 326° counterclockwise from position D.

Each of the upper heat-sealing units 601a is positioned directly above a respective lower heat-sealing unit 601 but it will be understood that for the production of tetrahedron-shaped packages, in which the package end seals are to be made in vertical planes at right angles to one another, the upper heat-sealing units 601a are arranged at right angles to the lower heat-sealing units 601. Thus, where the jaws 603 and 605 of each lower unit 601 reciprocate toward and away from one another in a vertical plane angled off at a 45° angle in one direction from a radial plane of the turret, the jaws 603 and 605 of each respective upper unit 601a reciprocate toward and away from one another in a vertical plane angled off at a 45° angle in the opposite direction from said radial plane. The lower units 601 are so located that the jaws of each lower unit close in a vertical closure plane which generally bisects the tube T carried in upright position by the respective rod 57. The upper units 601a are so located that the jaws of each upper unit close in a vertical closure plane which also generally bisects the tube T carried in upright position by the respective rod 57, but which is at right angles to the closure plane of the jaws of the related lower unit 601.

As shown herein, the apparatus is provided with means for filling the packages with a liquid product, and for this purpose there is provided a container or tank 701 (see FIGS. 10D and 40) for holding a supply of the product which is rotatable with the turret. This tank 701 is located directly above the upper end of the center post 471, and rotates with the turret on the vertical axis of the turret, being supported by brackets 703 mounted on the upper turret plate 51. Also mounted on the upper turret plate 51 is a circular series of sixteen filler units 61, one for each of the sixteen turret stations.

Each filler unit comprises a block 707 (see FIGS. 10C, 10D, 31, 40, 41 and 43) having a tapered bore 709 which extends horizontally from one end of the block to the other, the block constituting a plug valve body. This valve body 707 is secured on a pair of spacers 711 (see also FIG. 37) fastened to plate 51. Spacers 711 are located on opposite sides of an opening 713 at the respective station, and the spacers and valve body are positioned with the axis of bore 709 extending radially in respect to the turret. There are sixteen openings 713 arranged in a circular series with their centers generally in vertical alignment with the centers of drop-out openings 63 in the lower turret plate 53. A tapered plug valve 715 is rotary in bore 709. Body 707 is positioned with the small end of bore 709 toward the center of the turret. Plug valve 715 has a crank arm 717 on its large end, this arm having a follower roll 719 at its free end. A head 721 is secured to the radially inner end of the valve body, having an inlet port 723. For each of the sixteen turret stations there is a pipe 727 having a detachable coupling at 729 to the bottom of the tank and a detachable coupling at 731 to the head 721 of the valve body at the respective station for delivery of the product to the inlet port 723. Extending upward from the valve body is a cylinder 733. A piston 735 is slidable in this cylinder and has a guide 737 extending through vertical slot 739 in the wall of the cylinder at the outside of the turret, the guide carrying a follower roll 741. The plug valve 715 has a slot 743 toward its small end adapted in one rotary position of the valve (which may be referred to as the charging position) to provide for communication from inlet port 723 through a port 745 in the valve body to the lower end of the cylinder. In other positions of the plug valve, port 745 is blocked from the inlet port. The plug valve also has a transverse hole 747 adapted in another rotary position of the plug valve (which may be referred to as its delivery position) to provide for communication from the lower end of the cylinder through a port 749 in the top of the valve body to a discharge port 751 in the bottom of the valve body.

Ports 749 and 751 are vertically aligned with the axis of a tube T in vertical filling position on the end of a rod 57. Whenever the plug valve 715 is rotated to its stated delivery position, liquid is delivered from cylinder 733 down through port 749, hole 747 in the plug valve, port 751 and through a nozzle 753 for filling the tube T (previously closed at its lower end). Nozzle 753 extends down through opening 713. It is slidable in opening 713 and biased upward by a spring 755 reacting from a nozzle plate 757 against a collar on the nozzle adjacent its upper end. Spring 755 holds the upper end of the nozzle against the bottom of the plug valve body 707. In order to prevent overtravel of the plug valve 715, a brake 759 is provided therefor. This slides on a screw 761 extending out from body 707, and is biased into frictional engagement with the outer end of the plug valve by a coil compression spring 763.

Figure 49:
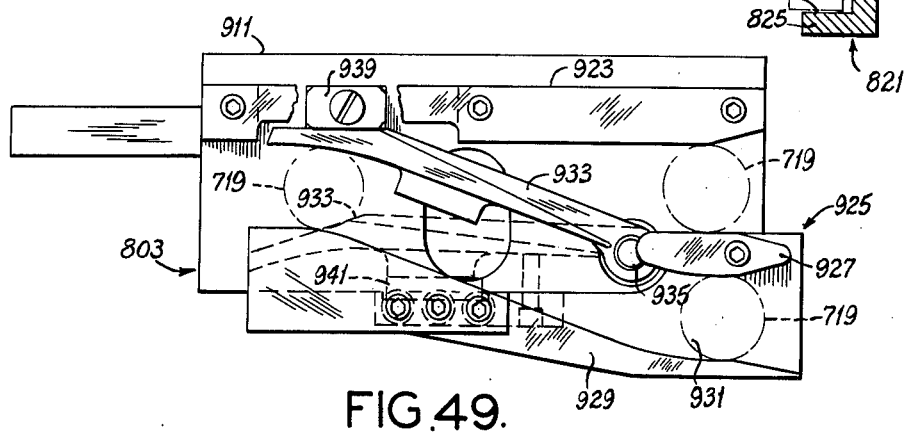
FIG. 49 is a front elevation of FIG. 45.
Figure 51:
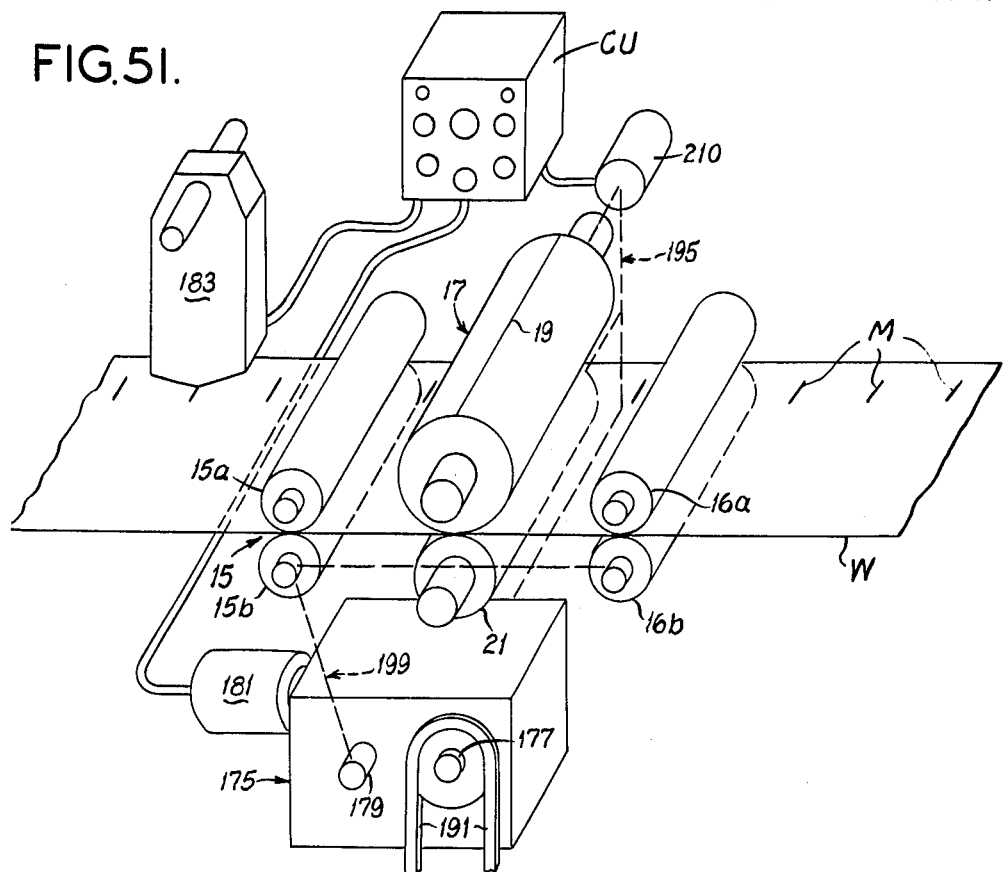
FIG. 51 is a view showing the electrical interconnection of certain web registration correction components of the apparatus.

Each plug valve is adapted to be rotated from its charging position to its delivery position as it rotates with the turret past position H1 by a first plug valve actuator 801 (see FIGS. 43, 44 and 46–48), and to be rotated back from its delivery position to its changing position as it rotates with the turret past position L by a second plug valve actuator 803 (see FIGS. 43, 45 and 49). The first actuator 801 is controlled in response to presence or absence of a tube T on a rod 57 for effecting dispensing or nondispensing from the filler units, as the case may be. The reason for providing such mechanism is that occasionally a rod 57 may skip picking up a tube T. If the filler unit at the skipped station were then to operate, the liquid would then pour down into the apparatus, necessitating cleaning.

Referring now more particularly to FIGS. 44 and 46–48, the first plug valve actuator or opener 801 is shown to comprise a box-like housing 805 secured to a mounting plate 807. The housing has end walls 809 and 811, side walls 812 and 813 (wall 813 may be referred to as the inside side wall of the housing), and top and bottom panels 815 and 817. Extending horizontally along the outside of the inside side wall 813 adjacent the top thereof is a rail 819. Below this rail is a track section generally designated 821 fixed on inside wall 813 and providing a short horizontal intermediate rail 823 and a longer lower rail 825 which define a groove 827. A deflector rail 829 is pivoted at one end on a shaft 831 journalled in the wall 813, this shaft extending horizontally adjacent the trailing end of intermediate rail 823. Deflector 829 is adapted to swing between the raised position in which it appears in solid lines in FIG. 47 and the lowered no-fill position in which it appears in dotted lines in FIG. 47 generally aligned with intermediate rail 823. Its raised position is determined by its engagement with an upper stop 832, and its lowered position is determined by its engagement with a lower stop 833. Deflector 829 is adapted to be actuated by a solenoid 834 mounted in the housing 805 on housing end wall 811, the plunger 835 of the solenoid being connected by a link 837 to a crank 839 on the inner end of shaft 831. Tension springs 841 connected between the end wall 809 of housing 805 and the plunger bias the deflector to the raised position shown in solid lines in FIG. 47.

Secured to the turret platform 475 and spaced around this platform are brackets 843 having sockets 845 at their outer ends (see FIG. 10c). Posts 847a, 847b and 847c have their lower ends mounted in these sockets and extend upward therefrom. Braces such as indicated at 849 in FIG. 40 are interconnected between the upper ends of these posts. Post 847a is located about 51° counterclockwise around from the tube take-off position D of the turret 50. Post 847b is located about 200° counterclockwise around from position D. Post 847c trails position D about 8°. A bracket 851 is clamped on post 847a as indicated at 853 in FIG. 10D. Mounting plate 807 of housing 805 is secured on this bracket. For purposes of angular adjustment of actuator 801 around the turret axis, plate 807 has arcuate slots such as indicated at 855 on arcs centered in the turret axis receiving clamp bolts 859. Clamp 853 enables vertical adjustment of housing 805 on post 847a and slots 855 enable adjustment of housing 805 around the axis of the turret for accurately locating housing 805 in position for effecting opening of each plug valve 715 as it passes through position H1 (which is about 64° counterclockwise around from position D). A guide 861 is provided at the trailing end of side wall 813 of housing 805 for guiding the follower roll 719 on each plug valve crank arm 717 into engagement with the trailing end of the deflector 829. The arrangement is such that when the deflector 829 is in its normal raised position (which is its valve-actuating position) inclined downward toward rail portion 823 and blocking the entrance to the guide channel between rail 819 and rail portion 823, a roll 719 passing through guide 861 engages the bottom of the deflector and is thereby cammed downward, travelling first between the deflector and the trailing portion of lower rail 825, and then exiting through the groove 827 defined by rail 823 and the leading portion of lower rail 825. Camming downward of a roll 719 rotates the respective crank arm 717 to rotate the respective plug valve 715 from its charging to its delivery position. Each plug valve then remains in delivery position (being held therein by brake 755) around to position L (located about 202° counterclockwise around from position D) where it is returned to charging position by the aforementioned second plug valve actuator 803.

Scanning means 862 (see FIG. 43) is provided for determining whether or not there is a tube T on the outer end of each rod 57 just prior to passage of the outer end of the rod through position H1, and energizing solenoid 834 to swing deflector 829 down to its lowered no-fill position upon detection of the absence of a tube T. When deflector 829 is swung down to its lowered no-fill position (as appears in dotted lines in FIG. 47), the next follower roll 719 coming around simply passes on without being cammed downward, passing first between rail 819 and the top of the deflector 829, then between rails 819 and 823, and this nulls the actuation of the respective plug valve 715, so that the latter remains in charging position and so that no delivery of liquid occurs from the respective filler unit 61.

Scanning means 862 comprises a light source 863 (see FIG. 43) carried by a bracket 865 mounted on a plate 867 which bears on top of cam 563. This plate 867 is adjustably rotatable around the turret center post 471 for accurate positioning of the light source, and is adapted to be clamped to cam 563 in adjusted position as indicated at 869. The light source 863 is adapted to direct a beam of light outward along a horizontal line which intersects the circular path of travel of tubes T at a point which trails start-of-fill position H1 to some extent. A photocell 871 is mounted on a post 873 extending up from the turret base 473 in position to intercept the beam from the light source.

Figure 52:
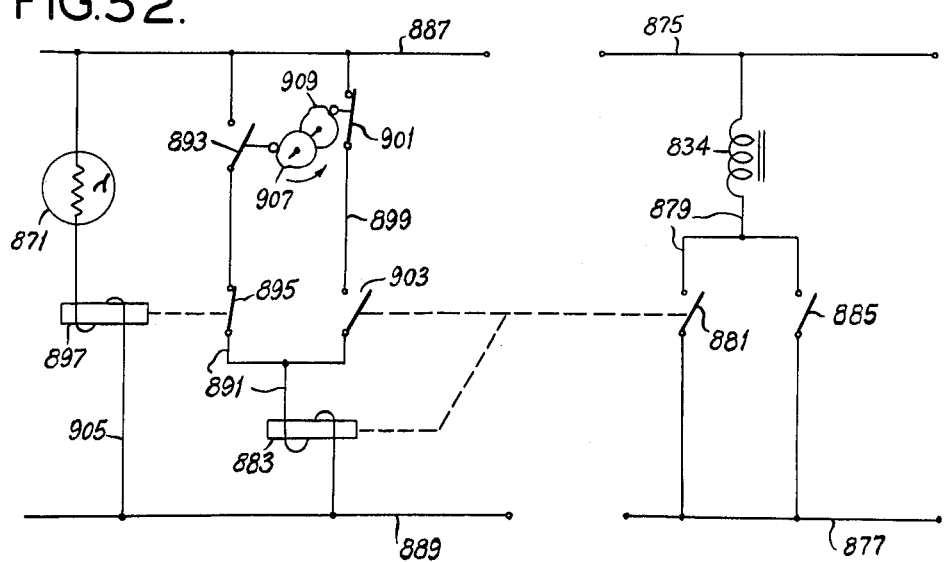
FIG. 52 is a wiring diagram of a control system for the filler units of the apparatus.

Referring to FIG. 52, solenoid 834 is shown as connected across power lines 875 and 877 in a line 879 including contacts 881 of a relay 883. A manual no-fill switch 885 is connected in parallel with contacts 881 for manually energizing solenoid 834 whenever desired to cut off fill. Relay 883 is connected across power lines 887 and 889 in a line 891 including a switch 893 and contacts 895 of a photocell-controlled relay 897. A holding circuit 899 for relay 883 is connected in parallel with switch 893 and contacts 895, including a switch 901 and contacts 903 of relay 883. The relay 897 and the photocell 871 are connected across lines 887 and 889 as indicated at 905. Switch 893 is actuated by a single-lobe cam 907 and switch 901 is actuated by a single-lobe cam 909 mounted on the input shaft of gear box 501 (see FIGS. 10C and 50), these cams thereby rotating at the same speed as the cycle shaft 109. They are mounted on the input shaft of box 501 with their lobes angularly displaced as appears in FIGS. 50 and 52. Switch 893 is normally open; switch 901 is normally closed. Contacts 881 and 903 are normally open. With light impinging on photocell 897, contacts 895 are normally closed.

The timing of cam 907 is such that switch 893 is closed at the instant a tube T should arrive in position to interrupt the light beam. If a tube so arrives (as is normal) the beam is interrupted, resulting in opening of contacts 895 simultaneously with closing of switch 893 so that relay 883 remains deenergized. Contacts 881 then remain open so that solenoid 834 remains deenergized. In the event of skipping a tube at a turret station, however, there is no interruption of the light beam as this station approaches position H1. Accordingly, contacts 895 remain closed when switch 893 closes. Relay 883 is energized and contacts 881 and 903 close. Closure of contacts 881 results in energization of the solenoid 834 to throw deflector 829 to its no-fill position, thereby to null the actuation of the plug valve 715 of the filler unit 61 of the stated turret station. Closure of contacts 903 completes holding circuit 899 (switch 901 being closed when switch 893 closes) for relay 883, so that solenoid 834 remains energized until cam 909 opens switch 901 to break the holding circuit. This results in deenergization of solenoid 834 so that deflector 829 returns to its valve-actuating position before the next turret station arrives at the light beam position.

The second plug valve actuator 803 (see FIGS. 43, 45 and 49) comprises a vertical plate 911 on a horizontal mounting plate 913. A bracket 915 is clamped on post 847b as indicated at 917 in FIG. 10D. Mounting plate 913 is secured on this bracket. For purposes of angular adjustment of actuator 803 around the turret axis, plate 913 has arcuate slots such as indicated at 919 on arcs centered in the turret axis receiving clamp bolts 921. Clamp 917 enables vertical adjustment of actuator 803 on post 847b, and slots 919 enable adjustment of actuator 803 around the turret axis for locating the actuator in position to effect closing of each plug valve 715 as it passes through position L. Extending horizontally along the inside of plate 911 adjacent the top thereof is a rail 923. Below this is a track section generally designated 925 fixed on plate 911 and providing a short horizontal intermediate rail section 927 (like 823) and a longer lower rail section 929 (like 825) which define a groove 931. A rail section 933 is pivoted at one end on a shaft 935 journalled in plate 911, this shaft extending horizontally immediately adjacent the leading (forward) end of rail section 927. Pivoted rail section 933 is adapted to swing between the raised inclined position in which it appears in solid lines in FIG. 49 and the depressed position in which it appears in dotted lines in FIG. 49 generally aligned with section 927. It is biased to the raised position by a spring 937 (see FIG. 45), the raised position being determined by its engagement with an upper stop 939. Its depressed position is determined by its engagement with a lower stop 941.

Actuator 803 is vertically positioned with groove 931 at the same level as the groove 827 of actuator 801. The follower roll 719 on each plug valve crank arm 717 previously swung down by actuator 801 to the delivery or fill position enters groove 931, and is cammed upward by the lower rail section 929 to throw the crank arm and the respective plug valve 715 to the changing position. As to the follower roll 719 on any plug valve crank arm 717 which has not been swung down by actuator 801, however, such follower roll 719 simply passes between rail 923 and rail section 927, swings pivoted rail section 933 down against the bias of spring 937, and passes on by.

Brackets 943 and 945 secured on posts 847a and 847c at their upper ends carry a horizontal plate 947. This plate extends between posts 847a and 847c and has an arcuate inner edge 949 on an arc centered in the turret axis and located immediately outward of the circular path of travel of the filler cylinders 733. For purposes of angular adjustment of plate 947 around the turret axis, the plate has arcuate slots such as indicated at 951 receiving clamp bolts 953. Plate 947 carries a fixed arcuate rail section 955 extending on the inside of plate 947 from near one end of the plate to near its other end for about 90° of arc and paralleling edge 949 of the plate. At 957 is indicated a cam track assembly which comprises an upper rail 959 and a lower rail 961 which are curved on an arc having the same radius as the arc of fixed rail section 955 and which extends for about 270° of arc around the turret on the outside of the circular path of travel of the filler cylinders 733 from one end of the fixed rail section 955 to the other. Rails 959 and 961 are held in spaced parallel relation by spacers 963 located on the outside thereof, thus defining between them a cam track 965. The follower rolls 741 on the filler cylinder pistons 735 are adapted to ride in this track. The ends of the part-circular cam track assembly 957 are pivoted as indicated at 967 at the ends of plate 947 so that assembly 957 may be suspended in an inclined position as appears in FIG. 10D. A suspension for so suspending assembly 957, and permitting adjustment thereof as to degree of its incline, is indicated at 969. This suspension comprises a bracket 971 mounted on post 847b at its upper end. On this bracket is a plate 973, angularly adjustable around the turret axis by having arcuate slots as indicated at 975 in FIG. 40 receiving clamp bolts 977. An arm 979 extends upward and inward from plate 977. An internally threaded sleeve 981 is pivoted at 983 on a horizontal axis at the end of the arm, and has a threaded suspension rod 985 threaded therein having a swivel connection at its lower end with a yoke 987 pivotally connected at 989 to the assembly 957. Rod 985 has a handwheel 991 on its upper end, and a lock nut 993 thereon below the sleeve. The arrangement is such that by turning the rod 985 one way or the other, assembly 957 may be pivoted up or down on its pivots 967 to adjust its inclination.

As appears in FIG. 10D, assembly 957 is inclined downward away from rail section 955, and the cam track 965 provided thereby for the follower rolls 741 on the filler cylinder pistons 735 thereby has a fall starting at position X shown in FIGS. 10D and 40 (which is located about 65° counterclockwise around from position D), continuing around for about 135° to position Y (located about 200° counterclockwise from position D), and a rise starting at position Y and continuing around for about 135° to position Z (located about 335° counterclockwise around from position D). As each follower roll 741 traverses the fall X–Y, the respective piston 735 is positively driven downward for positive discharge from the respective cylinder 733, and as each follower roll 741 traverses the rise Y–Z, the respective piston 735 is positively driven upward for sucking in a charge of liquid from tank 701 into the respective cylinder 733. Exiting from the rise Y–Z, the rolls 741 (now raised) travel over the fixed rail section 955, which is horizontal.

Noting that the heat-sealing units 601 and 601a rotate with the turret 50, and that the jaws 603 and 605 thereof are electrically heated, it is necessary to provide electrical interconnections from a source of electric power to the jaws which permit rotation of units 601 and 601a and the reciprocation of the jaws. This is accomplished by providing a slip-ring assembly 995 on the turret center post 471. This assembly comprises a slip-ring retainer 997 mounted on the quill 489 and rotatable therewith, carrying slip rings as indicated at 999. At the upper and lower ends of the slip-ring retainer are circular plates 1001 and 1003, also rotatable with the quill. A stationary cylindric housing member 1005 carries brushes as indicated at 1007 contacting the slip rings. Member 1005 carries a junction box 1009, and is held stationary on platform 475 as by rigid conduit (not shown) containing conductors for conducting current to the brushes. Conductors such as indicated at 1011 extend from the slip rings, accommodated in vertical grooves 1013 in the slip-ring retainer 997 to connectors 1015 on plate 1001, from which flexible conductors (not shown) extend to the jaws of units 601 and 601a through suitable openings in plate 53. The latter conductors thus rotate with the turret and their flexibility permits reciprocation of the jaws. Suitable provision may be made for varying the current supplied to the jaws to vary their temperature, and suitable thermistors may be incorporated in certain of the jaws and connected via the slip-ring assembly to means for indicating the temperature of the jaws.

Operation of the apparatus illustrated in FIGS. 10A–52 is as follows:

The main drive motor 506 continuously drives the cycle shaft 109 via the chain and sprocket drive 507 through the overload release clutch 508. The web cutoff and draw roll assembly 115, the rotary die assembly 211, the tube-forming assembly 271, the conveyor 45 and the turret 50 are all driven in phased relation from the cycle shaft. As previously mentioned, the cycle shaft makes one revolution for each package produced, and, with sixteen operating stations on turret 50 as herein illustrated, the turret rotates (counterclockwise as viewed from above) one-sixteenth revolution for each revolution of the cycle shaft. The cycle shaft normally rotates continuously at constant speed, and, for a production rate of 300 packages per minute, for example, it would be driven at a speed of 300 r.p.m.

Draw roll 15b of the cutoff and draw roll assembly 115 is continuously driven from the cycle shaft 109 at a speed determined by the change gears used at 199A and 199B, and, whenever a registration correction is being carried out, by the transmission 175. Accordingly, draw rolls 15a and 15b function continuously to draw the web W from the active web roll R and feed the web forward. On each revolution of the cycle shaft 109, a length of the web corresponding to the desired package length is fed forward. The package length is determined by the speed of the draw rolls, as determined by the change gears used at 199A and 199B. For longer packages, change gears providing higher roll speed and hence higher web feed speed are used; for shorter packages change gears providing lower roll speed and hence lower web feed speed are used. As shown in the drawings, the apparatus is set up for producing packages of the maximum length within the range of the apparatus (eight inches, for example).

Web W, fed forward by draw rolls 15a and 15b, passes between the cutter roll 17 and anvil roll 21 of the cutoff and draw roll assembly 115. The cutter roll is continuously driven from the cycle shaft 109 at such speed as to effect cutting of the web upon each revolution of the cycle shaft. Since there are two knives 19 at 180° intervals on the cutter roll, the cutter roll is driven at twice the speed of the cycle shaft so that one cut is made for each revolution of the cycle shaft. The cutter roll radius may be such that the peripheral speed of the knives corresponds to the web speed for an intermediate package length. For example, if the apparatus is constructed to form packages from four and one-half inches to eight inches long, the peripheral speed of the cutter roll may correspond to the web speed for a six and one-fourth inch package length. Thus, as the web W is fed forward by draw rolls 15a and 15b between the cutter roll 17 and the anvil roll, on each revolution of the cycle shaft 109 the cutter roll 17 functions to cut the web on a line extending completely across the web to segment a rectangular blank B having the desired package length from the web at the forward end of the web. If the marks M on the web should become out of register in relation to the line of cutoff, the scanner system under control of electric eye 183, and via change of speed of the draw rolls 15a and 15b effected by operation of motor 181 of transmission 175, effects correction. Before the web W is cut, its forward end reaches draw rolls 16a and 16b, and these rolls function to feed forward each blank B segmented from the web at the same speed as that of the web. In this regard, roll 16b is driven at the same speed as roll 15b via the gear train including idler gear 205.

Rolls 16a and 16b feed each blank B segmented from web W forward into the nip of accelerator rolls 25a and 25b of the rotary die assembly 211. The forward end of each blank is caught in the nip of rolls 25a and 25b as its trailing end exits from rolls 16a and 16b (as provided by longitudinal adjustment of assembly 115 on rails 107), and each blank is accelerated by rolls 25a and 25b so that its trailing end becomes spaced from the leading end of the next blank segmented from web W by assembly 115. The spacing, as previously mentioned, may be of the order of one-half inch, for example. Rolls 25a and 25b feed each blank forward between the die roll 27a and the anvil roll 27b. Die roll 27a (having two die blocks 237 thereon) is driven at twice the speed of roll 25b so that, on each half-revolution of the die roll 27a, one of the die blocks 237 thereon punches the dual Chevron pattern 241a (FIG. 16C) of perforations, for example, in the blank B passing between roll 27a and the anvil roll 27b. The perforations extend only through the paper and metal foil layers Pa and Al, but not through the coating C (see FIG. 16B). Each blank B, perforated as described and exiting from rolls 27a and 27b enters rolls 29a and 29b, the latter being driven at the same speed as roll 25b, and is thereby fed forward out of the rotary die assembly 211, and into the tube-forming assembly 271.

Each blank B entering the tube-forming assembly is caught in the nip of feed rolls 361 and 369 and thereby fed forward over the top of the rearward or trailing end of the mandrel 35. Here the blank becomes pinched between the lower reach 31b of the conveyor belt 31 and the conveyor rollers 287 associated with the mandrel, and its forward feed is continued over the top of the mandrel. The belt engages the top surface of the blank generally along the longitudinal center line of the blank and the side portions of the blank extend laterally outward on opposite sides of the mandrel (this is illustrated in FIG. 20). As each blank is thereby fed forward over the top of the mandrel, its forward (leading) end comes under the rearward (trailing) ends of the plow members 311. Belt 31 continues to feed each blank forward along the mandrel from the rearward to the forward end of these plow members. The side portions of the blank are gradually bent downward and around the mandrel by the tapered rearward end portions 311a of the plow members (see FIG. 29) and, as the blank enters the forward portions 311b of the plow members, wrapping thereof into tubular form around the mandrel is essentially completed.

The web W is fed horizontally through the cutoff and draw roll assembly 115 with its heat-sealable side C on the bottom. Blanks B are fed horizontally through assemblies 211 and 217 with their heat-sealable side C on the bottom, and each blank is formed into a tube T around the mandrel 35 with its heat-sealable side C on the inside. The plow members 311 constrain each blank to wrap itself around the mandrel in such manner as to bring the lateral margins of the blank into inside-face-to-inside-face relation forming the fin S1 which is to be heat-sealed to form the inside-face-to-inside-face longitudinal tube seam also designated S1 (see FIG. 30).

As each tube T exits from the plow members 311, the downwardly projecting fin S1 of the tube is pinched between the contiguous reaches 381a of the bands 381 of the band sealer unit 41. The bands 381 are driven at the same speed as belt 31 and function to feed the tubes T forward one after another endwise along the mandrel, the tubes T being spaced apart as a result of the acceleration of the blanks B occurring in the rotary die assembly 211. They also function to subject the fin S1 to heat and pressure to convert it to the heat-sealed inside-face-to-inside-face longitudinal tube seam S1.

Each tube T, with the completed longitudinal tube seam S1, exiting from the band sealer unit 41, comes into position along the length of the mandrel 35 for engagement of the rearward end of the tube by a lug 437 on the chain 435. Each tube is thereupon pushed forward along the mandrel by the lug on the chain 435, the latter being driven at the same speed as belt 31 and bands 381. The lugs 437 are spaced apart a distance corresponding to the maximum package length plus the tube spacing. Thus, for a maximum package length of eight inches and a tube spacing of one-half inch, the lugs are spaced apart eight and one-half inches. As each tube is pushed forward along the mandrel by the chain 435, the longitudinal tube seam S1 is folded over against the outside of the tube by the seam fold-over rolls 439, 441 and 443.

The chain 435 feeds the tubes T forward along the mandrel 35 endwise one after another, with the aforementioned space between successive tubes, to the take-off position D at the end section 49 of the mandrel. Here, each successive tube T is in a position to be picked up by the suction cup 59 at the outer end of one of the rods 57 rotating with the turret 50, and thereby transferred to the turret. Accordingly, position D (to which each tube T is delivered at the end of the mandrel and at which its transfer to the turret occurs) may be referred to as the transfer position.

As above pointed out, the turret 50, having sixteen operating stations, rotates at the rate of one-sixteenth of a revolution for each revolution of the cycle shaft 109. A tube T arrives at transfer position D at the end of the mandrel on each revolution of the cycle shaft; hence the turret rotates through one-sixteenth of a revolution during the intervals between arrivals of successive tubes at the transfer position D. The turret rotates in such phase relation to the arrival of tubes at position D that the suction cups 59 on rods 57 arrive at position D simultaneously with the arrival of the tubes. In this regard, it will be observed that the mandrel 35 is approximately tangent to the circular path of travel of the suction cups (see particularly FIG. 23). As a given suction cup comes around to the point of tangency (meaning that the rod 57 carrying the given suction cup comes into position at right angles to the mandrel and extending radially from the center of the turret out to the mandrel), the rim of the cup presses against the outside of the tube T which has simultaneously arrived at position D. When the rim of the cup presses against the outside of the tube T, vacuum drawn in the cup causes the tube to become gripped to the cup.

As previously described, the rods 57 carrying the suction cups 59 are not only rotatable with the turret about the vertical axis of the turret, but each of these rods is also rotatable about its own longitudinal axis for the purpose of turning a tube T gripped by the suction cup at the outer end of the rod from horizontal to vertical position. The rods 57, which extend radially outward from the turret axis between the upper and lower plates or supports 51 and 53 of the turret, may also be referred to as arms. Each rod and its associated suction cup may also be referred to as a tube carrier, since it is adapted to carry a tube T around a portion of a circular path of travel. This circular path is centered in the vertical axis of the turret, has a radius equal to the radius drawn from the turret axis out to a suction cup plus the radius of a tube T. Being a circular path, it is endless. Also as previously described, each rod 57, under control of cam 563, occupies a first angular position with respect to its own longitudinal axis (its so-called tube-horizontal position) as it approaches the transfer position D, starts turning on its axis at position E1, completes a 90° turn to a second angular position with respect to its own longitudinal axis (its so-called tube-upright position) at position E2, starts turning back to the first position at position E3, and completes this turn-back at position E4. Vacuum is drawn in each suction cup 59 via the vacuum passage in the respective rod 57 and groove 575 (which is in communication with the interior of center post 471) starting about 25° before the cup reaches transfer position D. Vacuum continues to be drawn in the cup until it has traveled around about 228° (just ahead of position E3) from position D, at which point the inner end of rod 57 rides off the groove 575 to break the communication from the passage in the rod to the interior of the center post. Then, when the inner end of the rod reaches groove 577, the cup is fully vented to atmosphere via groove 577.

Thus, as each suction cup arrives at transfer position D, and with vacuum being drawn in the cup the tube T arriving simultaneously at position D is gripped to the cup and swept off the end of the mandrel 35. The grooving at 49a and the bevelling at 49b of the free end section 49 of the mandrel enables transition of the tube T from its linear path of travel along the mandrel to its circular path of travel around with the turret 50. Each tube T, so transferred from the mandrel to the turret (which constitutes a conveyor means for carrying tubes T around a portion of the stated endless circular path) starts out in the course of its travel around with the turret in horizontal position (as received from the mandrel). At position E1, each rod 57 starts its 90° turn on its longitudinal axis and at position E2 this turn is completed so that the tube is now in upright position for being sealed at its lower end, filled, and then sealed at its upper end.

The turning of each tube T to upright position brings its lower end between the open jaws 603, 605 of the respective lower heat-sealing unit 601 and its upper end between the open jaws 603, 605 of the respective upper heat-sealing unit. Under control of cam 661, the jaws of the lower heat-sealing unit 601 start closing at position G (somewhat before completion of turning of the tube to upright position), and are completely closed at position H1 (following completion of turning of the tube to upright position) to apply heat and pressure to form an inside-face-to-inside-face seal across the lower end of the tube. The jaws remain closed around to position H2, allowing ample time for formation of a good lower end seal. When the jaws initially close on the lower end of the tube at position H1 and start to form the lower end seal, they pinch the lower end of the tube closed so that filling of the tube may also start at position H1.

As a tube T carried in upright filling position by a rod 57 at a given station of the sixteen turret stations is carried through position H1, the follower roll 719 on the crank arm 717 of the plug valve 715 of the filler unit 61 for that station enters the plug valve actuator 801 to effect opening of the plug valve 715 (i.e., vertically to align hole 747 in the valve with ports 749 and port 751 as shown in FIG. 41 and to block off inlet 723 from cylinder 733). This enables discharge of liquid from cylinder 733 through nozzle 753 into the tube T as the tube is carried around with the turret past position H1. As the filler unit 61 approaches position H1 (where filling starts), the follower roll 741 associated with the piston 735 in cylinder 733 of the filler unit enters the cam track 965 (see FIG. 10D). Then, as the filler unit is carried farther around with the turret, the follower roll 741 is cammed downward due to the fall of the cam track 965 from position X around to position Y thereby to drive the piston 735 for positive discharge of liquid from the cylinder. The cam track assembly 957 which defines the cam track 965 is adjusted so that the fall of the cam track from X around to Y is such as to effect downward displacement of piston 735 corresponding to the desired volume of fill. In this regard, it will be understood that this volume is some what less than that which would fill the tube T all the way to the top, so that the level of liquid in the tube T after filling is below the level of the upper end seal for the tube to be formed subsequently by a respective upper heat-sealing unit 601a. The fill volume may be varied to produce packages with different volumes of liquid therein by adjustment of the cam track assembly 957 to vary the fall from X to Y and hence the displacement of pistons 735, noting that each piston at the lower end of its stroke should preferably be very near the lower end of the respective cylinder 733.

At position L, the piston follower roll 741 and the piston 735 of any given station of the sixteen turret stations reach the lower limit of their stroke, reverse, and start to move back upward. Also, at position L, the follower roll 719 on the crank arm 717 of the plug valve 715 of the filler unit 61 for any given station enters the second plug valve actuator 803 to effect closing of the plug valve 715 (i.e., to block off hole 747 in the valve from port 749 and to provide for communication from inlet 723 through the slot 743 of the valve and port 745 to the cylinder 733). Thus, filling of each tube T being carried around with the turret 50 is completed at position L. Then, as the filler unit continues on around past position L, the piston 735 thereof is positively cammed upward by reason of its follower roll 741 riding in the rise of cam track 965, thereby to draw into cylinder 733 another charge of liquid from the tank 701 for the next filling operation to follow on the next revolution of the turret 50.

If a tube is missing from the suction cup 59 of any turret station, this is detected by the scanning means 862 with resultant actuation of solenoid 834 of valve actuator 801 to swing the deflector 829 thereof down to the no-fill position thereby holding out of operation the filler unit 61 for that station.

Under control of cam 661a, the jaws 603, 605 of the upper heat-sealing unit 601a of any given station of the sixteen turret stations start closing at position J (somewhat before completion of the filling of the tube T at that station). These jaws are completely closed at position K1 (following completion of the filling of the tube) to apply heat and pressure to form an inside-face-to-inside-face seal across the upper end of the tube. The jaws remain closed around to position K2, allowing ample time for formation of a good upper end seal. This completes the formation of the tube T into a package P. The vacuum grip of the suction cup 59 on the tube T is broken just ahead of position E3, when the inner end of rod 57 rides out of the range of groove 575, and this enables turning of the rod 57 on its own axis under control of cam 563 in the course of rotation of the rod with the turret from position E3 to position E4. The grip of the suction cup on the tube T is no longer needed past position K1 because from this point on the tube T is gripped at the bottom by jaws 603, 605 of the respective lower heat-sealing unit 601 and at the top by jaws 603, 605 of the respective upper heat-sealing unit 601a.

At position K2, the jaws of the upper heat-sealing unit 601a of each turret station start to open; at position H2 the jaws of the lower heat-sealing unit 601 of each turret station start to open; at position K3 the upper jaws are fully open; and at position H3 the lower jaws are fully open. Thus, the package P completed at each turret station is released before the station completes a revolution and returns to the transfer position D, and the package drops out of the turret through the respective drop-out opening 63 in the lower turret plate 51. Conveyor means such as indicated at 67 in FIGS. 7A and 8A may be provided for carrying away the completed packages.

As previously described, tubes T of different lengths may be formed by changing gears at 199A and 199B. Shorter tubes T will usually have a smaller diameter than longer tubes T, and are formed from narrower web material than the longer tubes. Mandrels of different sizes are used for forming tubes of different diameters. Band sealer 41 is vertically adjustable to accommodate use of mandrels of different diameters. The upper and lower turret plates 51 and 53 are adjustable toward and away from one another to position the upper and lower heat-sealing units 601a and 601 for operation on tubes T of different lengths. Cams 661a and 661 move up and down with plates 51 and 53, but do not rotate by reason of the keying at 527 and 517.

While the apparatus is herein disclosed as provided with means for filling the packages with a liquid product, it will be understood that other types of filling means may be used for filling the packages with other products, e.g., powders, granular materials, solid and semisolid food products, etc. Also, while the upper and lower heat-sealing units 601a and 601 are shown as operating in planes at 90° to one another for forming tetrahedron-shaped packages, it will be understood that they may be arranged to operate in the same plane for forming flat (pillow-shaped) packs.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Packaging apparatus comprising conveyor means for carrying open-ended tubes one after another along a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, the means for closing the lower ends of the tubes, the filling means and the means for closing the upper ends of the tubes being movable with said conveyor means.

2. Packaging apparatus comprising conveyor means for carrying open-ended tubes one after another along a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a plurality of tube carriers each adapted to grip a tube on the outside of the tube, said means for closing the lower ends of the tubes comprising a plurality of lower closure units, one for each carrier, said filling means comprising a plurality of filler units, one for each carrier, and said means for closing the upper ends of the tubes comprising a plurality of upper closure units, one for each carrier, all of said units being movable with said conveyor means.

3. Packaging apparatus as set forth in claim 2 operable on tubes which are heat-sealable on the inside wherein each lower closure unit and each upper closure unit comprises means for forming inside face to inside face heat seals across the ends of the tubes.

4. Packaging apparatus as set forth in claim 3 wherein the upper closure units are arranged to form the upper end seals at such an angle to the lower end seals that the packages have the shape of a tetrahedron.

5. Packaging apparatus comprising conveyor means for carrying open-ended tubes one after another along a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a turret rotatable on a vertical axis having a plurality of tube carriers spaced angularly around the turret at equal intervals and adapted to carry the tubes in a circular path, the means for closing the lower ends of the tubes, the filling means and the means for closing the upper ends of the tubes being rotatable with the turret.

6. Packaging apparatus comprising conveyor means for carrying open-ended tubes one after another along a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a turret rotatable on a vertical axis having a plurality of tube carriers spaced angularly around the turret at equal intervals and adapted to carry the tubes in a circular path, said apparatus being operable on tubes which are heat-sealable on the inside, the means for closing the lower ends of the tubes and the means for closing the upper ends of the tubes comprising means for forming inside-face-to-inside-face heat seals across the ends of the tubes, the heat-sealing means for the upper ends of the tubes being arranged to form the upper end seals at such an angle to the lower end seals that the packages have the shape of a tetrahedron.

7. Packaging apparatus comprising conveyor means for carrying open-ended tubes one after another along a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a turret rotatable on a vertical axis having a plurality of tube carriers spaced angularly around the turret at equal intervals and adapted to carry the tubes in a circular path, each tube carrier including a gripper adapted to grip a tube on the outside thereof, said gripper being a suction cup.

8. Packaging apparatus as set forth in claim 7 wherein said means for closing the lower ends of the tubes comprises a plurality of lower closure units, one for each carrier, said filling means comprises a plurality of filler units, one for each carrier, and said means for closing the upper ends of the tubes comprises a plurality of upper closure units, one for each carrier, all of said units being movable with said conveyor means.

9. Packaging apparatus as set forth in claim 8 operable on tubes which are heat-sealable on the inside wherein each lower closure unit and each upper closure unit comprises means for forming inside face to inside face heat seals across the ends of the tubes.

10. Packaging apparatus as set forth in claim 9 wherein the upper closure units are arranged to form the upper end seals at such an angle to the lower end seals that the packages have the shape of a tetrahedron.

11. Packaging apparatus as set forth in claim 10 wherein the upper closure units are arranged to form the upper end seals in planes at right angles to the planes of the lower end seals.

12. Packaging apparatus comprising means for delivering open-ended tubes one after another to a transfer position, conveyor means for receiving the tubes at said transfer position and carrying the tubes one after another in a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, the means for closing the lower ends of the tubes, the filling means and the means for closing the upper ends of the tubes being movable with said conveyor means.

13. Packaging apparatus comprising means for delivering open-ended tubes one after another to a transfer position, conveyor means for receiving the tubes at said transfer position and carrying the tubes one after another in a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a plurality of tube carriers each adapted to grip a tube on the outside of the tube, said means for closing the lower ends of the tubes comprising a plurality of lower closure units, one for each carrier, said filling means comprising a plurality of filler units, one for each carrier, and said means for closing the upper ends of the tubes comprising a plurality of upper closure units, one for each carrier, all of said units being movable with said conveyor means.

14. Packaging apparatus as set forth in claim 13 operable on tubes which are heat-sealable on the inside wherein each lower closure unit and each upper closure unit comprises means for forming inside face to inside face heat seals across the ends of the tube.

15. Packaging apparatus as set forth in claim 14 wherein the upper closure units are arranged to form the upper end seals at such an angle to the lower end seals that the packages have the shape of a tetrahedron.

16. Packaging apparatus comprising means for delivering open-ended tubes one after another to a transfer position, conveyor means for receiving the tubes at said transfer position and carrying the tubes one after another in a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said means for delivering the tubes to transfer position acting to deliver the tubes in generally horizontal position and said conveyor means including means for turning the tubes to generally upright position.

17. Packaging apparatus comprising means for delivering open-ended tubes one after another to a transfer position, conveyor means for receiving the tubes at said transfer position and carrying the tubes one after another in a predetermined path with each tube at an angle to horizontal for being filled through its upper end, means for closing the lower end of each tube as its proceeds along said path, means for filling each tube through its upper end as it proceeds farther along said path, and means for closing the upper end of each tube as it proceeds farther along said path after the filling thereof, said conveyor means comprising a plurality of tube carriers each adapted to grip a tube on the outside of the tube, each tube carrier being movable relative to said conveyor means to turn the tube carried thereby to generally upright position.

18. Packaging apparatus comprising means for delivering open-ended tubes one after another to a transfer position, conveyor means for receiving the tubes at said transfer position and carrying the tubes one after another in a predetermined path with each tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said conveyor means comprising a turret rotatable on a vertical axis having a plurality of tube carriers spaced angularly around the turret at equal intervals, each tube carrier having means for gripping a tube at the transfer position on the outside of the tube and for carrying off the tube in a circular path.

19. Packaging apparatus as set forth in claim 18 wherein the means for closing the lower ends of the tubes, the filling means and the means for closing the upper ends of the tubes are rotatable with the turret.

20. Packaging apparatus as set forth in claim 18 operable on tubes which are heat-sealable on the inside wherein the means for closing the lower ends of the tubes and the means for closing the upper ends of the tubes comprise means for forming inside face to inside face heat seals across the ends of the tubes.

21. Packaging apparatus as set forth in claim 20 wherein the heat-sealing means for the upper ends of the tubes is arranged to form the upper end seals at such an angle to the lower end seals that the packages have the shape of a tetrahedron.

22. Packaging apparatus as set forth in claim 18 wherein said means for delivering the tubes to transfer position delivers them in generally horizontal position, and each tube carrier is movable relative to the turret to turn the tube carried thereby to generally vertical position.

23. Packaging apparatus comprising means for forming flexible packaging material into individual open-ended tubes and delivering the tubes one after another to a transfer position, conveyor means having a plurality of tube carriers thereon movable in an endless path, each tube carrier being adapted to grip a tube at said transfer station and to carry the tube along in said path and to hold the tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said forming and delivering means acting to deliver the tubes in generally horizontal position and each tube carrier being movable relative to said conveyor means to turn the tube carried thereby to generally vertical position.

24. Packaging apparatus as set forth in claim 23 wherein said forming and delivering means is arranged to deliver the tubes endwise one after another to the transfer position, at which the tube is generally tangent to said path.

25. Packaging apparatus comprising means for forming flexible packaging material into individual open-ended tubes and delivering the tubes one after another to a transfer position, conveyor means having a plurality of tube carriers thereon movable in an endless path, each tube carrier being adapted to grip a tube at said transfer station and to carry the tube along in said path and to hold the tube at an angle to horizontal for being filled through its upper end, means for closing the lower end of each tube as it proceeds along said path, means for filling each tube through its upper end as it proceeds farther along said path, and means for closing the upper end of each tube as it proceeds farther along said path after the filling thereof, said forming and delivering means comprising means for segmenting a continuous web of flexible packaging material into individual blanks and forming each blank into a tube.

26. Packaging apparatus as set forth in claim 25 wherein said forming and delivering means is arranged to form the tubes and deliver them in generally horizontal position and each tube carrier is movable relative to said conveyor means to turn the tube carried thereby to generally vertical position.

27. Packaging apparatus as set forth in claim 26 wherein said forming and delivering means comprises means for segmenting a continuous web of flexible packing material into individual blanks and forming each blank into a tube.

28. Packing apparatus as set forth in claim 25 for operation on a web which is heat-sealable on one side, wherein said forming means is constructed to form each blank into a tube with the heat-sealable side on the inside and with side margins of the blank in inside face to inside face relation and includes means for heat-sealing said side margins together to form an inside face to inside face longitudinal tube seam.

29. Packing apparatus comprising an endless series of tube carriers movable in an endless path, each tube carrier being adapted to carry an open-ended tube in generally upright position for being filled through its upper end, a plurality of lower closure units, one for each carrier, movable with said carriers and each adapted to close the lower end of the tube carried by the respective carrier, a plurality of filler units, one for each carrier, movable with said carriers and each adapted to fill the tube carried by the respective carrier through the upper end of the tube, a plurality of upper closure units, one for each carrier, movable with said carriers and each adapted to close the upper end of the tube carried by the respective carrier, each tube carrier being adapted to receive a tube at a first position in the course of its travel in said path and then to carry the tube along in said path, and means operable on movement of said carriers in said path and accompanying movement of said closure and filler units to initiate operation of each lower closure unit at a second position along said path thereby to close the lower end of the tube carried by the respective carrier, to initiate operation of each filler unit at a third position along said path thereby to fill the tube carried by the respective carrier after the lower end of the tube has been closed, and to initiate operation of each upper closure unit at a fourth position along said path to close the upper end of the tube carried by the respective carrier after the tube has been filled, and adapted to effect release of each package so completed before the respective carrier returns to the first position.

30. Packaging apparatus as set forth in claim 29 adapted for operation on tubes which are heat-sealable on the inside and wherein each lower closure unit comprises means for heat-sealing the lower end of a tube and each upper closure unit comprises means for heat-sealing the upper end of a tube.

31. Packaging apparatus as set forth in claim 30 wherein said heat-sealing means of each closure unit comprises a pair of jaws movable toward and away from each other and adapted to apply heat and pressure to the tube ends.

32. Packaging apparatus as set forth in claim 31 wherein the jaws of each upper closure unit are arranged to work at an angle to the jaws of the respective lower closure unit such as to form packages of tetrahedral shape.

33. Packaging apparatus as set forth in claim 29 wherein each tube carrier is movable relative to said closure units for turning a tube received generally horizontally at said first position to a generally upright position in the course of travel of the tube from said first to said second position.

34. Packaging apparatus as set forth in claim 33 adapted for operation on tubes which are heat-sealable on the inside and wherein each closure unit comprises a pair of jaws movable between an open position and a closed position for applying heat and pressure to the respective end of a tube, each tube carrier being adapted to turn a tube to a position wherein the lower end of the tube is between the open jaws of the respective lower closure unit and the upper end of the tube is between the open jaws of the respective upper closure unit.

35. Packaging apparatus as set forth in claim 29 further comprising means for detecting the absence of a tube from any one of the carriers, and means controlled by said detecting means for nulling the operation of the filler unit associated with any one of the carriers in response to detection of the absence of a tube from that carrier by said detecting means.

36. Packaging apparatus as set forth in claim 35 wherein each filler unit has a follower, said means for effecting operation of each filler unit comprises a deflector engageable by the follower as the filler unit passes said third position along said path, and said nulling means comprises means for moving said deflector out of the path of said follower.

37. Packaging apparatus as set forth in claim 36 wherein said detecting means comprises a light source positioned on one side of the path of travel of the tubes and adapted to direct a beam of light along a line intersecting the path of travel of said tubes and a photocell positioned on the other side of the path of travel of said tubes and adapted to receive light from said source.

38. Packaging apparatus comprising a turret rotatable on a generally vertical axis, a series of tube carriers spaced at equal intervals around the turret and rotatable with the turret, each adapted to grip the outside of an open-ended tube and to carry the tube in generally upright position along a generally horizontal circular path around the turret axis upon rotation of the turret, a plurality of lower closure units, one for each carrier, carried by the turret, each adapted to close the lower end of a tube carried by the respective carrier, a plurality of filler units, one for each carrier, carried by the turret, each adapted to fill a tube carried by the respective carrier through the upper end of the tube, a plurality of upper closure units, one for each carrier, carried by the turret, each adapted to close the upper end of a tube carried by the respective carrier, each tube carrier being adapted to grip a tube at a first position in the course of travel of the tube carrier in its circular path and then to carry the tube along in said path, and means operable on rotation of the turret to initiate operation of each lower closure unit at a second position around said path from said first position thereby to close the lower end of the tube carried by the respective carrier, to initiate operation of each filler unit at a third position around said path from said second position thereby to fill the tube carried by the respective carrier after the lower end of the tube has been closed, and to initiate operation of each upper closure unit at a fourth position around said path to close the upper end of the tube carried by the respective carrier after the tube has been filled, and adapted to effect release of each package so completed before the respective carrier rotates around back to the first position.

39. Packaging apparatus as set forth in claim 38 adapted for operation on tubes which are heat-sealable on the inside and wherein each lower closure unit comprises means for heat-sealing the lower end of a tube and each upper closure unit comprises means for heat-sealing the upper end of a tube.

40. Packaging apparatus as set forth in claim 39 wherein said heat-sealing means of each closure unit comprises a pair of jaws movable toward and away from each other and adapted to apply heat and pressure to the tube ends.

41. Packaging apparatus as set forth in claim 40 wherein jaws of each upper closure unit are arranged to work at an angle to the jaws of the respective lower closure unit such as to form packages of tetrahedral shape.

42. Packaging apparatus as set forth in claim 38 wherein each tube carrier comprises a rod extending radially outward from the turret axis and having means at its outer end for gripping a tube, each rod being rotatable on its axis, and wherein there is provided means for rotating each rod on its axis to turn a tube received generally horizontally at said first position to a generally upright position as the rod rotates from said first to said second position.

43. Packaging apparatus as set forth in claim 42 wherein said gripping means comprises a suction cup.

44. Packaging apparatus as set forth in claim 42 adapted for operation on tubes which are heat-sealable on the inside and wherein each closure unit comprises a pair of jaws movable between an open and a closed position for applying heat and pressure to the respective end of a tube, each rod being adapted to turn a tube to a position wherein the lower end of the tube is between the open jaws of the respective lower closure unit and the upper end of the tube is between the open jaws of the respective upper closure unit.

45. Apparatus for forming, filling and sealing packages comprising means for continuously feeding forward a web flexible packaging material, means for segmenting said web into blanks each having a length corresponding to the desired package length, means for continuously feeding forward the blanks segmented from the web and, as each blank is fed forward, forming it into a tube around an axis extending in the direction of feed, sealing together the side margins of the blank to form a longitudinal tube seam, and continuing the feed of the completed tubes in end-to-end relation one after another to a transfer position at which each tube arrives with its axis extending generally horizontally, conveyor means having a plurality of the tube carriers thereon movable in a generally horizontal endless path, each carrier being adapted to grip a tube at said transfer position and to carry the tube along in said path, each tube carrier being movable relative to said conveyor means to turn the tube carried thereby from its initial horizontal position to generally vertical position, and means for closing the lower end of each tube, filling it through its upper end, then closing its upper end as it is carried along in said path in generally vertical position thereby to form the packages, the package associated with each carrier being discharged before that carrier returns to said transfer position.

46. Apparatus as set forth in claim 45 adapted for operation on a web which is heat-sealable on one face, wherein each blank is formed into a tube with said face on the inside and with the side margins of the blank in inside face to inside face relation, and including means for heat-sealing said margins to form an inside face to inside face longitudinal tube seam.

47. Apparatus as set forth in claim 46 wherein said heat-sealing means comprises a pair of endless bands having opposed contiguous forwardly travelling reaches for heating and pressing together said side margins.

48. Apparatus as set forth in claim 46 having means for folding over the longitudinal tube seam of each tube against the outside of the tube as the tube is fed forward to said transfer position.

49. Apparatus as set forth in claim 45 including a generally horizontal cantilevered mandrel around which the blanks are formed into tubes, said transfer position being at the free end of the mandrel, and said tube carriers moving generally tangent to said free end of the mandrel in timed relation to the feed of the tubes for sweeping the tubes off the free end of the mandrel as they arrive at the free end of the mandrel.

50. Apparatus as set forth in claim 49 having elongate plow means partially encompassing the mandrel for constraining each blank to become wrapped around the mandrel into the form of a tube as the blank is fed forward long the mandrel.

51. Apparatus as set forth in claim 45 wherein the means for feeding the blanks and the tubes includes means for accelerating the forward feed of the blanks segmented from the web to cause them to become spaced apart endwise and for feeding the tubes forward in endwise spaced-apart relation corresponding to the spacing of the blanks.

52. Apparatus for forming, filling and sealing packages comprising means for continuously feeding forward a web of flexible packaging material, means for segmenting said web into blanks each having a length corresponding to the desired package length, means for continuously feeding forward the blanks segmented from the web and, as each blank is fed forward, forming it into a tube around an axis extending in the direction of feed, sealing together the side margins of the blank to form a longitudinal tube seam, and continuing the feed of the completed tubes in end-to-end relation one after another to a transfer position at which each tube arrives with its axis extending generally horizontally, a turrent rotatable on a generally vertical axis, a series of tube carriers spaced at equal intervals around the turrent rotatable with the turrent, each carrier including a gripper rotatable with the turrent in a generally horizontal circular path generally tangent to a tube at the transfer position adapted to grip a tube arriving at transfer position and carry the tube away from transfer position along a generally horizontal circular path around the turrent axis, each carrier being movable relative to the turrent for turning the tube carried thereby from horizontal to vertical position, means for moving each carrier to turn the tube carried thereby from horizontal to vertical position as the carrier rotates past said transfer position to a second position, a plurality of lower closure units, one for each carrier, carried by the turret, each adapted to close the lower end of a tube carried by the respective carrier, a plurality of filler units, one for each carrier, carried by the turret, each adapted to fill a tube carried by the respective carrier through the upper end of the tube, a plurality of upper closure units, one for each carrier, carried by the turret, each adapted to close the upper end of a tube carried by the respective carrier, and means operable on rotation of the turret to initiate operation of each lower closure unit at said second position around said path from said transfer position thereby to close the lower end of the tube carried by the respective carrier, to initiate operation of each filler unit at a third position around said path from said second position thereby to fill the tube carried by the respective carrier after the lower end of the tube has been closed, and to initiate operation of each upper closure unit at a fourth position around said path to close the upper end of the tube carried by the respective carrier after the tube has been filled, and adapted to effect release of each package so completed before the respective carrier rotates around back to the transfer position.

53. Apparatus as set forth in claim 52 adapted for operation on a web which is heat-sealable on one face, wherein each blank is formed into a tube with said face on the inside and with the side margins of the blank in inside-face-to-inside-face relation, and including means for heat sealing said margins to form an inside-face-to-inside-face longitudinal tube seam, and wherein each of said lower closure units comprises means for forming an inside-face-to-inside-face heat seal across the lower end of a tube, and each of said upper closure units comprises means for forming an inside-face-to-inside-face heat seal across the upper end of a tube.

54. Apparatus as set forth in claim 53 wherein the heat-sealing means of each closure unit comprises a pair of jaws movable between an open and a closed position for applying heat and pressure to the respective end of a tube, wherein each tube carrier comprises a rod extending radially outward from the turret axis having said gripper at its outer end, each rod being rotatable on its axis, and wherein means is provided for rotating each rod on its axis to turn a tube gripped by the respective gripper from horizontal to vertical position and thereby to position the lower end of the tube between the open jaws of the respective lower closure unit and the upper end of the tube between the open jaws of the respective upper closure unit.

55. Apparatus as set forth in claim 54 wherein the jaws of each of said closure units are movable toward and away from each other and adapted to close on the end of a tube in a diametrical plane of the tube, and wherein the jaws of each upper closure unit are arranged to work at right angles to the jaws of the respective lower closure unit to form packages of tetrahedral shape.

56. Packaging apparatus comprising a turret rotatable on a vertical axis and including upper and lower supports rotatable therewith, means rotatable with the turret for holding open-ended tubes in vertical position between said supports at stations spaced around the turret axis, a plurality of lower closure units, one for each station, carried by the lower support for closing the lower ends of the tubes, a plurality of filler units, one for each station, carried by the upper support for filling the tubes through their upper ends after the closing of their lower ends, and a plurality of upper closure units, one for each station, carried by the upper support for closing the upper ends of the tubes after they have been filled, the lower support having openings at said stations for dropout of the filled closed tubes.

57. Packaging apparatus as set forth in claim 56 wherein said tube-holding means comprises a plurality of arms, one for each station, extending radially outward from the turret axis between said supports and having means at its outer end for gripping a tube.

58. Packaging apparatus as set forth in claim 57 wherein each arm comprises a rod mounted for rotation on its axis for turning a tube gripped by the gripping means, and wherein means is provided for rotating each rod from a first to a second position as the turret rotates through a predetermined portion of a revolution and back to first position as the turret rotates through another predetermined portion of a revolution.

59. Packaging apparatus as set forth in claim 58 wherein said rod-rotating means comprises cam means including a fixed cam common to all the rods and cam followers, one for each rod, engaging the fixed cam.

60. Packaging apparatus as set forth in claim 58 wherein each rod is a tubular rod having a vacuum cup on its outer end, the turret being rotatable on a fixed hollow center support defining a vacuum chamber, and wherein means is provided for maintaining a vacuum in said chamber, said center support having means for placing the inner end of each rod in communication with said chamber as each rod rotates through a predetermined portion of a revolution and to vent each rod as it rotates through another predetermined portion of a revolution.

61. Packaging apparatus as set forth in claim 56 wherein said supports are vertically adjustable toward and away from one another for operation on tubes of different lengths.

62. Packaging apparatus as set forth in claim 56 for operation on tubes which are heat-sealable on the inside and wherein each closure unit comprises a pair of heat-sealing jaws mounted on the respective support for movement toward and away from one another between an open and closed position and wherein means is provided for effecting closure of the jaws of each lower closure unit as the unit rotates with the turret through a predetermined portion of each revolution and opening of the jaws through the remainder of each revolution, and means is provided for effecting closure of the jaws of each upper closure unit as the unit rotates with the turret through another predetermined portion of a revolution and opening of these jaws through the remainder of each revolution.

63. Packaging apparatus as set forth in claim 62 wherein said supports are vertically adjustable toward and away from one another for operation on tubes of different lengths, wherein the means for effecting closure of the jaws of said lower units includes a first cam fixed against rotation and vertically movable with the lower support, and wherein the means for effecting closure of the jaws of said upper units includes a second cam fixed against rotation and vertically movable with the upper support.

64. Packaging apparatus comprising means for segmenting a continuous web of flexible packaging material into individual blanks, said material being a multilayer material comprising a backing and a liner, means for forming a line of perforations in the backing only of each blank, means for forming each blank into a tube with the liner on the inside, means for closing one end of each tube, means for filling each tube through its other end, and means for closing the other end of each tube thereby to complete the formation of a sealed package, said line of perforations traversing a portion of the package between the end closures of said package and said package being adapted to be opened by tearing on said line of perforations, said liner being imperforate throughout its area between the end closures and thereby preventing escape of the contents of the package through the perforations.

65. Packaging apparatus as set forth in claim 64 wherein said means for forming the line of perforations is located to form the perforations in each blank after it has been segmented from the web.

66. Packaging apparatus as set forth in claim 64 wherein said means for forming the line of perforations comprises means for punching a chevron-shaped line of perforations in each blank at one end of the blank and toward one side of the blank.

67. Packaging apparatus as set forth in claim 64 wherein said means for forming the line of perforations comprises an anvil roll and a die roll between which the material passes, said die roll having teeth projecting therefrom only to such an extent as to punch through the backing but not the liner.

68. Packaging apparatus as set forth in claim 67 wherein one of said rolls has annular raised end portions engaging the other roll.

69. In a packaging apparatus, a plurality of grippers movable in an endless path, each gripper being adapted to engage the outside of a tube and grip the tube and carry it along said path, and means for effecting movement of each gripper to turn the tube as the gripper moves through a portion of said path, each gripper being a vacuum gripper, said apparatus having means for drawing a vacuum in each gripper to grip a tube thereto.

70. In a packaging apparatus, a hub rotary on a vertical axis, a plurality of rods extending radially outward from the hub, means at the outer end of each rod for engaging the outside of a tube and gripping the tube, each rod being rotatable on its longitudinal axis, and means for rotating each rod on its axis to turn a tube gripped to the outer end of the rod.

71. In a packaging apparatus as set forth in claim 70, each gripping means being a vacuum gripper, and said apparatus having means for drawing a vacuum in each gripper to grip a tube thereto.

72. In a packaging apparatus as set forth in claim 71, each rod being tubular, vacuum being drawn in the gripper on the end of the rod through the rod.

73. The method of forming, filling and sealing packages comprising feeding blanks of flexible packaging material one after another along a stationary mandrel toward a free end of the mandrel and forming each blank into an open-ended tube around the mandrel, carrying each tube off and away from the free end of the mandrel, and, as each tube is being carried away from the mandrel, holding the tube in a generally upright working position, and, with the tube so held in said working position, closing the lower end of the tube, delivering a quantity of a product to be packaged into the tube through its open upper end, and then closing the upper end of the tube.

74. The method of claim 73 wherein the mandrel is horizontal, and wherein each tube is turned from horizontal to upright position as it is carried away from the mandrel.

75. The method of claim 74 wherein the ends of each tube are closed by forming transverse seals thereacross.

76. The method of claim 75 wherein the transverse seals are formed at right angles to one another so that the packages are of tetrahedron shape.

77. The method of claim 73 wherein the blanks are formed by feeding a web of flexible packaging material toward the mandrel and segmenting the web into the blanks.

78. The method of forming, filling and sealing packages comprising forming flexible packaging material into a succession of individual unflattened open-ended tubes each having a length corresponding to the desired package length, conveying the tubes one after another along a predetermined path with each tube held in a generally upright position as it travels along said path, and as the tubes proceed along said path and with the tubes in said generally upright position, closing the lower end of each successive tube, filling it through its open upper end, and then closing its upper end.

79. The method of claim 78 wherein said tubes are formed in generally horizontal poistion and are turned to said generally upright position during the initial phase of their course of travel along said path and prior to the closing of their lower ends.

80. The method of claim 78 wherein each tube in the course of its travel along said path has its lower end positioned between a lower pair of sealing members and its upper end concurrently positioned between a pair of upper sealing members, the lower end of each tube being closed by closing the lower sealing members to form a transverse seal across the lower end of the tube, and the upper end of each tube being closed by closing the upper sealing members to form a transverse seal across the upper end of the tube.

81. The method of claim 80 wherein the tubes are heat-sealable on the inside and said sealing members apply heat and pressure to the ends of the tube to form inside-face-to-inside-face heat seals across the ends of the tubes.

82. The method of claim 81 wherein each upper pair of sealing members works at such an angle to the respective lower pair of sealing members as to form a package of tetrahedron shape.

83. The method of claim 80 wherein said tubes are formed in generally horizontal position and are introduced in generally horizontal position between a respective pair of upper sealing members and lower sealing members with said sealing members open, and are then turned to said generally upright position during the initial phase of their course of travel along said path to bring the upper end of each tube between a respective pair of upper sealing members and concurrently to bring the lower end of each tube between a respective pair of lower sealing members.

84. The method of claim 83 wherein the tubes are heat-sealable on the inside and said sealing members apply heat and pressure to the ends of the tube to form inside-face-to-inside-face heat seals across the ends of the tubes.

85. The method of claim 84 wherein each upper pair of sealing members works at such an angle to the respective lower pair of sealing members as to form a package of tetrahedron shape.

86. The method of forming, filling and sealing packages comprising forming flexible packaging material into a succession of individual open-ended tubes and feeding said tubes endwise one after another to a transfer station, picking up the tubes at said transfer station and conveying them one after another along a predetermined generally horizontal path with each tube held in a generally upright position as it travels along said path, and as the tubes proceed along said path and with the tubes in said generally upright position, closing the lower end of each successive tube, filling it through its open upper end, and then closing its upper end.

87. The method of claim 86 wherein the tubes are fed in generally horizontal position to said transfer station and are turned to said generally upright position during the initial phase of their course of travel along said path and prior to the closing of their lower ends.

88. The method of claim 86 wherein each tube in the course of its travel along said path has its lower end positioned between a lower pair of sealing members and its upper end concurrently positioned between a pair of upper sealing members, the lower end of each tube being closed by closing the lower sealing members to form a transverse seal across the lower end of the tube, and the upper end of each tube being closed by closing the upper sealing members to form a transverse seal across the upper end of the tube.

89. The method of claim 88 wherein the tubes are heat-sealable on the inside and said sealing members apply heat and pressure to the ends of the tube to form inside-face-to-inside-face heat seals across the ends of the tubes.

90. The method of claim 89 wherein each upper pair of sealing members works at such an angle to the respective lower pair of sealing members as to form a package of tetrahedron shape.

91. The method of claim 88 wherein the tubes are fed in generally horizontal position to said transfer station, are picked up in generally horizontal position at said transfer station between a respective pair of upper sealing members and lower sealing members with said sealing members open, and are then turned to said generally upright position during the initial phase of their course of travel along said path to bring the upper end of each tube between a respective pair of upper sealing members and concurrently to bring the lower end of each tube between a respective pair of lower sealing members.

92. The method of claim 91 wherein the tubes are heat-sealable on the inside and said sealing members apply heat and pressure to the ends of the tube to form inside-face-to-inside-face heat seals across the ends of the tubes.

93. The method of claim 92 wherein each upper pair of sealing members works at such an angle to the respective lower pair of sealing members as to form a package of tetrahedron shape.

94. The method of claim 86 wherein the tubes are formed from generally rectangular blanks of packaging material, said blanks being fed forward endwise toward said transfer station one after another, and being formed into tubes with longitudinal tube seams as they are so fed forward.

95. The method of claim 94 wherein each blank is heat-sealable on one face, and wherein, as each blank is fed forward endwise toward said transfer station, it is formed into a tube with said face on the inside of its lateral margins in inside-face-to-inside-face relation, said margins being heat-sealed together to form the longitudinal tube seam.

96. The method of claim 94 wherein the blanks are formed by feeding a web of flexible packaging material in the direction toward said transfer station and segmenting the web into said blanks.

97. Packaging apparatus comprising conveyor means for carrying a plurality of open-ended tubes along a predetermined path, said tubes being heat-sealable on the inside, and means for heat-sealing an end of each tube comprising a pair of jaws movable with said conveyor means and movable toward and away from one another relative to said conveyor means between an open and a closed position, and means for moving said jaws from open to closed position as they move with said conveyor means from a first to a second position along said path, said conveyor means comprising a rotary turret adapted to carry said tubes along a circular path, said jaws being interconnected by a linkage, a fixed cam for actuating said linkage to move said jaws toward one another as they move with said conveyor means from said first to said second position, and subsequently to open said jaws, one jaw being carried by a frame mounted for reciprocating movement relative to said conveyor means, and the other jaw being mounted for reciprocating movement in the frame, said linkage interconnecting said frame and said other jaw.

98. Packaging apparatus comprising means for delivering open-ended tubes one after another in a predetermined direction to a transfer position, means movable continuously in an endless path for gripping each tube delivered to said transfer position and carrying the tube along in said path with the tube held at an angle to horizontal for being filled through said upper end, said path following generally the same direction as said predetermined tube delivery direction at said transfer position, means for closing the lower end of each tube as it proceeds along said path, means for filling each tube through its upper end as it proceeds farther along said path, and means for closing the upper end of each tube as it proceeds farther along said path after the filling thereof.

99. Packaging apparatus as set forth in claim 98 wherein said means for delivering the tubes to transfer position acts to feed the tubes endwise in generally horizontal position to said transfer position, and said gripping means is operable to turn the tubes to generally upright position.

100. In a packaging apparatus, means for delivering open-ended tubes endwise one after another to a transfer position with the tubes generally horizontal, means movable continuously in an endless path for gripping each tube delivered to said transfer position and carrying the tube along in said path, said path following generally the same direction as the direction of delivery of the tubes at said transfer position, said gripping means being swingable to turn the tubes to generally upright position as the tubes are carried away from said transfer position.

References Cited by the Examiner
UNITED STATES PATENTS

| | | | |
|---|---|---|---|
| 2,643,496 | 6/1953 | Cloud | 53—284 X |
| 2,741,079 | 4/1956 | Rausing | 53—180 |
| 2,837,795 | 6/1958 | Warren. | |
| 2,838,795 | 6/1958 | Lockwood | 53—284 X |
| 2,926,474 | 3/1960 | Morrison et al. | 53—373 |

FRANK E. BAILEY, *Primary Examiner.*

TRAVIS S. McGEEHEE, *Examiner.*